US010634546B2

(12) United States Patent
Zhang

(10) Patent No.: US 10,634,546 B2
(45) Date of Patent: Apr. 28, 2020

(54) LIQUID LEVEL DETECTION DEVICE

(71) Applicant: Murata Manufacturing Co., Ltd., Nagaokakyo-shi, Kyoto-fu (JP)

(72) Inventor: Yingnan Zhang, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 169 days.

(21) Appl. No.: 15/724,307

(22) Filed: Oct. 4, 2017

(65) Prior Publication Data
US 2018/0058905 A1 Mar. 1, 2018

Related U.S. Application Data

(63) Continuation of application No. PCT/JP2016/055582, filed on Feb. 25, 2016.

(30) Foreign Application Priority Data

Apr. 6, 2015 (JP) .................................. 2015-077543
Nov. 18, 2015 (JP) .................................. 2015-225838

(51) Int. Cl.
*G01F 23/62* (2006.01)
*G01F 23/72* (2006.01)
*G01F 23/74* (2006.01)

(52) U.S. Cl.
CPC .............. *G01F 23/62* (2013.01); *G01F 23/72* (2013.01); *G01F 23/74* (2013.01)

(58) Field of Classification Search
CPC ........... G01F 23/72; G01F 23/62; G01F 23/74
See application file for complete search history.

(56) References Cited

U.S. PATENT DOCUMENTS 5,636,548 A * 6/1997 Dunn ...................... G01F 23/72
73/1.73
6,097,183 A 8/2000 Goetz et al.
2002/0005715 A1 1/2002 Sato
(Continued)

FOREIGN PATENT DOCUMENTS

CN 103207003 A 7/2013
JP 01-221620 A 9/1989
(Continued)

OTHER PUBLICATIONS

Official Communication issued in Japanese Patent Application No. 2017-511491, dated Oct. 2, 2018.
(Continued)

*Primary Examiner* — Paul M. West
(74) *Attorney, Agent, or Firm* — Keating & Bennett, LLP

(57) ABSTRACT

A liquid level detection device includes a float that ascends and descends following a liquid level, a magnet attached to the float, a guide that guides the float to ascend and descend, magnetic sensors attached to the guide and sensing a magnetic flux density varying in response to a position assumed by the magnet as the magnet ascends/descends and outputting an electrical signal corresponding to the magnetic flux density, and a detection circuit that detects a position of the float based on electrical signals respectively output from the magnetic sensors. The detection circuit detects the position of the float based on electrical signals output from two adjacent ones of the magnetic sensors.

4 Claims, 43 Drawing Sheets

(56) References Cited

U.S. PATENT DOCUMENTS

2011/0248705 A1    10/2011  Matsumoto et al.
2017/0074715 A1*   3/2017  Bartos ..................... G01F 23/74

FOREIGN PATENT DOCUMENTS

| | | |
|---|---|---|
| JP | 2002-022403 A | 1/2002 |
| JP | 2002-071431 A | 3/2002 |
| JP | 2002-511571 A | 4/2002 |
| JP | 2002-277308 A | 9/2002 |
| JP | 2009-236615 A | 10/2009 |
| JP | 2011-220795 A | 11/2011 |
| JP | 2014-145714 A | 8/2014 |
| TW | M278927 U | 10/2005 |

OTHER PUBLICATIONS

Official Communication issued in Taiwanese Patent Application No. 105109739, dated Nov. 14, 2017.
Official Communication issued in corresponding Taiwanese Patent Application No. 105109739, dated Jun. 26, 2018.
Official Communication issued in International Patent Application No. PCT/JP2016/055582, dated May 24, 2016.

* cited by examiner

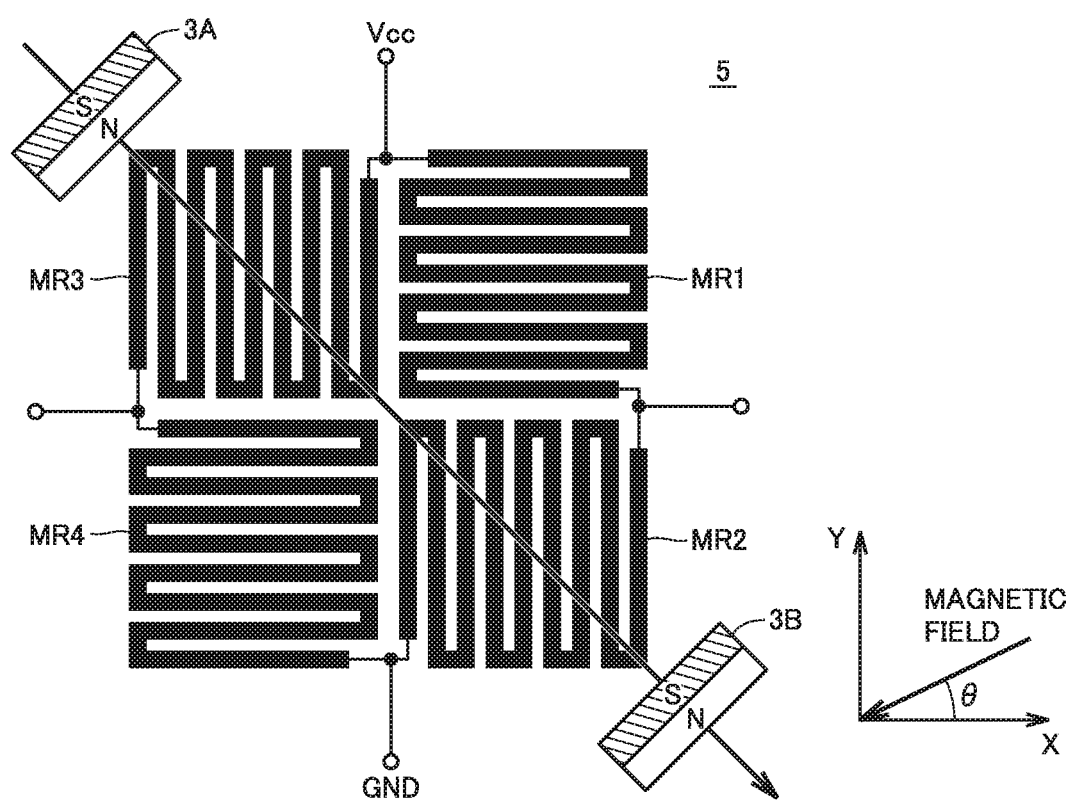

(S0)

(S1)

(S2)

(S3)

(S4)

(S5)

(S6)

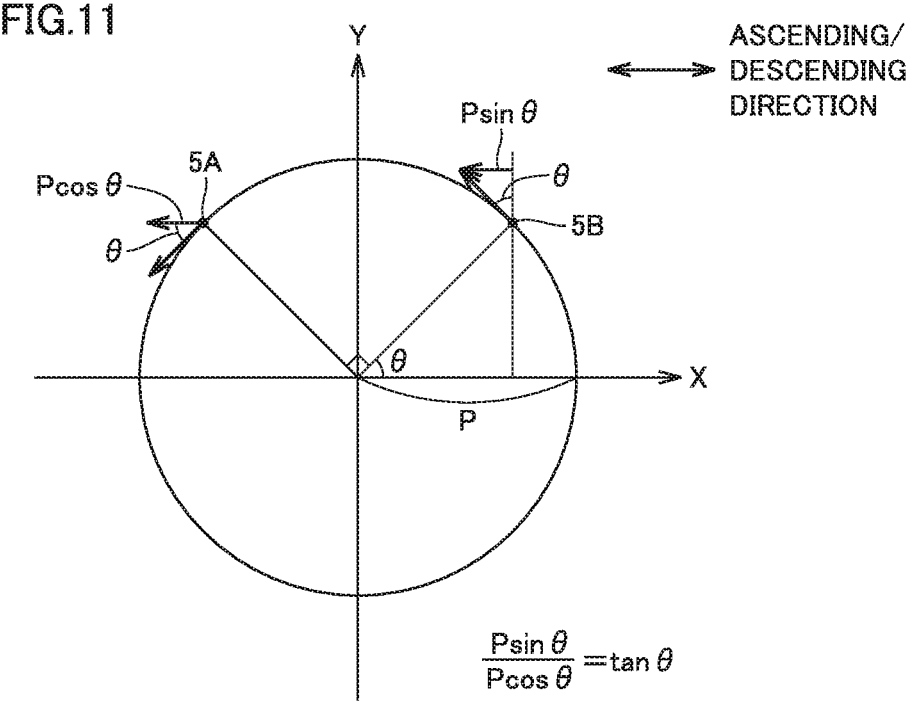

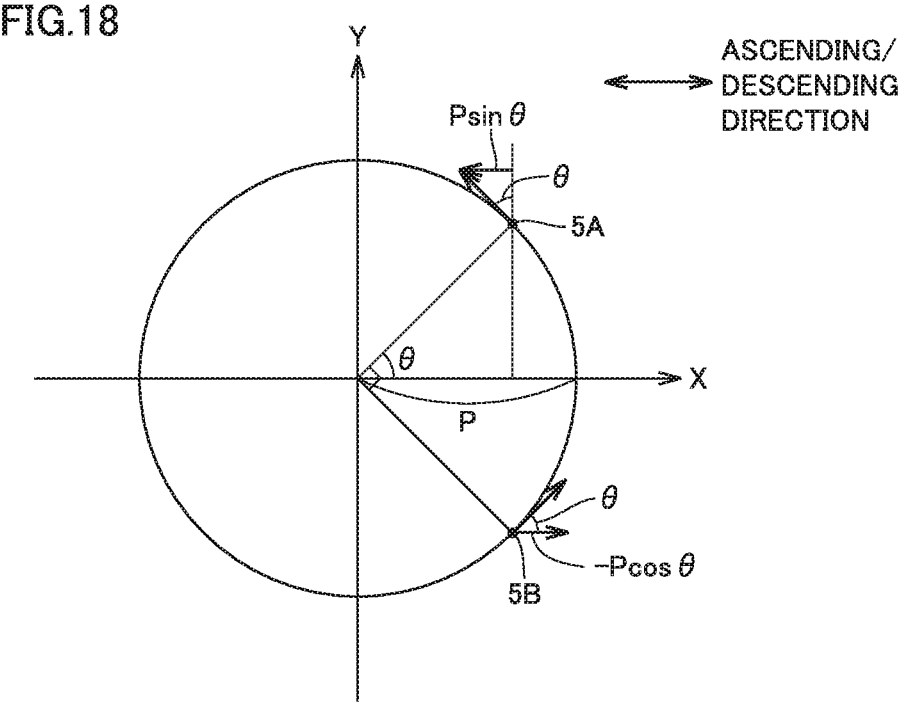

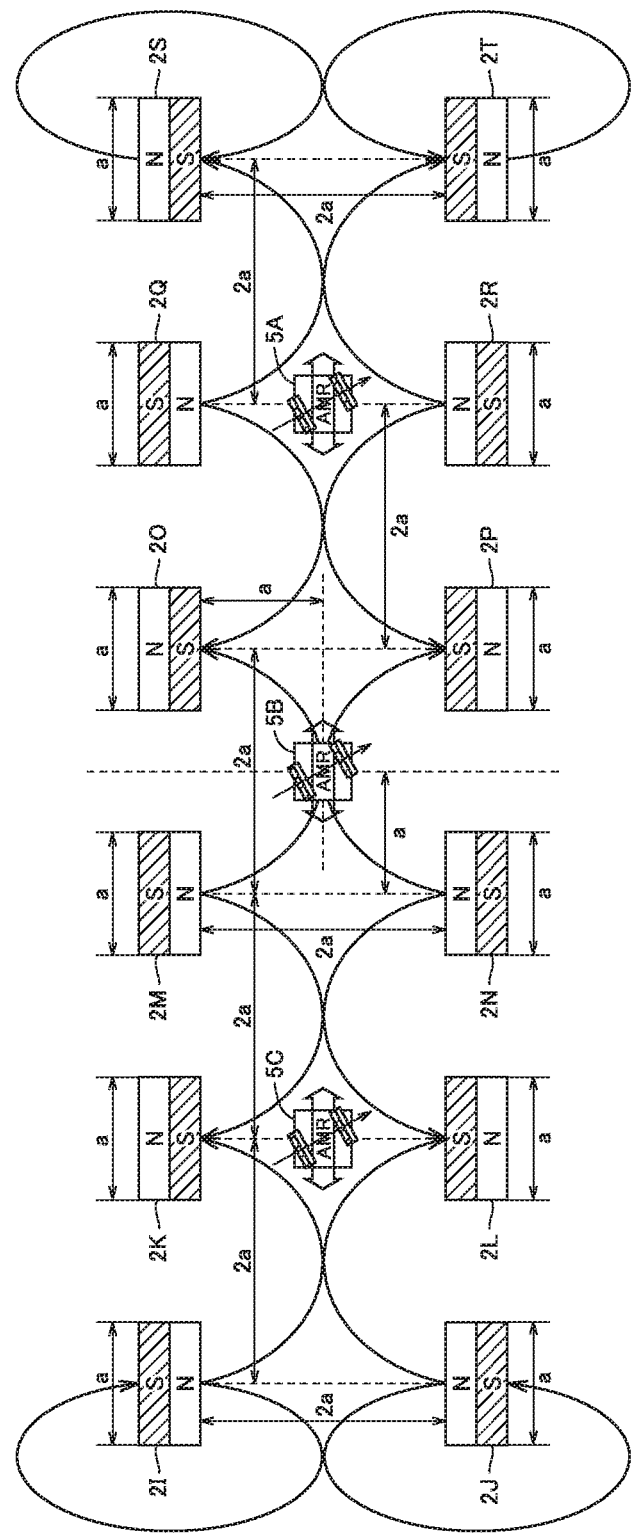

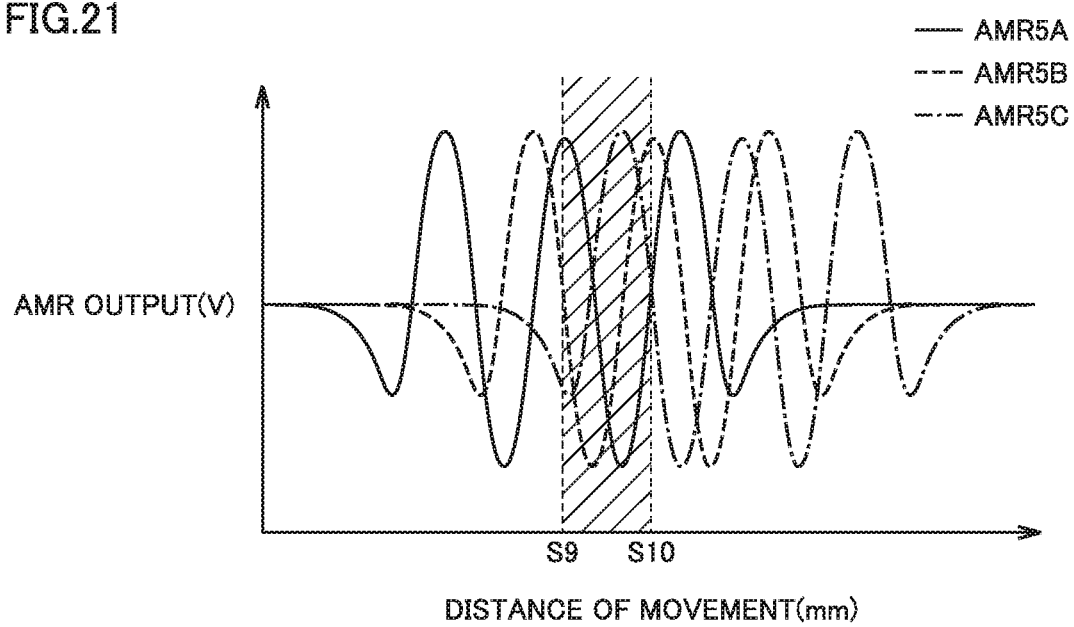

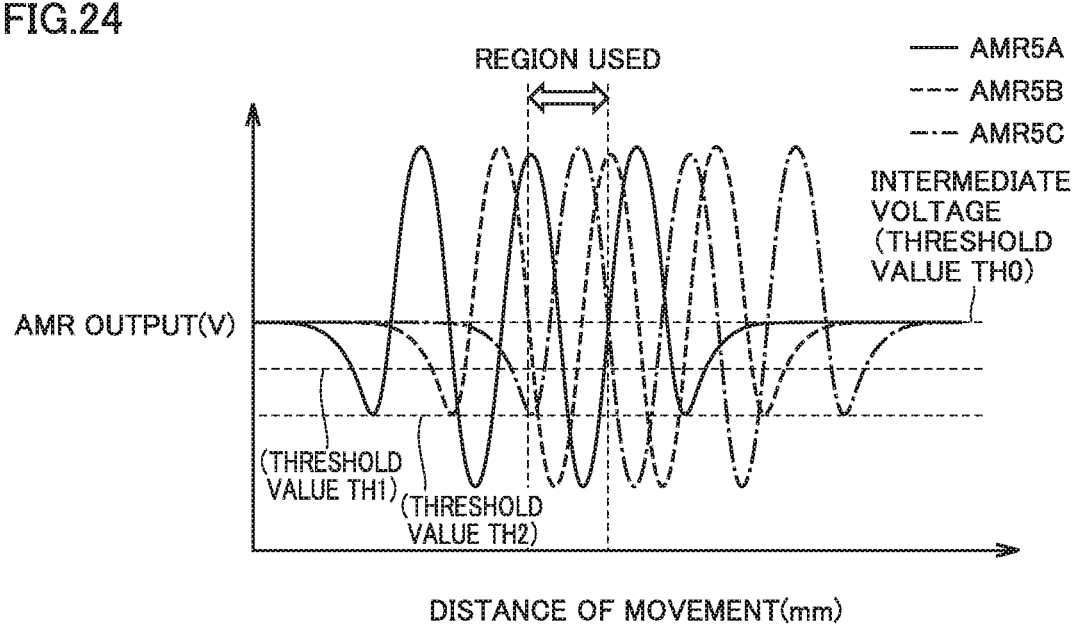

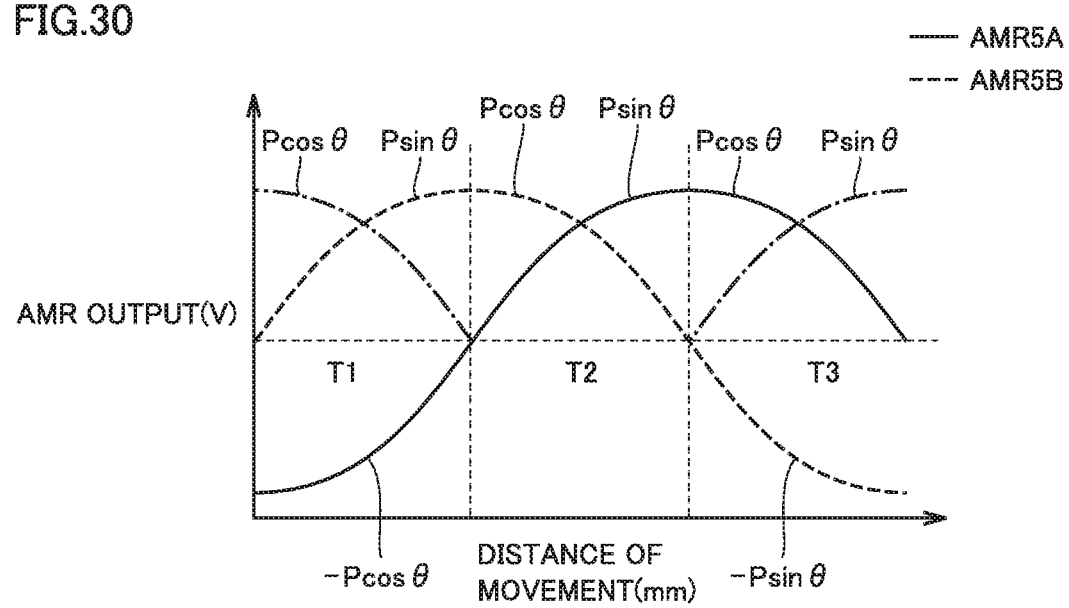

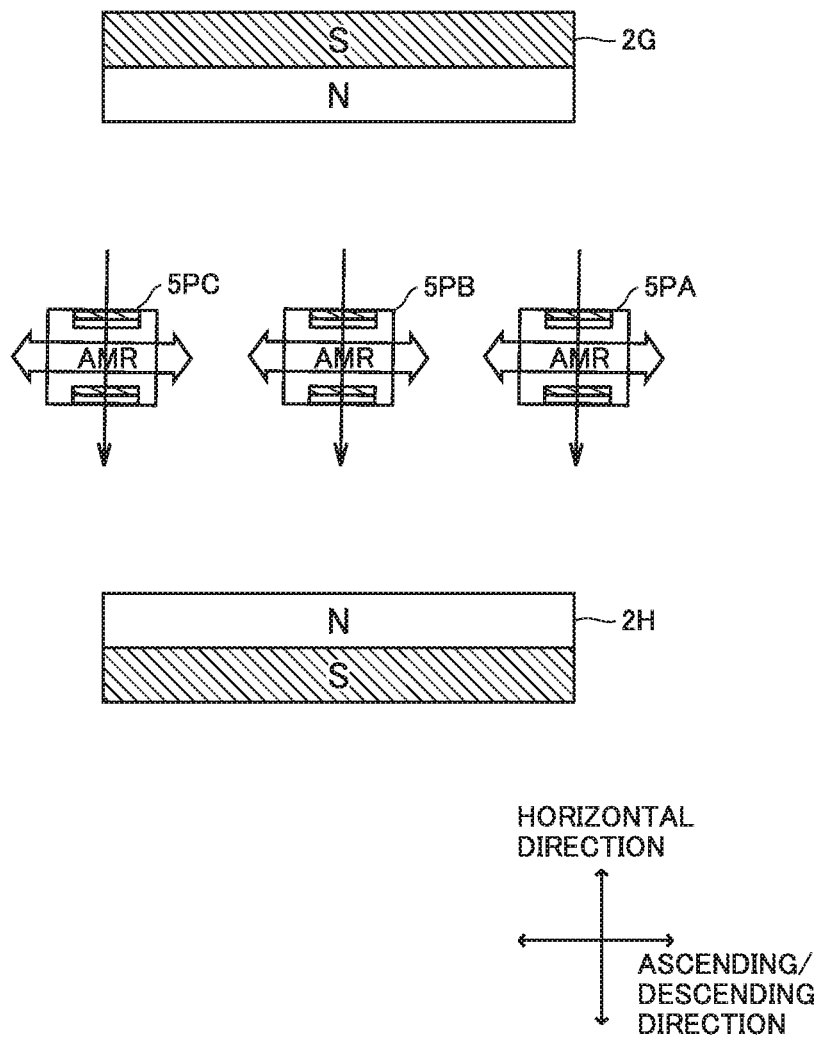

FIG.40
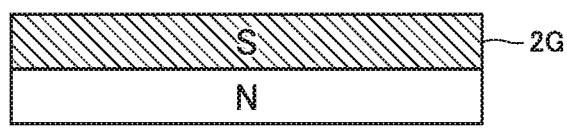
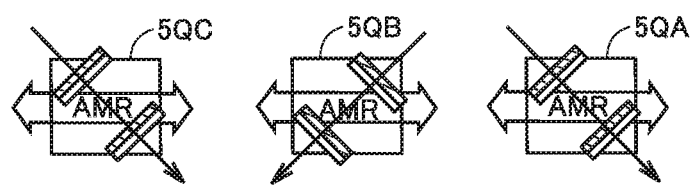
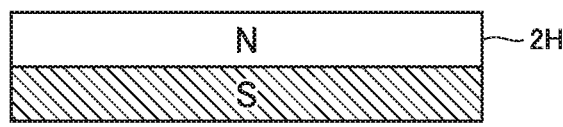
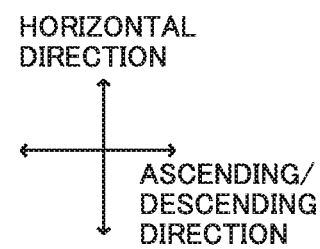

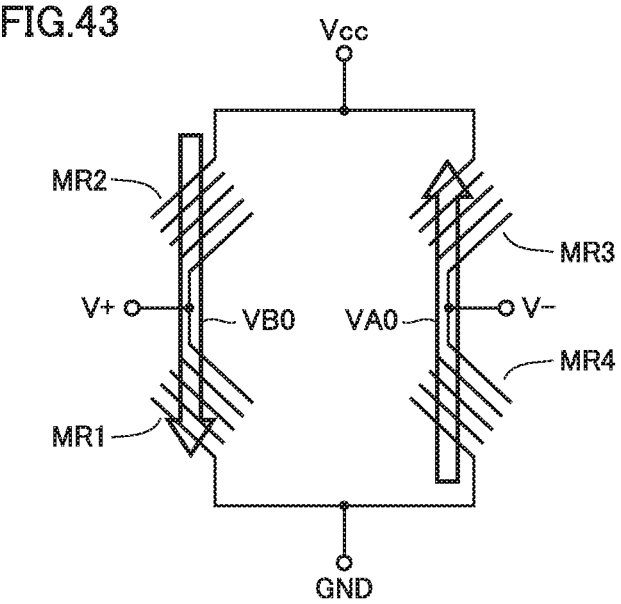

LIQUID LEVEL DETECTION DEVICE

CROSS REFERENCE TO RELATED APPLICATIONS

This application claims the benefit of priority to Japanese Patent Application No. 2015-077543 filed on Apr. 6, 2015 and Japanese Patent Application No. 2015-225838 filed on Nov. 18, 2015 and is a Continuation Application of PCT Application No. PCT/JP2016/055582 filed on Feb. 25, 2016. The entire contents of each application are hereby incorporated herein by reference.

BACKGROUND OF THE INVENTION

1. Field of the Invention

The present invention relates to a liquid level detection device, and specifically to a liquid level detection device mounted in a tank capable of storing liquid such as gasoline, engine oil, urea water or the like for an automobile and using a magnet to detect a position of a liquid level.

2. Description of the Related Art

Conventionally, a liquid level detection device including a magnet and a magnetic sensor has been known. For example, a liquid level detection device is known to include a float having a magnet and ascending and descending in response to positional variation of a liquid level and a magnetic sensor sensing the magnet's magnetic flux density and detects the position of the liquid level from a signal output from the magnetic sensor.

Japanese Patent Laying-Open No. 1-221620 discloses a level gage which includes a float 1, a cylindrical pipe 2 having float 1 disposed therein, a magnetized body 3 fixed to one end of float 1, and a magnetoresistive element 4 disposed in the vicinity of magnetized body 3, and detects the position of a liquid level by the position of magnetized body 3 corresponding to float 1 (see FIGS. 1 and 2).

Magnetized body 3 is magnetized to be (S-N, N-S, S-N, . . . ) . . . according to a predetermined magnetization pattern in a direction in which float 1 moves. Further, magnetized body 3 protrudes outside cylindrical pipe 2 through a through hole provided through a top surface of cylindrical pipe 2. Magnetoresistive element 4 is disposed outside cylindrical pipe 2 in the vicinity of magnetized body 3. Further, magnetoresistive element 4 includes eight resistance elements constituting two bridge circuits.

Japanese Patent Laying-Open No. 2002-22403 discloses a level gauge including a level sensor element 21, a liquid tank 18 having level sensor element 21 disposed therein, a displacing magnet 24 provided at an upper end of a detecting rod 23, and a detector body 25 attached to a sensor housing 20 and including a plurality of Hall devices 5s (see FIGS. 1 to 4 and FIGS. 12 and 13).

Detector body 25 is structured such that a plurality of Hall devices 5s are mounted linearly on a printed circuit board 6 in a predetermined spacing so as to be disposed in parallel with the moving direction of displacing magnet 24. Each Hall device 5a has a magnetically sensitive surface 5a directed substantially in parallel with the direction of magnetization of displacing magnet 24. Level sensor element 21 is hung in the tank downwardly through detecting rod 23 by a tension spring 22 secured at its upper end on the lower surface of sensor housing 22, and the upper end of detecting rod 23 extends into the interior of sensor housing 20. The level gauge measures the level of a liquid by detecting the displacement of the upper end of detecting rod 23 within sensor housing 20 by detector body 25 as the displacement of displacing magnet 24. Detector body 25 is connected through a control circuit 7 to an arithmetic circuit 8 calculating the position of the magnet on the basis of the output voltage derived from each Hall device, and converting thus obtained data on the position of the magnet into a value of a liquid level, and an output device 9 outputting to a screen or the like the value of the liquid level received from arithmetic circuit 8.

The level gage of Japanese Patent Laying-Open No. 1-221620 has magnetized body 3 protruding outside cylindrical pipe 2 through a through hole provided through a top surface of cylindrical pipe 2. For this reason, it is difficult to reduce it in size, and it may be difficult to mount it depending on the equipment.

The level gage of Japanese Patent Laying-Open No. 2002-22403 has detecting rod 23 and displacing magnet 24 protruding outside liquid tank 18 through a through hole provided through a top surface of liquid tank 18. For this reason, as well as the level gage of Japanese Patent Laying-Open No. 1-221620, it is difficult to reduce it in size, and it may be difficult to mount it depending on the equipment.

There is also a liquid level detection device proposed with a magnet disposed in a tank.

Japanese Patent Laying-Open No. 2009-236615 discloses a level gage which includes a float 23, a glass tube 21 having float 23 disposed therein, magnets 22A and 22B fixed to two opposite ends of float 23, and sensor units 31A to 31E mounted in a sensor case 32 disposed adjacent to glass tube 21, and detects the position of a liquid level from the positions of magnets 22A and 22B corresponding to float 23 (see FIGS. 2-4).

Magnets 22A and 22B are disposed at opposite ends of float 23 in its movement direction such that the magnets have magnetic poles of NS and SN in that direction. Sensor units 31A to 31E are disposed in the direction in which float 23 moves. Sensor units 31A to 31E include angle sensors 34A to 34E, respectively, that sense the magnetism of first magnet 22A and second magnet 22B in response to the displacement of float 23, and magnetic strength sensors 35A to 35E, respectively, that sense that float 23 has reached a vicinity thereof by magnetism.

Japanese Patent Laying-Open No. 2014-145714 discloses a liquid level detection device which includes a magnet 3, a tank 2 having magnet 3 disposed therein, a rod 4, a plurality of magnetic strength sensors S[1] to S[4], and a control unit 10, and detects the position of a liquid level from the position of magnet 3 (see FIGS. 1, 4, and 5).

Rod 4 has an elongate cylindrical shape and is disposed in tank 2 with an axial direction parallel to an upward/downward direction (a vertical direction). Magnet 3 is annular and is configured to float on the liquid surface of a liquid stored in tank 2. Rod 4 is inserted through magnet 3, and magnet 3 is floated on the liquid surface of the liquid stored in the tank 2 and in that condition, magnet 3 is guided by rod 4 to move in the upward/downward direction. The plurality of magnetic strength sensors S[1] to S[4] are embedded in rod 4 and spaced from one another and thus disposed in order successively from an upper side to a lower side.

Control unit 10 includes a differential value calculation unit 11 having a changeover switch 12 and a subtractor 13, and a microcomputer 20. Changeover switch 12 has input terminals I11, I12, I13, I21, I22, I23, and output terminals O1, O2. One of input terminals I11, I12, and I13 is connected to output terminal O1 by switching in response to a control signal from microcomputer 20. One of input terminals I21, I22, and I23 is connected to output terminal O2 by switching. Input terminal I11 is connected to magnetic strength sensor S[1]. Input terminal I12 is connected to magnetic strength sensor S[2]. Input terminal I13 is connected to magnetic strength sensor S[3]. Input terminal I21 is connected to magnetic strength sensor S[2]. Input terminal I22 is connected to magnetic strength sensor S[3]. Input terminal I23 is connected to magnetic strength sensor S[4]. Thus, changeover switch 12 is such that (1) when a voltage signal of magnetic strength sensor S[1] is output from output terminal O1, a voltage signal of magnetic strength sensor S[2] is output from output terminal O2, (2) when a voltage signal of magnetic strength sensor S[2] is output from output terminal O1, a voltage signal of magnetic strength sensor S[3] is output from output terminal O2, and (3) when a voltage signal of magnetic strength sensor S[3] is output from output terminal O1, a voltage signal of magnetic strength sensor S[4] is output from output terminal O2. Subtractor 13 has one input terminal to which output terminal O1 is connected, the other input terminal to which output terminal O2 is connected, and an output terminal which outputs a differential voltage signal.

Microcomputer 20 is connected to changeover switch 12 and subtractor 13. Microcomputer 20 includes a ROM having previously stored therein high-precision liquid level detection reference information G[1] to G[3] indicating a relationship between a differential value between voltage signals (output values) of adjacent magnetic strength sensors and the position of magnet 3 (that is, the level of the surface of the liquid stored in tank 2), standard-precision liquid level detection reference information H[1] to H[3], and a high-precision detection condition for determining which one of high-precision liquid level detection reference information G[1] to G[3] and standard-precision liquid level detection reference information H[1] to H[3] is used.

Microcomputer 20 further includes a CPU which performs signal-processing using a differential voltage signal of subtractor 13, high-precision liquid level detection reference information G[1] to G[3], standard-precision liquid level detection reference information H[1] to H[3], and the high-precision detection condition to detect the position of magnet 3, that is, the level of the surface of the liquid stored in tank 2.

Japanese Patent Laying-Open No. 2002-277308 discloses a liquid level detection device which includes a float 3, a tank having float 3 disposed therein, a substantially ring-shaped permanent magnet 5 fixed in a concave groove 3h of float 3, a guiding member 11 having a substantially cylindrical stem portion 13 inserted through a hole of float 3 for guiding float 3 to ascend and descend, and two Hall elements (a first Hall element 21 and a second Hall element 23) that is a magnetic sensor disposed in stem portion 13, and, a drive control circuit 31 for externally guiding an output of detection of a liquid level, and detects the position of the liquid level from the position of float 3 (permanent magnet 5) (see FIGS. 1 and 2).

Permanent magnet 5 has an inner circumferential surface 5n magnetized to be an N pole and an outer circumferential surface 5g magnetized to be an S pole. First Hall element 21 and second Hall element 23 are spaced in the vertical direction and thus secured. When a driving voltage is applied to first and second Hall elements 21 and 23, a magnetic flux density varying in response to an ascending/descending position of permanent magnet 5 disposed in float 3 following a liquid surface is detected, and an electrical signal corresponding to the magnetic flux density, more specifically, a voltage substantially linearly corresponding to the magnetic flux density, is output. Drive control circuit 31 has a first amplification circuit 33 for amplifying a voltage output from first Hall element 21 and a second amplification circuit 35 for amplifying a voltage output from second Hall element 23. First amplification circuit 33 and second amplification circuit 35 indicate similar amplification rates.

The voltage output from first Hall element 21 is amplified by first amplification circuit 33 at a prescribed rate. The amplified output voltage is input to an output adjustment circuit 37 and an inversion and amplification circuit 41, and a voltage corresponding to a liquid level is externally output from output adjustment circuit 37. Furthermore, the voltage output from second Hall element 23 is amplified by second amplification circuit 35 at a prescribed rate. The amplified output voltage is input to inversion and amplification circuit 41. Inversion and amplification circuit 41 receives an output voltage obtained by amplifying the output of first Hall element 21 and an output voltage obtained by amplifying the output of second Hall element 23 composited together, which is used for feedback control of driving first and second Hall elements 21 and 23. A magnetic flux density, that is, a liquid level, can be accurately measured irrespective of variation in liquid temperature and an influence of variation in characteristics of permanent magnet 5.

However, the level gage disclosed in Japanese Patent Laying-Open No. 2009-236615 that includes sensor units 31A to 31E including angle sensors 34A to 34E, respectively, and magnetic strength sensors 35A to 35E, respectively, and further includes an output monitor circuit to which angle sensors 34A to 34E are connected and a switching circuit 12 to which magnetic strength sensors 35A to 35E are connected, is difficult to have a circuit configuration reduced in size. Furthermore, when angle sensors 34A to 34E and magnetic strength sensors 35A to 35E are GMR elements, a magnetic field strength of 30 to 200 G can be accommodated, however, when a magnetic field larger than 200 G is applied, magnetic saturation occurs and detection cannot be done. This results in a small degree of freedom for magnets 22A and 22B in type and position. In particular, for some magnets 22A and 22B, a distance between angle sensors 34A to 34E and magnetic strength sensors 35A to 35E, and magnets 22A and 22B cannot be shortened, and it is difficult to provide a circuit configuration reduced in size.

The liquid level detection device described in Japanese Patent Laying-Open No. 2014-145714 requires changeover switch 12, subtractor 13, and a ROM for microcomputer 20, and accordingly has a complicated circuit configuration and is also difficult to miniaturize.

The liquid level detection device described in Japanese Patent Laying-Open No. 2002-277308 detects a liquid level by first Hall element 21 alone, and in order to correct an influence of variation in liquid temperature and variation in characteristics of permanent magnet 5, the liquid level detection device requires second Hall element 23 and a feedback control circuit including inversion and amplification circuit 41, and accordingly, has a complicated circuit configuration and is also difficult to miniaturize.

SUMMARY OF THE INVENTION

Preferred embodiments of the present invention provide liquid level detection devices that have a simplified and miniaturized circuit configuration.

According to one aspect of a preferred embodiment of the present invention, a liquid level detection device includes: a float that ascends and descends following a liquid level; a magnet attached to the float; a guide that guides the float to ascend and descend; a plurality of magnetic sensors attached to the guide, and sensing a magnetic flux density varying in response to a position assumed by the magnet as the magnet ascends/descends, and outputting an electrical signal corresponding to the magnetic flux density; and a detection circuit that detects a position of the float based on electrical signals respectively output from the plurality of magnetic sensors. The detection circuit detects the position of the float based on electrical signals output from two adjacent ones of the plurality of magnetic sensors.

Preferably, each magnetic sensor includes a bias magnet.

Preferably, the magnetic sensors each output an electrical signal based on a magnetic vector of a line of magnetic force generated by the magnet.

Preferably, the detection circuit extracts electrical signals output from two adjacent magnetic sensors based on a comparison with an intermediate voltage among electrical signals respectively output from the plurality of magnetic sensors.

Preferably, the detection circuit calculates angular information with the two extracted electrical signals having one electrical signal represented as a sine wave and the other electrical signal represented as a cosine wave, and detects the position of the float based on the calculated angular information.

Preferably, the magnet includes at least one magnet units with magnetic poles identical in polarity facing each other with the guide interposed.

Preferably, the magnet includes a plurality of magnet units. The magnet units are each disposed in an ascending/descending direction, and adjacent ones of the magnet units have facing magnetic poles, respectively, different in polarity.

Preferably, the plurality of magnetic sensors include first to third magnetic sensors disposed in order in an ascending/descending direction. Regarding first to third electrical signals output from the first to third magnetic sensors, respectively, the detection circuit calculates angular information according to a combination in magnitude of the first to third electrical signals, with the first and second electrical signals having one electrical signal represented as a sine wave and the other electrical signal represented as a cosine wave, and detects the position of the float based on the calculated angular information.

Preferably, the detection circuit extracts the first and second electrical signals in accordance with a relationship between the first to third electrical signals respectively output from the first to third magnetic sensors and a plurality of predetermined threshold values.

Preferably, the detection circuit divides the first to third electrical signals respectively output from the first to third magnetic sensors into a plurality of regions in accordance with a relationship between the first to third electrical signals respectively output from the first to third magnetic sensors and a plurality of predetermined threshold values, and extracts the first and second electrical signals in the regions.

Preferably, bias magnetic field vectors of mutually adjacent magnetic sensors are set to be symmetrical in direction with respect to a horizontal direction perpendicular to a direction in which the float ascends/descends.

Preferably, each magnetic sensor includes: first to fourth magnetoresistive elements to which a bias magnetic field vector generated by the bias magnet is applied; and an output circuit which outputs an electrical signal corresponding to variation of a resistance value of the first to fourth magnetoresistive elements based on variation of the bias magnetic field vector.

Preferably, a first bias magnetic field vector generated by the bias magnet is applied to the first and second magnetoresistive elements. A second bias magnetic field vector generated by the bias magnet opposite in direction to the first bias magnetic field vector is applied to the third and fourth magnetoresistive elements. The first and second magnetoresistive elements and the third and fourth magnetoresistive elements are disposed axisymmetrically with respect to an ascending/descending direction in which the first to fourth magnetoresistive elements are provided.

Preferably, the bias magnet is disposed such that the bias magnetic field vector applied to the first to fourth magnetoresistive elements has a direction in a horizontal direction perpendicular to a direction in which the float ascends/descends.

Liquid level detection devices according to preferred embodiments of the present invention thus have a simplified and miniaturized circuit configuration.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram for illustrating a pattern of a magnetoresistive element of magnetic sensor 5 according to the first preferred embodiment of the present invention.

FIG. 11 is a diagram for schematically illustrating a relationship between magnetic sensor 5 and a magnetic vector P according to the first preferred embodiment of the present invention.

FIG. 18 is a diagram for schematically illustrating a relationship between magnetic sensor 5 and magnetic vector P according to the second preferred embodiment of the present invention.

FIG. 20 is a diagram for illustrating a layout of magnets 2I-2T attached to float 20 and magnetic sensors 5A, 5B, 5C according to a third preferred embodiment of the present invention.

FIG. 21 illustrates waveforms of signals output from magnetic sensors 5 as float 20 ascends/descends in the third preferred embodiment of the present invention.

FIG. 24 is a diagram for illustrating a method of extracting waveforms of two signals output in each of regions T1 to T3 from waveforms of signals output from a plurality of magnetic sensors 5A to 5C according to the third preferred embodiment of the present invention.

FIG. 30 is an enlarged image of a prescribed region of FIG. 29.

FIG. 37 is a diagram for illustrating a layout of magnets 2G and 2H attached to float 20 and magnetic sensors according to the fifth preferred embodiment of the present invention.

FIG. 40 is a diagram for illustrating a layout of magnets 2G and 2H attached to float 20 and a plurality of magnetic sensors 5Qs according to an exemplary variation of the fifth preferred embodiment of the present invention.

FIG. 43 illustrates a circuit configuration of a magnetic sensor 5R.

DETAILED DESCRIPTION OF THE PREFERRED EMBODIMENTS

Preferred embodiments of the present invention will be described hereinafter in detail with reference to the drawings. Note that in the figures, identical or corresponding components are identically denoted, and accordingly, will not be described redundantly.

First Preferred Embodiment

Figure 1:
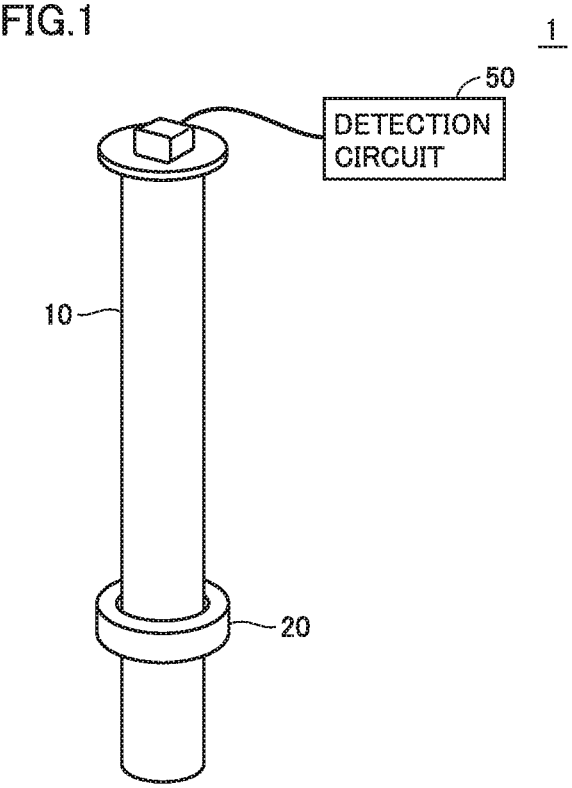
FIG. 1 is a diagram for illustrating an external configuration of a liquid level detection device according to a first preferred embodiment of the present invention.

FIG. 1 is a diagram for illustrating an external configuration of a liquid level detection device according to a first preferred embodiment of the present invention.

With reference to FIG. 1, liquid level detection device 1 includes a float 20 that ascends and descends following a liquid level, a guide (a guide) 10, and a detection circuit 50.

Detection circuit 50 detects the position of float 20 based on output signals detected from a plurality of magnetic sensors (AMR (Anisotropic Magneto Resistance) elements) attached to guide 10.

Figure 2:
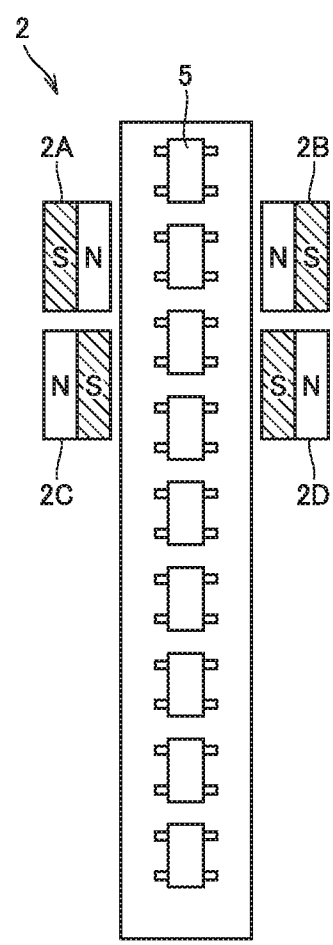
FIG. 2 is a diagram for illustrating a plurality of magnetic sensors 5 attached to a guide 10 according to the first preferred embodiment of the present invention.

FIG. 2 is a diagram for illustrating a plurality of magnetic sensors 5 attached to guide 10 according to the first preferred embodiment.

Referring to FIG. 2, the plurality of magnetic sensors are disposed at predetermined intervals in an ascending/descending direction.

Float 20 is provided with a magnet 2. Specifically, magnets 2A, 2B, 2C and 2D are attached as two magnet units. Magnets 2A and 2B define a magnet unit. Magnets 2C and 2D define a magnet unit.

The plurality of magnetic sensors 5 sense a magnetic flux density according to an ascending/descending movement of magnet 2 attached to float 20, and output an electrical signal corresponding to the magnetic flux density. While in this example, a configuration of 4-pin magnetic sensor 5 will be described as one example, the number of pins is not limited thereto, and those skilled in the art would be able to redesign it as appropriate.

Figure 3:
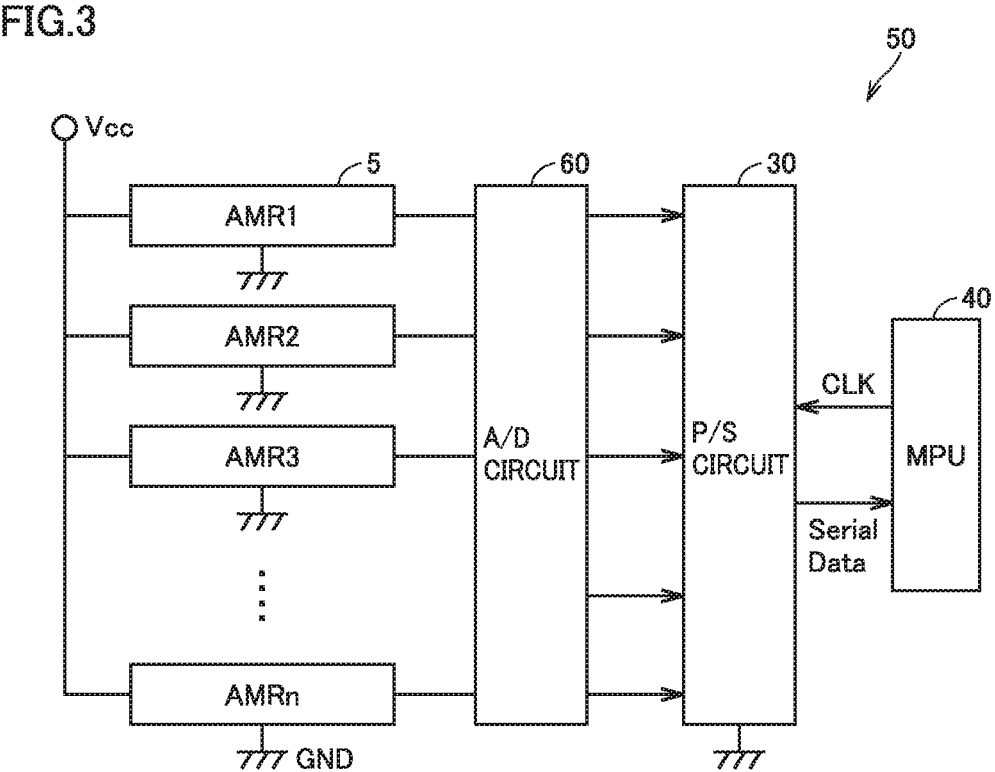
FIG. 3 is a circuit configuration diagram of liquid level detection device 1 according to the first preferred embodiment of the present invention.

FIG. 3 is a circuit configuration diagram of liquid level detection device 1 according to the first preferred embodiment. Referring to FIG. 3, liquid level detection device 1 according to the first preferred embodiment includes the plurality of magnetic sensors (AMR elements) 5 and detection circuit 50. In this example, a case where n magnetic sensors are provided is shown.

Detection circuit 50 includes an A/D circuit 60 which is an analog/digital conversion circuit, a P/S conversion circuit 30 which is a parallel/serial conversion circuit, and an MPU (Micro-processing unit) 40 which performs a computing process.

A/D circuit 60 is connected to the plurality of (or n) magnetic sensors 5 and converts a received analog signal into a digital signal.

P/S conversion circuit 30 receives digital signals input from A/D circuit 60 in parallel in synchronization with a clock CLK received from MPU 40, converts the received digital signals serially to a signal, and outputs it to MPU 40.

MPU 40 computes signals output from the plurality of (or n) magnetic sensors 5 and received from P/S conversion circuit 30 and detects the position of float 20.

While in this example MPU 40 is described such that it is configured to receive for a signal output from A/D circuit 60 an output of P/S conversion circuit 30 synchronized with clock CLK, it is not limited to this configuration and may also be changed to a configuration to receive a digital signal from A/D circuit 60 via a multiplexer.

FIG. 4 is a diagram for illustrating a pattern of a magnetoresistive element of magnetic sensor 5 according to the first preferred embodiment.

Referring to FIG. 4, magnetic sensor 5 has a bridge structure including four magnetoresistive elements MR1 to MR4 (collectively referred to as a magnetoresistive element MR).

When a magnetic field is applied to magnetic sensor 5, magnetoresistive elements MR1 to MR4 have their resistance values varied, and in response thereto, magnetic sensor 5 outputs signals V+ and V−. Magnetic sensor 5 outputs a difference ΔV between signals V+ and V−.

Magnetoresistive element MR of magnetic sensor 5 is an anisotropic magnetoresistive element and has a folded pattern structure.

A resistance value of magnetoresistive element MR when a magnetic field is applied thereto has a characteristic which is minimized when a magnetic field perpendicular (i.e., 90 degrees) to the element's longitudinal direction (or a direction of a current) is applied and which is maximized when a magnetic field parallel (i.e., 0 degree) to the element's longitudinal direction is applied.

Furthermore, magnetic sensor 5 is provided with bias magnets 3A and 3B. Bias magnets 3A and 3B are disposed such that a bias magnetic field is applied to magnetoresistive elements MR1 to MR4 in a direction from an upper left side to a lower right side.

Although magnetoresistive element MR of magnetic sensor 5 of this example is described as a folded pattern structure by way of example, it is not limited to the folded shape in particular, and a person skilled in the art would be able to redesign the pattern structure as appropriate to allow magnetic sensor 5 to have enhanced detection characteristics. Furthermore, while bias magnets 3A and 3B are arranged (or oriented) in this example such that a bias magnetic field vector with an angle of 45 degrees is applied in a direction from an upper left side to a lower right side by way of example, this arrangement or angle can also be redesigned by a skilled artisan as appropriate to allow magnetic sensor 5 to have enhanced detection characteristics.

Furthermore, while in this example a configuration will be described in which a bias magnetic field vector is applied based on two bias magnets 3A, 3B, it is also possible to dispose one bias magnet 3A instead of two bias magnets at a center portion of magnetoresistive elements MR1 to MR4 with an inclination of 45 degrees to apply a similar bias magnetic field vector. By this configuration, the number of bias magnets and hence the cost of magnetic sensor 5 is able to be reduced. Alternatively, a bias magnet may be disposed on a substrate provided with magnetoresistive elements MR1 to MR4, or a bias magnet may be disposed on a back surface of the substrate.

Figure 5A:
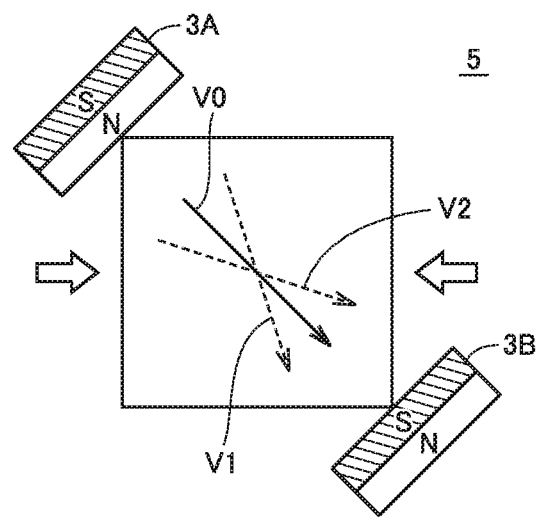
FIGS. 5A and 5B are diagrams for illustrating a principle of detection via magnetic sensor 5 according to the first preferred embodiment of the present invention.
Figure 5B:
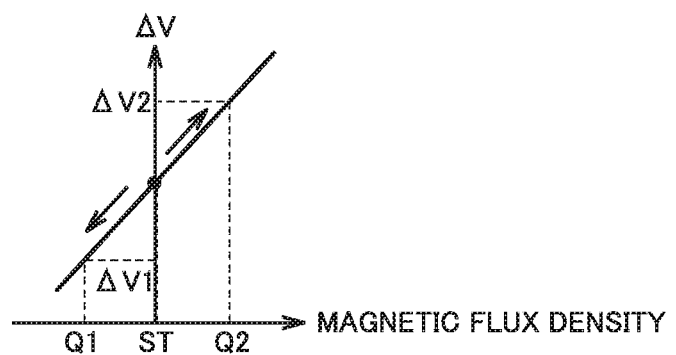

FIGS. 5A and 5B are diagrams for illustrating a principle of detection via magnetic sensor 5 according to the first preferred embodiment.

FIG. 5A is a diagram for illustrating a bias magnetic field vector varying with an external magnetic field.

As shown in FIG. 5A, the bias magnetic field vector of magnetic sensor 5 has a direction varying with an external magnetic field with respect to an ascending/descending direction. In this example, a bias magnetic field vector V0 with no external magnetic field applied is indicated by a solid line. The bias magnets are set to attain a magnetic field strength allowing magnetic sensor 5 to reach a saturated sensitivity region.

Bias magnetic field vector V0 varies to a bias magnetic field vector V1 according to an external magnetic field (applied in a right to left direction).

In contrast, bias magnetic field vector V0 varies to a bias magnetic field vector V2 according to an external magnetic field (applied in a left to right direction).

The bias magnetic field vector varies as the external magnetic field's magnetic flux density varies. Magnetic sensor 5 detects variation of the bias magnetic field vector and outputs a signal (a potential difference ΔV) corresponding to the result of the detection.

FIG. 5B shows a characteristic of variation of a signal output from magnetic sensor 5 according to variation in magnetic flux density of an external magnetic field.

As shown in FIG. 5B, a predetermined magnetic flux density ST is applied based on a bias magnetic field according to bias magnets 3A and 3B. The output in this case is preferably set to an intermediate value, and potential difference ΔV varies as a magnetic field applied to magnetic sensor 5 varies in direction.

Potential difference ΔV shifts toward ΔV1 in response to variation in magnetic flux density of an external magnetic field in a right to left direction.

In contrast, potential difference ΔV shifts toward ΔV2 in response to variation in magnetic flux density of an external magnetic field in a left to right direction.

According to an increase/decrease of potential difference ΔV from the intermediate value, a polarity of the magnetic field applied to magnetic sensor 5 (in which direction the magnetic field is applied) is able to be sensed. Further, saturated magnetic field strength is also able to be increased by changing bias magnets 3A, 3B in magnetic force strength.

As will be described hereinafter, the position of float 20 is able to be detected based on a signal waveform (potential difference ΔV) corresponding variation in magnetic flux density of the external magnetic field.

Figure 6:
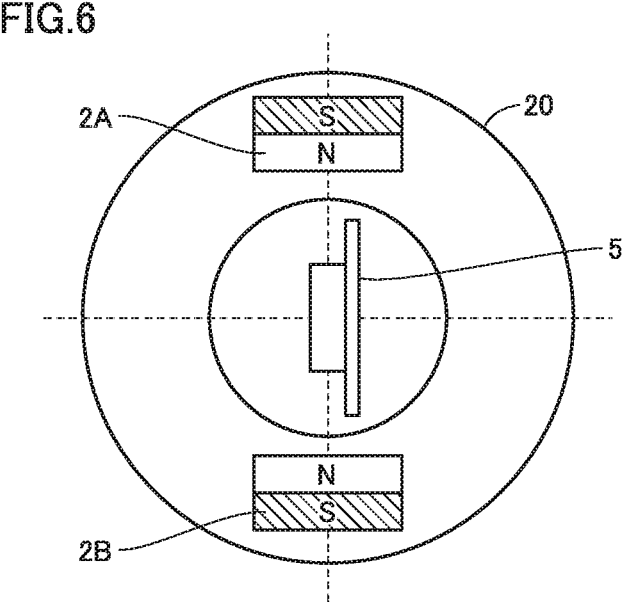
FIG. 6 is a diagram for illustrating an arrangement of magnet 2 attached to a float 20 according to the first preferred embodiment of the present invention.

FIG. 6 is a diagram for illustrating an arrangement of magnet 2 attached to float 20 according to the first preferred embodiment.

FIG. 6 shows a case in which float 20 is viewed from above. Furthermore, magnets 2A and 2B defining a magnet unit are provided to face each other with a guide interposed therebetween. In this example, magnets 2A and 2B are disposed opposite to each other with their respective N poles facing each other. Magnets 2A and 2B may be disposed opposite to each other with their respective S poles facing each other.

This arrangement allows the magnetic force to have a direction along the guide and cancels a magnetic force component having a direction perpendicular to the direction along the guide. Furthermore, even when float 20 rotates, the magnetic force's direction, the magnetic flux density and the like do not have substantial variation, and magnetic sensor 5 accurately measures an amount of displacement of the magnetic flux density.

Figure 7:
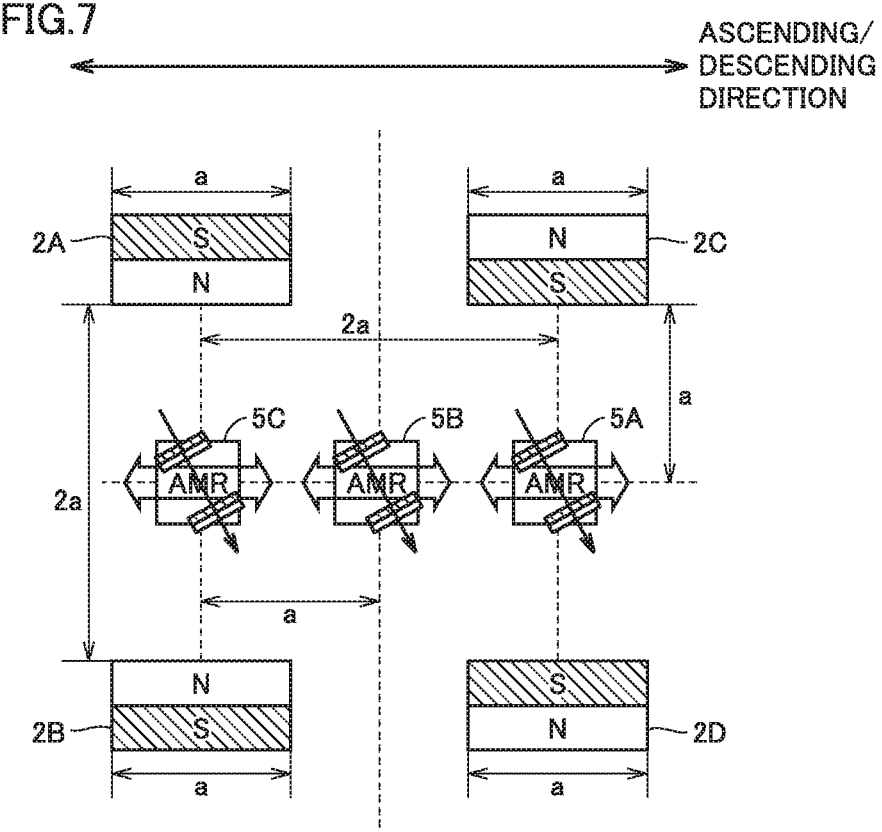
FIG. 7 is a diagram for illustrating a layout of magnets 2A to 2D attached to float 20 and magnetic sensors 5A to 5C according to the first preferred embodiment of the present invention.

FIG. 7 is a diagram for illustrating a layout of magnets 2A to 2D attached to float 20 and magnetic sensors 5A to 5C according to the first preferred embodiment.

As shown in FIG. 7, magnets 2A, 2B define a set to define a magnet unit. Magnets 2C, 2D define a set to define a magnet unit.

Magnets 2A and 2B defining a magnet unit are disposed to have their respective N poles facing each other. Magnets 2C and 2D defining a magnet unit are disposed to have their respective S poles facing each other. Adjacent magnet units are disposed such that their magnets' magnetic poles are different.

In this example, a distance between magnet 2A and magnet 2B is preferably set to a spacing of twice a distance a, and magnetic sensors 5 are disposed to pass through a center thereof. An interval (or center-to-center distance) between the adjacent magnet units is also set to twice distance a. Magnetic sensors 5 are also disposed at intervals of a distance a. Magnetic sensors 5 are attached to the guide in the ascending/descending direction.

While in this example a case where three magnetic sensors 5A to 5C are disposed to detect the position of float 20 will be described, a case where more magnetic sensors are disposed is also similarly discussed.

In this example, as a position of float 20, for example, a center of magnet 2A and magnet 2C (or magnet 2B and magnet 2D) in the ascending/descending direction is set as a reference position (or a center point). In this case, a case where magnetic sensor 5B is positioned at the reference position (or center point) is shown.

FIGS. 8A-8G are diagrams for illustrating a relationship of float 20 with magnetic sensors according to the first preferred embodiment when float 20 positionally varies as it ascends/descends.

In this example, a case where float 20 varies in a right to left direction (an ascending direction by way of example) will be described.

Figure 8A:
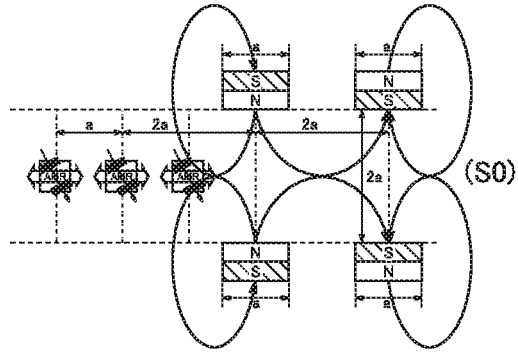
FIGS. 8A-8G are diagrams for illustrating a relationship of float 20 with magnetic sensors according to the first preferred embodiment of the present invention when float 20 positionally varies as it ascends/descends.

In FIG. 8A, a case where float 20 ascends and approaches magnetic sensor 5A (i.e., a state S0) is shown.

Magnetic sensor 5A is affected by a magnetic field (or a line of magnetic force) generated by magnets 2A and 2B of float 20. Specifically, magnetic sensor 5A is affected by a right to left magnetic field as a line of magnetic force of magnets 2A and 2B. Accordingly, bias magnetic field vector V0 of magnetic sensor 5A varies toward the bias magnetic field vector V1 side. As the bias magnetic field vector varies, potential difference ΔV decreases. The other magnetic sensors 5B and 5C are also affected by a right to left magnetic field as a line of magnetic force of magnets 2A and 2B. As the bias magnetic field vector varies toward the bias magnetic field vector V1 side, potential difference ΔV decreases.

Figure 8B:
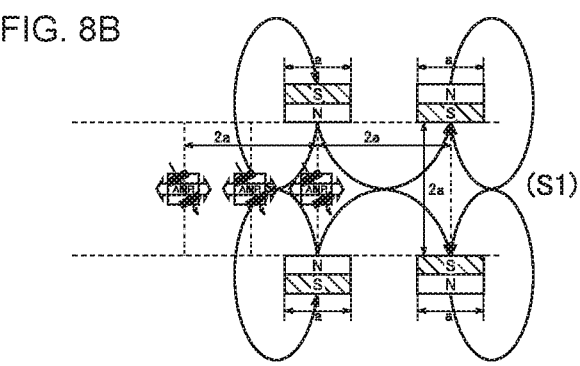

In FIG. 8B, a case where float 20 further ascends from FIG. 8A by distance a (i.e., a state S1) is shown.

Magnetic sensor 5A is in a state where it is located on a center line between magnet 2A and magnet 2B. In this example, this state is set as an initial state.

Magnetic sensor 5B is affected by a right to left magnetic field as a line of magnetic force of magnets 2A and 2B. Accordingly, bias magnetic field vector V0 of magnetic sensor 5B varies toward the bias magnetic field vector V1 side. As the bias magnetic field vector varies, potential difference ΔV decreases. Magnetic sensor 5C is also affected by a right to left magnetic field as a line of magnetic force of magnets 2A and 2B. As the bias magnetic field vector varies toward the bias magnetic field vector V1 side, potential difference ΔV decreases.

Figure 8C:
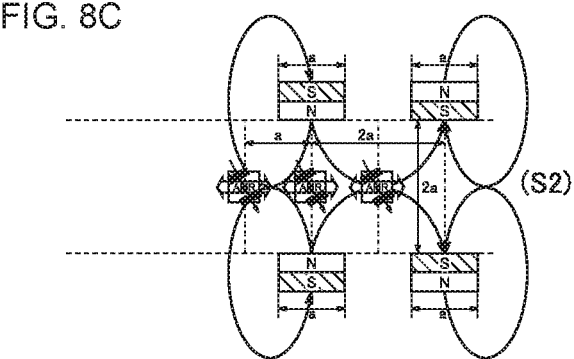

In FIG. 8C, a case where float 20 further ascends from FIG. 8B by distance a (i.e., a state S2) is shown.

A case is shown in which magnetic sensor 5A is exposed to a magnetic field maximally in the ascending/descending direction by a magnetic field generated by magnets 2A, 2B, 2C, 2D. Specifically, magnetic sensor 5A is affected by a left to right magnetic field as a line of magnetic force from magnet 2A to magnet 2C (or a line of magnetic force from magnet 2B to magnet 2D). Accordingly, bias magnetic field vector V0 of magnetic sensor 5A varies toward the bias magnetic field vector V2 side. As the bias magnetic field vector varies toward the bias magnetic field vector V2 side, potential difference V increases (or is maximized).

Magnetic sensor 5B is in a state where it is located on the center line between magnet 2A and magnet 2B. Thus, it is in the initial state.

Magnetic sensor 5C is affected by a magnetic field generated by magnets 2A and 2B. Specifically, magnetic sensor 5C is affected by a right to left magnetic field as a line of magnetic force of magnets 2A and 2B. As the bias magnetic field vector varies toward the bias magnetic field vector V1 side, potential difference ΔV decreases.

Figure 8D:
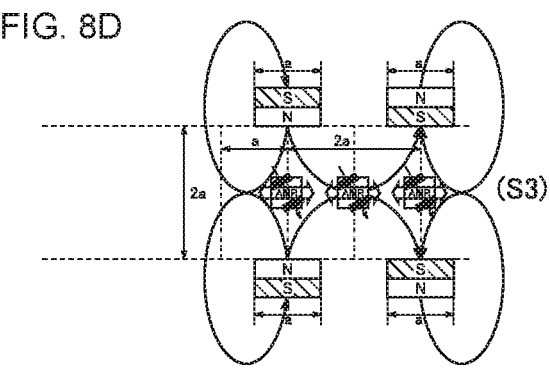

In FIG. 8D, a case where float 20 further ascends from FIG. 8C by distance a (i.e., a state S3) is shown.

Magnetic sensor 5A is in a state where it is located on the center line between magnet 2C and magnet 2D. Thus, it is in the initial state.

A case is shown in which magnetic sensor 5B is exposed to a magnetic field maximally in the ascending/descending direction by a magnetic field generated by magnets 2A, 2B, 2C, 2D. Specifically, magnetic sensor 5B is affected by a left to right magnetic field as a line of magnetic force from magnet 2A to magnet 2C (or a line of magnetic force from magnet 2B to magnet 2D). Accordingly, bias magnetic field vector V0 of magnetic sensor 5B varies toward the bias magnetic field vector V2 side. As the bias magnetic field vector varies toward the bias magnetic field vector V2 side, potential difference ΔV increases (or is maximized).

Magnetic sensor 5C is in a state where it is located on the center line between magnet 2A and magnet 2B. Thus, it is in the initial state.

Figure 8E:
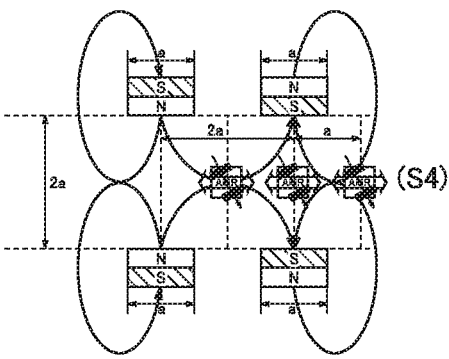

In FIG. 8E, a case where float 20 further ascends from FIG. 8D by distance a (i.e., a state S4) is shown.

A case is shown in which magnetic sensor 5A is exposed to a magnetic field in the ascending/descending direction by a magnetic field generated by magnets 2C, 2D. Specifically, magnetic sensor 5A is affected by a right to left magnetic field as a line of magnetic force of magnets 2C and 2D. Accordingly, bias magnetic field vector V0 of magnetic sensor 5A varies toward the bias magnetic field vector V1 side. As the bias magnetic field vector varies toward the bias magnetic field vector V1 side, potential difference ΔV decreases.

Magnetic sensor 5B is in a state where it is located on the center line between magnet 2C and magnet 2D. Thus, it is in the initial state.

A case is shown in which magnetic sensor 5C is exposed to a magnetic field maximally in the ascending/descending direction by a magnetic field generated by magnets 2A, 2B, 2C, 2D. Specifically, magnetic sensor 5C is affected by a left to right magnetic field as a line of magnetic force from magnet 2A to magnet 2C (or a line of magnetic force from magnet 2B to magnet 2D). Accordingly, bias magnetic field vector V0 of magnetic sensor 5C varies toward the bias magnetic field vector V2 side. As the bias magnetic field vector varies toward the bias magnetic field vector V2 side, potential difference ΔV increases (or is maximized).

Figure 8F:
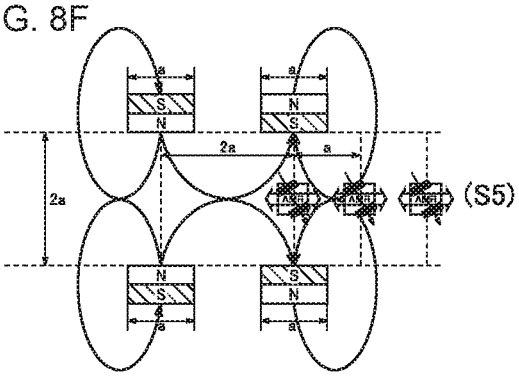

In FIG. 8F, a case where float 20 further ascends from FIG. 8E by distance a (i.e., a state S5) is shown.

Magnetic sensor 5A is affected by a magnetic field generated by magnets 2C and 2D. Specifically, magnetic sensor 5A is affected by a right to left magnetic field as a line of magnetic force of magnets 2C and 2D. Accordingly, bias magnetic field vector V0 of magnetic sensor 5A slightly varies toward the bias magnetic field vector V1 side. As the bias magnetic field vector varies toward the bias magnetic field vector V1 side, potential difference ΔV decreases.

A case is shown in which magnetic sensor 5B is exposed to a magnetic field in the ascending/descending direction by a magnetic field generated by magnets 2C and 2D. Specifically, magnetic sensor 5B is affected by a right to left magnetic field as a line of magnetic force of magnets 2C and 2D. Accordingly, bias magnetic field vector V0 of magnetic sensor 5B varies toward the bias magnetic field vector V1 side. As the bias magnetic field vector varies toward the bias magnetic field vector V1 side, potential difference ΔV decreases.

Magnetic sensor 5C is in a state where it is located on the center line between magnet 2C and magnet 2D. Thus, it is in the initial state.

Figure 8G:
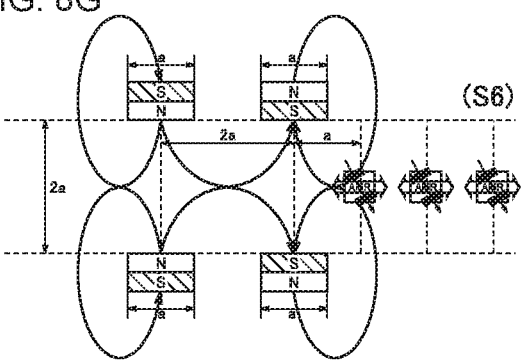

In FIG. 8G, a case where float 20 further ascends from FIG. 8F by distance a (i.e., a state S6) is shown.

Magnetic sensors 5A and 5B are slightly affected by a magnetic field generated by magnets 2C and 2D. Specifically, magnetic sensors 5A and 5B are affected by a right to left magnetic field as a line of magnetic force of magnets 2C and 2D. Accordingly, bias magnetic field vector V0 of each of magnetic sensors 5A and 5B slightly varies toward the bias magnetic field vector V1 side. As the bias magnetic field vector varies toward the bias magnetic field vector V1 side, potential difference ΔV decreases.

A case is shown in which magnetic sensor 5C is exposed to a magnetic field in the ascending/descending direction by a magnetic field generated by magnets 2C and 2D. Specifically, magnetic sensor 5C is affected by a right to left magnetic field as a line of magnetic force of magnets 2C and 2D. Accordingly, bias magnetic field vector V0 of magnetic sensor 5C varies toward the bias magnetic field vector V1 side. As the bias magnetic field vector varies toward the bias magnetic field vector V1 side, potential difference ΔV decreases.

Figure 9:
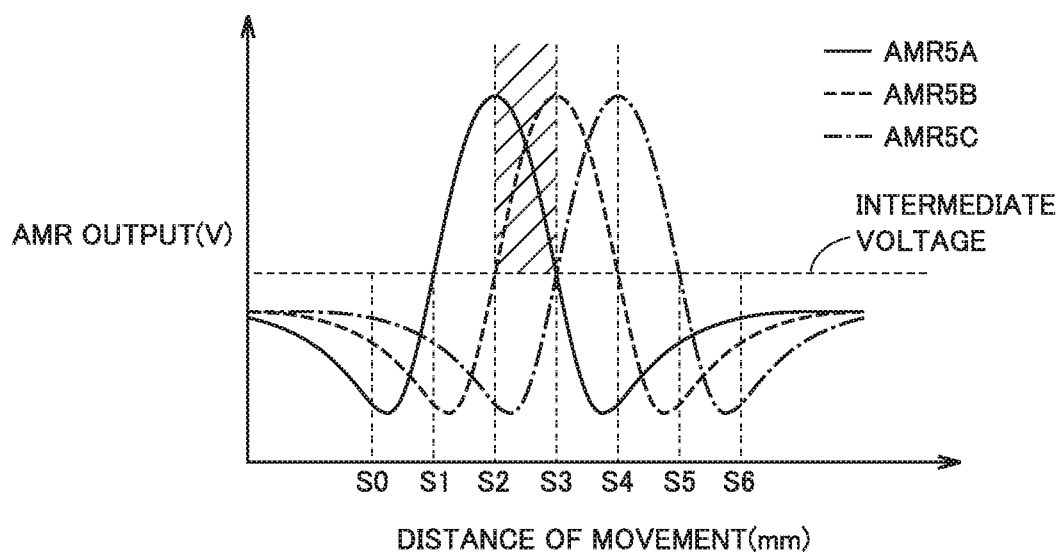
FIG. 9 illustrates waveforms of signals output from a plurality of magnetic sensors as float 20 ascends/descends in the first preferred embodiment of the present invention.

FIG. 9 illustrates waveforms of signals output from a plurality of magnetic sensors as float 20 ascends/descends in the first preferred embodiment.

As shown in FIG. 9, a positional relationship of states S0 to S6 and a relationship of the signals output is shown. For example, when focusing on magnetic sensor 5A, magnetic sensor 5A outputs a signal corresponding to a magnetic flux density of an external magnetic field received by magnetic sensor 5A.

In state S0, a case is shown in which in accordance with an external magnetic field received by magnetic sensor 5A the bias magnetic field vector varies and is decreased as an output signal (or potential difference ΔV).

In state S1, magnetic sensor 5A is located on the center line between magnets 2A and 2B, or in the initial state, and in this example, magnetic sensor 5A in the initial state outputs a signal (potential difference ΔV) with a voltage having an intermediate value (i.e., an intermediate voltage).

In state S2, a case is shown where magnetic sensor 5A outputs a maximized signal when the bias magnetic field vector of magnetic sensor 5A varies toward the bias magnetic field vector V2 side.

In state S3, a case is shown where magnetic sensor 5A is located on the center line between magnets 2C and 2D, or in the initial state, and outputs the intermediate voltage.

In state S4, a case is shown in which in accordance with an external magnetic field received by magnetic sensor 5A the bias magnetic field vector varies and the output signal (or potential difference ΔV) is decreased.

In state S4 et seq., a case is shown where the signal output from magnetic sensor 5A varies based on an external magnetic field varying with distance.

Furthermore, for magnetic sensor 5B, a waveform obtained by shifting the output signal of magnetic sensor 5A by distance a (or by a phase of 90 degrees) is shown. For magnetic sensor 5C, a waveform obtained by shifting the output signal of magnetic sensor 5B by distance a (or by a phase of 90 degrees) is shown.

Figure 10:
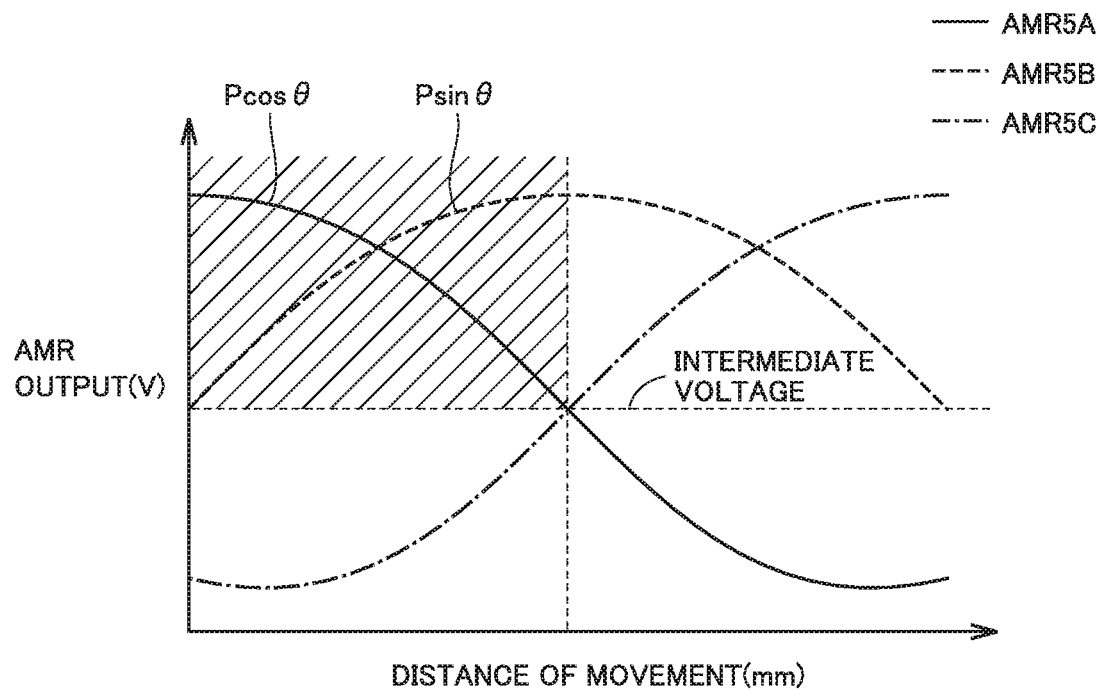
FIG. 10 is an enlarged image of a prescribed region of FIG. 9.

FIG. 10 is an enlarged image of a prescribed region of FIG. 9.

FIG. 10 represents waveforms of signals output from a plurality of magnetic sensors 5A to 5C in a hatched region of FIG. 9 indicating the prescribed region.

The waveforms of the signals output from magnetic sensors 5A and 5B can be modeled (or approximated) into a horizontal component (in the ascending/descending direction) of a magnetic vector P of an external magnetic field varying along a circle, as will be described hereinafter, when the intermediate voltage serves as a reference.

Specifically, signal waveforms having phases offset by 90 degrees can be detected as electrical signals output from two adjacent magnetic sensors.

In this example, as the signals have phases offset by 90 degrees, one output signal (electrical signal) can be represented as a sine wave ($\sin\theta$) and the other output signal (electrical signal) as a cosine wave ($\cos\theta$). Based on the two output signals (electrical signals), an angle $\theta$ of magnetic vector P of the external magnetic field is calculated.

In the present preferred embodiment, electrical signals output from two adjacent ones of a plurality of magnetic sensors are detected and therefrom an angle of a magnetic vector of an external magnetic field is calculated, and the position of the float is detected based on the angle of the magnetic vector as calculated.

FIG. 11 is a diagram for schematically illustrating a relationship between magnetic sensor 5 and magnetic vector P according to the first preferred embodiment.

FIG. 11 represents a magnetic vector applied to magnetic sensors 5A and 5B in the ascending/descending direction of float when state S2 shifts to state S3. Note that the ascending/descending direction is a direction along the x axis. Magnetic vector P indicates a direction of a line of magnetic force of a magnetic field generated by the N pole of magnet 2A and the S pole of magnet 2C for example.

Although a line of magnetic force of a magnetic field generated by the N pole of magnet 2B and the S pole of magnet 2D is omitted for the sake of simplicity, a component of magnetic vector P perpendicular to the ascending/descending direction is canceled by a magnetic vector of the line of magnetic force of the magnetic field generated by the N pole of magnet 2B and the S pole of magnet 2D. Accordingly, magnetic sensors 5A, 5B are exposed to an external magnetic field composed only of a component in the ascending/descending direction. As has been previously discussed, the bias magnetic field vector in each magnetic sensor 5 varies according to this external magnetic field.

As one example, as a magnitude of a magnetic vector representing an external magnetic field and a magnetic flux density (an AMR output) are correlated, an output signal detected at magnetic sensor 5A with respect to the ascending/descending direction can be represented as P cos θ and an output signal detected at magnetic sensor 5B with respect to the ascending/descending direction can be represented as P sin θ. Based on the two output signals (electrical signals), angle θ of magnetic vector P is calculated.

Specifically, tan θ (P sin θ/P cos θ) is calculated based on two output signals (electrical signals), and angular information θ is calculated by calculating arctan θ.

Note that a sine wave P sin θ and a cosine wave P cos θ have an amplitude value P, which is cancelled by calculating tan θ.

The above process is a process performed in detection circuit 50. Specifically, the above calculation process is performed in MPU 40.

In response to the magnetic vector's angular information θ varying from 0 degree to 90 degrees, float 20 positionally varies by distance a.

For example, as a position of float 20, a center of magnets 2A to 2C in the ascending/descending direction is set as a reference position (or a center point) as one example. In that case, a reference position (or center point) of float 20 shown in state S2 in FIG. 8C is the same position as the position of magnetic sensor 5A.

In this example, electrical signals of magnetic sensors 5A, 5B are used to calculate angular information θ of a magnetic vector and determine a positional relationship therefor. For example, when angular information θ is calculated as 45 degrees, it can be detected that the float's reference position (or center point) is located at a position moved from the position of magnetic sensor 5A toward magnetic sensor 5B by a distance of a/2.

While in this example, electrical signals of magnetic sensors 5A, 5B are used to calculate angular information θ of a magnetic vector and determine a positional relationship from magnetic vector 5A, a positional relationship from magnetic vector 5B can also be determined. Furthermore, as a matter of course, a similar method can also be followed to use electrical signals of magnetic sensors 5B, 5C to calculate angular information θ of a magnetic vector and determine a positional relationship from magnetic vector 5B. A different method is also similarly discussed.

Figure 12A:
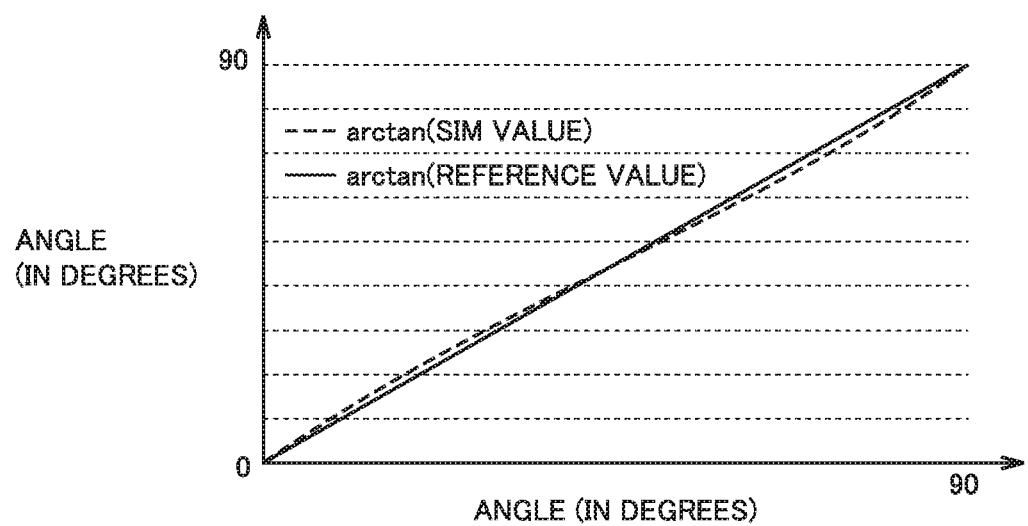
FIGS. 12A and 12B are diagrams for illustrating accuracy of angular information θ according to the first preferred embodiment of the present invention.
Figure 12B:
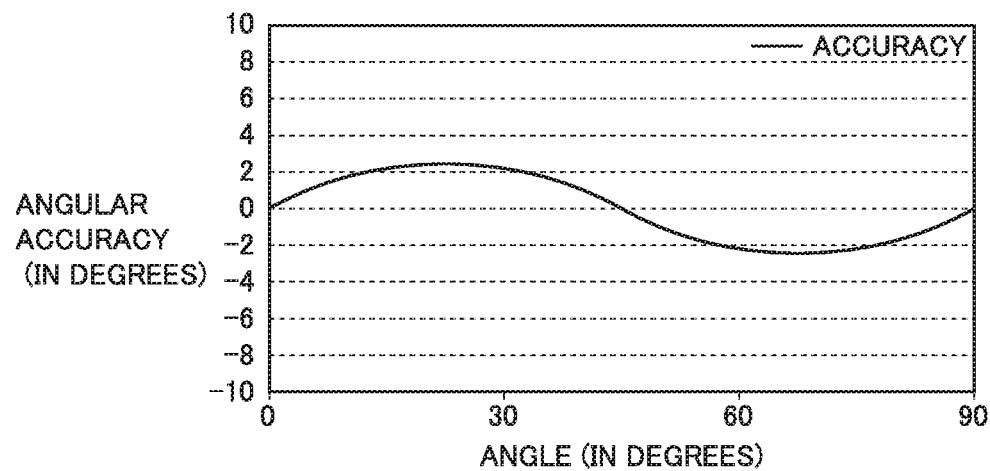

FIGS. 12A and 12B are diagrams for illustrating accuracy of angular information θ according to the first preferred embodiment.

FIG. 12A compares arctan θ with a reference value when angle θ is changed from 0 to 90 degrees with one output signal (an electrical signal) set to P cos θ and the other output signal (an electrical signal) set to P sin θ.

As a result of a simulation, there is no substantial difference from the reference value.

Furthermore, for angular accuracy, as shown in FIG. 12B, a case is shown in which there is only a deviation of ±2 degrees from the reference value, and the position of float 20 can be detected with high accuracy.

Figure 13:
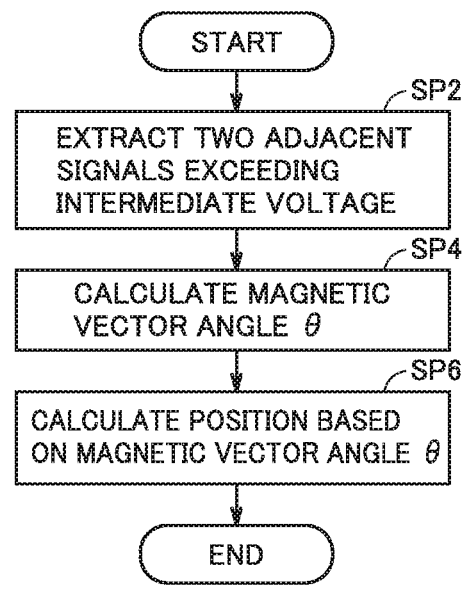
FIG. 13 is a flowchart for illustrating a detection method via liquid level detection device 1 according to the first preferred embodiment of the present invention.

FIG. 13 is a flowchart for illustrating a detection method via liquid level detection device 1 according to the first preferred embodiment.

As shown in FIG. 13, two adjacent signals both exceeding the intermediate voltage are extracted (step SP2). In this example, the intermediate voltage is preferably set to a voltage of an output signal for the initial state as one example. Specifically, as has been described with reference to FIGS. 8A-8G, for example, the state is a state in which magnetic sensor 5A is located on the center line between magnets 2A and 2B, and by previously measuring voltage, the intermediate voltage can be set. There are various methods for setting the intermediate voltage and setting the intermediate voltage is not limited to the method described above, and the intermediate voltage may be set to a value intermediate between a peak value's maximum value and minimum value for example.

Then, two electrical signals in a region surrounded by a dotted line as described with reference to FIG. 9 are extracted. Subsequently, a magnetic vector's angle θ is calculated based on the extracted two signals (step SP4). More specifically, of the two electrical signals, one output signal (an electrical signal) is preferably set to P cos θ and the other output signal (an electrical signal) is preferably set to P sin θ, and based on the two output signals (electrical signals), the magnetic vector's angle θ is calculated. And tan θ is calculated based on the two output signals (electrical signals), and angular information θ is calculated by calculating arctan θ.

Subsequently, the position of float 20 is calculated based on the magnetic vector's angle θ (step SP6). Based on the calculated angular information θ, the reference position (or center point) of float 20 is calculated from the positions of the magnetic sensors. For example, as has been described above, when angular information θ is calculated as 45 degrees, it can be detected that the float's reference position (or center point) is located at a position moved from the position of magnetic sensor 5A toward magnetic sensor 5B by a distance of a/2.

Subsequently, the process ends (END).

Liquid level detection device 1 according to the first preferred embodiment allows two electrical signals to be used to detect the position of float 20 with high accuracy. According to this method, it is not necessary to provide a switching circuit or the like for switching a signal, so that a circuit configuration is able to be simplified and miniaturization is able to be achieved.

Further, while there is a possibility that, following variation in the ambient temperature, the magnets and the magnetic sensors may have their characteristics varied and an output signal may vary, the angle is calculated with two output signals' tan θ (P sin θ/P cos θ) calculated and accordingly, an amount of variation following the ambient temperature is canceled, and an error due to an effect of the ambient temperature is thus able to be reduced and highly accurate positional detection is able to be achieved.

While in this example a case where a distance between magnet 2A and magnet 2C preferably is preferably set to an interval of twice distance a has been described, those skilled in the art would be able to adjust magnet 2A or the like in the direction of its thickness (i.e., the N pole and the S pole in width) and thus change a design as appropriate to allow magnetic sensor 5 to have enhanced detection characteristics.

Figure 14:
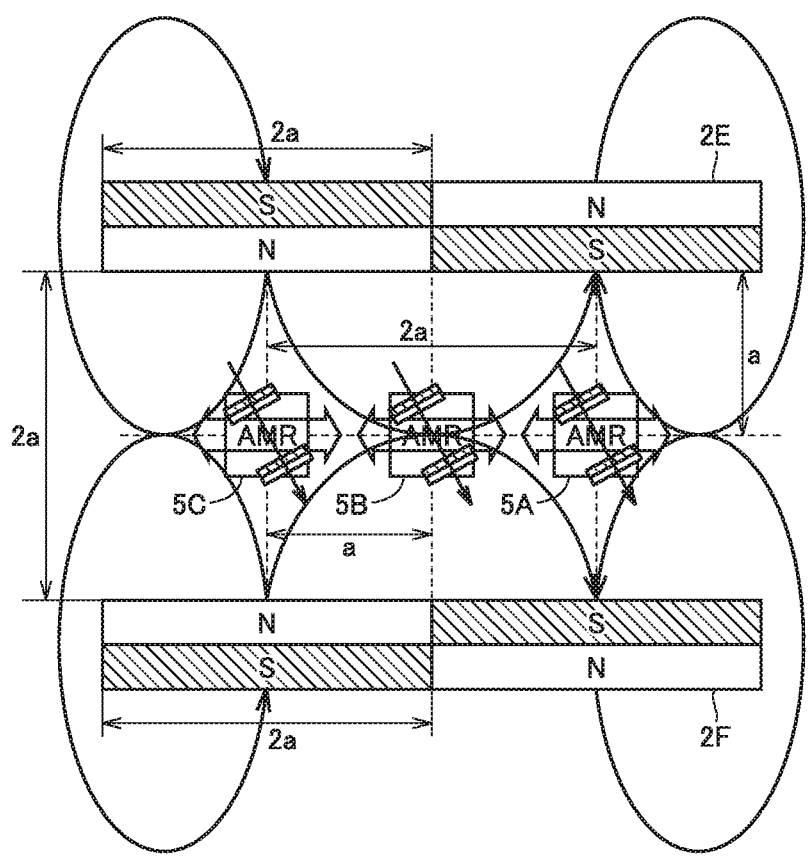
FIG. 14 is a diagram for illustrating a layout of magnets 2E and 2F attached to float 20 and magnetic sensors 5A, 5B, 5C according to the first preferred embodiment of the present invention.

FIG. 14 is a diagram for illustrating a layout of magnets 2E and 2F attached to float 20 and magnetic sensors 5A, 5B, 5C according to the first preferred embodiment.

As shown in FIG. 14, magnets 2E and 2F define a set to define a magnet unit.

The magnet unit defined by magnets 2E and 2F is divided into two regions and arranged such that S poles or N poles face each other in each region. Divisional, adjacent regions are arranged such that the magnets have magnetic poles arranged differently.

Furthermore, in this example, a distance between magnet 2E and magnet 2F is preferably set to a spacing of twice distance a. Furthermore, magnetic sensors 5 are disposed to pass through a center thereof. Furthermore, a distance of the two divisional regions of the N pole and the S pole is preferably set to an interval of twice distance a, and magnetic sensors 5 are also disposed at intervals of distance a. Magnetic sensors 5 are attached to the guide in the ascending/descending direction.

Magnets 2E and 2F generate a magnetic field (a line of magnetic force) which is basically the same as that generated by the layout of FIG. 7, and signals output therefor have waveforms similar to those described with reference to FIG. 9. Accordingly, the position of float 20 can be detected with high accuracy according to a method similar to that described above.

By this configuration, the number of magnets to be disposed is able to be reduced and the layout of the magnets is also able to be easily done.

While in this example, a configuration has been described in which magnets are disposed opposite to each other so that magnetic sensor 5 is able to measure a magnetic field with high accuracy even when float 20 rotates, in a case where float 20 does not rotate and only moves along the guide in the ascending/descending direction, it is also possible to adopt a configuration without opposite magnets (i.e., with a magnet only on one side). The following configuration is also similarly discussed. In that case, it is also possible to provide a configuration in which a bias magnet provided in a magnetic sensor is not provided.

Second Preferred Embodiment

While in the first preferred embodiment, a configuration of liquid level detection device 1 that detects the position of float 20 preferably by using a plurality of magnet units has been described, in the present preferred embodiment, a liquid level detection device that detects the position of float 20 preferably by using a single magnet unit will be described.

Figure 15:
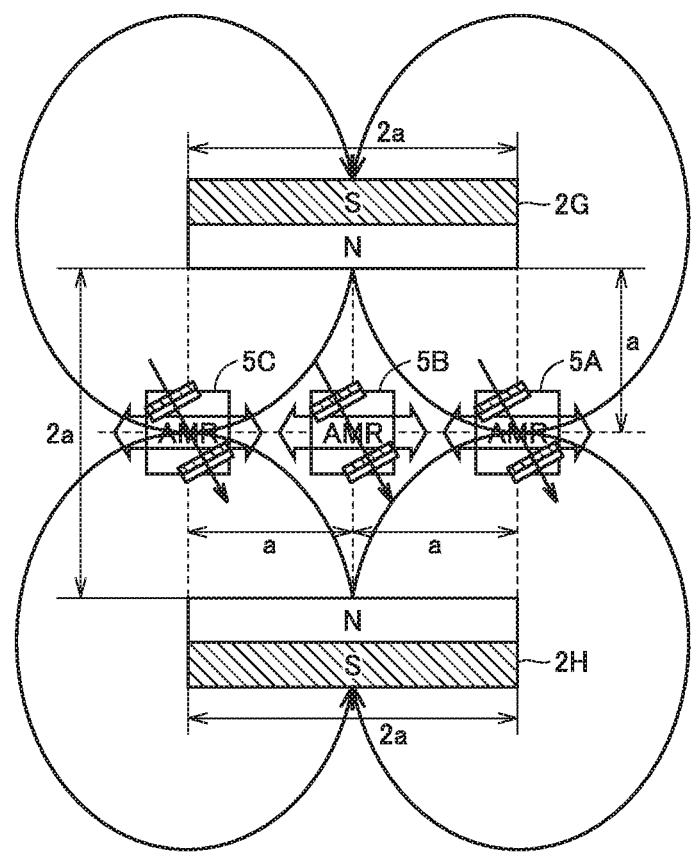
FIG. 15 is a diagram for illustrating a layout of magnets 2G and 2H attached to float 20 and magnetic sensors 5A, 5B, 5C according to a second preferred embodiment of the present invention.

FIG. 15 is a diagram for illustrating a layout of magnets 2G and 2H attached to float 20 and magnetic sensors 5A, 5B, 5C according to the second preferred embodiment.

As shown in FIG. 15, magnets 2G and 2H define a set to define a magnet unit.

Magnets 2G and 2H defining a magnet unit are disposed to have their respective N poles facing each other. While in this example an example will be described in which the N poles face each other, it is also possible to adopt a configuration in which the S poles face each other.

Furthermore, in this example, a distance between magnets 2G and 2H is preferably set to a spacing of twice a distance a, and magnetic sensors 5 are disposed to pass through a center thereof. Magnetic sensors 5 are also disposed at intervals of distance a. Magnetic sensors 5 are attached to the guide in the ascending/descending direction.

While in this example a case where three magnetic sensors 5A to 5C are disposed to detect the position of float 20 will be described, a case where more magnetic sensors are disposed is also similarly discussed.

In this example, as a position of float 20, for example, a center of magnet 2G (or magnet 2H) in the ascending/descending direction is set as a reference position (or a center point). In this case, a case where magnetic sensor 5B is positioned at the reference position (or center point) is shown.

Figure 16:
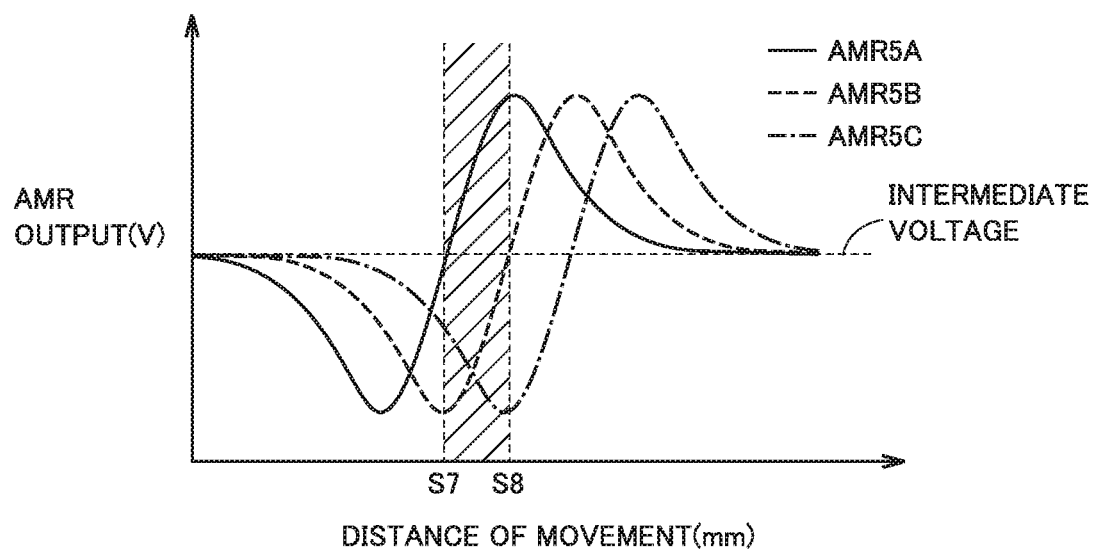
FIG. 16 illustrates waveforms of signals output from a plurality of magnetic sensors as float 20 ascends/descends in the second preferred embodiment of the present invention.

FIG. 16 illustrates waveforms of signals output from a plurality of magnetic sensors as float 20 ascends/descends in the second preferred embodiment.

As shown in FIG. 16, similarly as has been described for waveforms of signals output as shown in FIG. 9, as float 20 approaches magnetic sensor 5A, magnetic sensor 5A is affected by a right to left magnetic field as a line of magnetic force of magnets 2G and 2H. Accordingly, bias magnetic field vector V0 of magnetic sensor 5A varies toward the bias magnetic field vector V1 side. As the bias magnetic field vector varies toward the bias magnetic field vector V1 side, potential difference ΔV decreases. The other magnetic sensors 5B and 5C are also affected by a right to left magnetic field as a line of magnetic force of magnets 2A and 2B, and accordingly, as the bias magnetic field vector varies toward the bias magnetic field vector V1 side, potential difference ΔV decreases.

Float 20 further ascends, and magnetic sensor 5A assumes a state where it is located on the center line between magnets 2G and 2H (i.e., a state S7). In this example, this state is set as an initial state. And a voltage of an output signal in this state is set as an intermediate voltage.

Magnetic sensor 5B is affected by a right to left magnetic field as a line of magnetic force of magnets 2G and 2H. Accordingly, bias magnetic field vector V0 of magnetic sensor 5B varies toward the bias magnetic field vector V1 side. As the bias magnetic field vector varies toward the bias magnetic field vector V1 side, potential difference ΔV decreases. Magnetic sensor 5C is also slightly affected by a right to left magnetic field as a line of magnetic force of magnets 2G and 2H. As the bias magnetic field vector varies toward the bias magnetic field vector V1 side, potential difference ΔV decreases.

Float 20 further ascends, and magnetic sensor 5A is affected by a left to right magnetic field as a line of magnetic force of magnets 2G and 2H (a state S8). Accordingly, bias magnetic field vector V0 of magnetic sensor 5A varies toward the bias magnetic field vector V2 side. As the bias magnetic field vector varies toward the bias magnetic field vector V2 side, potential difference ΔV increases.

Magnetic sensor 5B is in a state where it is located on the center line between magnets 2G and 2H. Thus, it is in the initial state.

Magnetic sensor 5C is affected by a right to left magnetic field as a line of magnetic force of magnets 2G and 2H. Accordingly, bias magnetic field vector V0 of magnetic sensor 5C varies toward the bias magnetic field vector V1 side. As the bias magnetic field vector varies toward the bias magnetic field vector V1 side, potential difference ΔV decreases.

Thus, magnetic sensors 5B and 5C output signals having waveforms, respectively, offset from a waveform of an output signal of magnetic sensor 5A by distance a (a phase of 90 degrees) and further by distance a (a phase of 90 degrees), respectively.

Figure 17:
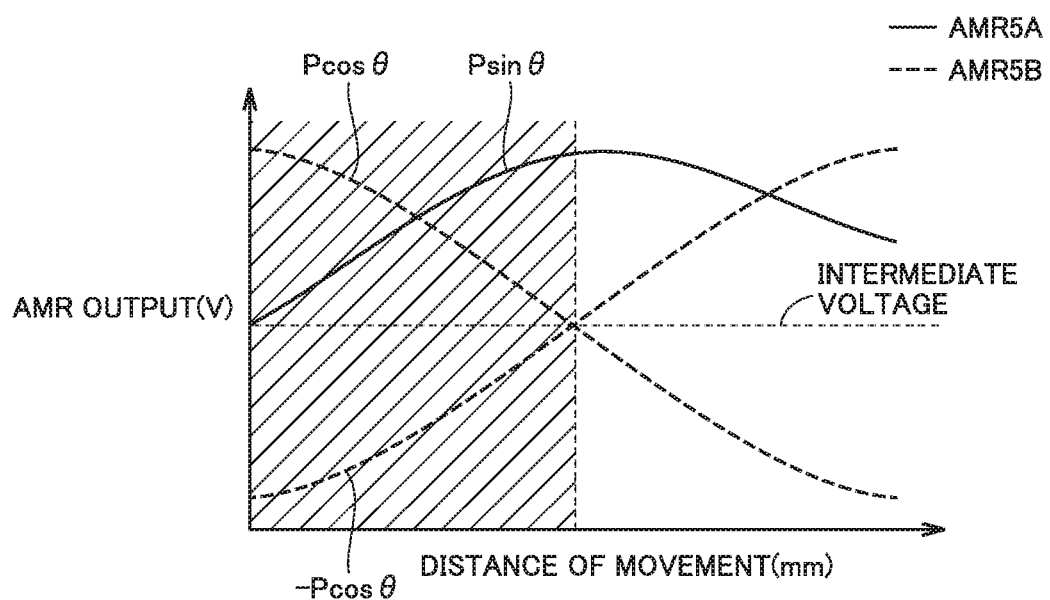
FIG. 17 is an enlarged image of a prescribed region of FIG. 16.

FIG. 17 is an enlarged image of a prescribed region of FIG. 16.

FIG. 17 represents waveforms of signals output from a plurality of magnetic sensors 5A and 5B in a hatched region of FIG. 16 indicating the prescribed region.

The waveforms of the signals output from magnetic sensors 5A and 5B can be modeled (or approximated) into a horizontal component (in the ascending/descending direction) of magnetic vector P of an external magnetic field varying along a circle, as will be described hereinafter, when the intermediate voltage serves as a reference.

Specifically, signal waveforms having phases offset by 90 degrees can be detected as electrical signals output from two adjacent magnetic sensors.

In this example, as the signals have phases offset by 90 degrees, one output signal (electrical signal) can be represented as a sine wave ($\sin \theta$) and the other output signal (electrical signal) as a cosine wave ($\cos \theta$). Based on the two output signals (electrical signals), angle $\theta$ of the magnetic vector is calculated.

FIG. 18 is a diagram for schematically illustrating a relationship between magnetic sensor 5 and magnetic vector P according to the second preferred embodiment.

FIG. 18 represents a magnetic vector applied to magnetic sensors 5A and 5B in the ascending/descending direction of float when state S7 shifts to state S8. Note that the ascending/descending direction is a direction along the x axis. Magnetic vector P indicates a direction of a line of magnetic force of a magnetic field generated by the N pole and S pole of magnet 2G for example.

Although a line of magnetic force of a magnetic field generated by the N pole and S pole of magnet 2H is omitted for the sake of simplicity, a component of magnetic vector P perpendicular to the ascending/descending direction is canceled by a magnetic vector of the line of magnetic force of the magnetic field generated by the N pole and S pole of magnet 2H. Accordingly, magnetic sensors 5A, 5B are exposed to an external magnetic field composed only of a component in the ascending/descending direction. As has been previously discussed, the bias magnetic field vector in each magnetic sensor 5 varies according to this external magnetic field.

As one example, as a magnitude of a magnetic vector representing an external magnetic field and a magnetic flux density (an AMR output) are correlated, an output signal detected at magnetic sensor 5A with respect to the ascending/descending direction can be represented as $P \sin \theta$ and an output signal detected at magnetic sensor 5B with respect to the ascending/descending direction can be represented as $-P \cos \theta$. Based on the two output signals (electrical signals), angle $\theta$ of magnetic vector P is calculated.

Specifically, $\tan \theta$ is calculated based on the two output signals (electrical signals), and angular information $\theta$ is calculated by calculating $\arctan \theta$.

Note that a sine wave $P \sin \theta$ and a cosine wave $P \cos \theta$ have an amplitude value P, which is cancelled by calculating $\tan \theta$.

The above process is a process performed in detection circuit 50. Specifically, the above calculation process is performed in MPU 40.

In response to the magnetic vector's angular information $\theta$ varying from 0 degree to 90 degrees, float 20 positionally varies by distance a.

For example, as a position of float 20, a center of magnet 2G or 2H in the ascending/descending direction is set as a reference position (or a center point) as one example. In that case, a reference position (or center point) of float 20 shown in FIG. 15 is the position of magnetic sensor 5B. Furthermore, magnetic sensor 5A outputs a signal having the intermediate voltage (or state S7 in FIG. 16 is assumed) when the reference position (or center point) of float 20 is located at the position of magnetic sensor 5A. Furthermore, magnetic sensor 5A outputs a maximized signal (or state S8 in FIG. 16 is assumed) when the reference position (or center point) of float 20 is located at the position of magnetic sensor 5B.

In this example, electrical signals of magnetic sensors 5A, 5B are used to calculate angular information $\theta$ of a magnetic vector and determine a positional relationship therefor. For example, when angular information $\theta$ is calculated as 45 degrees, it can be detected that the float's reference position (or center point) is located at a position moved from the position of magnetic sensor 5A toward magnetic sensor 5B by a distance of a/2.

While in this example, electrical signals of magnetic sensors 5A, 5B are used to calculate angular information $\theta$ of a magnetic vector and determine a positional relationship from magnetic vector 5A, a positional relationship from magnetic vector 5B can also be determined. Furthermore, as a matter of course, a similar method can also be followed to use electrical signals of magnetic sensors 5B, 5C to calculate angular information $\theta$ of a magnetic vector and determine a positional relationship from magnetic vector 5C. A different method is also similarly discussed.

Figure 19A:
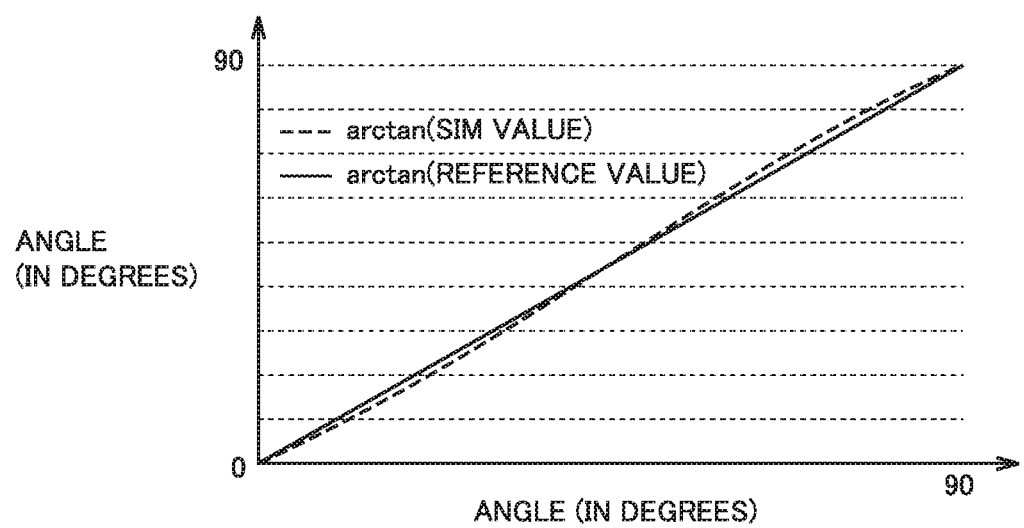
FIGS. 19A and 19B are diagrams for illustrating accuracy of angular information θ according to the second preferred embodiment of the present invention.
Figure 19B:
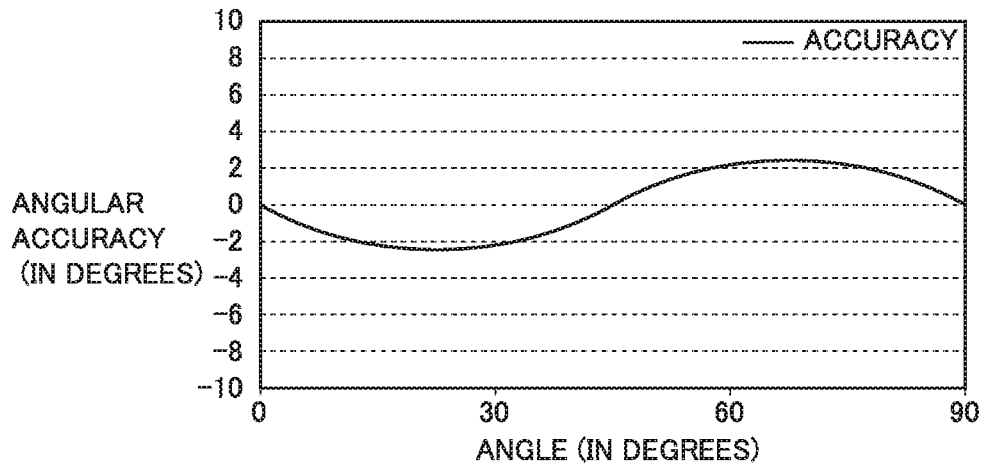

FIGS. 19A and 19B are diagrams for illustrating accuracy of angular information $\theta$ according to the second preferred embodiment.

FIG. 19A compares $\arctan \theta$ with a reference value when angle $\theta$ is changed from 0 to 90 degrees with one output signal (an electrical signal) set to $P \cos \theta$ and the other output signal (an electrical signal) set to $P \sin \theta$.

As a result of a simulation, there is no substantial difference from the reference value.

Furthermore, for angular accuracy, as shown in FIG. 19B, a case is shown in which there is only a deviation of approximately ±2 degrees from the reference value, and the position of float 20 can be detected with high accuracy.

Liquid level detection device 1 according to the second preferred embodiment allows a single magnet unit to be used to detect the position of float 20, and hence allows a simplified circuit configuration and hence miniaturization.

Third Preferred Embodiment

While in the first preferred embodiment a case where an interval between magnetic sensors 5 preferably is preferably set to half an interval between magnet units, or distance a, has been described, it is also possible to change this distance.

More specifically, a case where an interval of magnet units is preferably set to a distance $2a$ and an interval of the magnetic sensors 5 is preferably set to a distance $3a$ will be described.

FIG. 20 is a diagram for illustrating a layout of magnets 2I-2T attached to float 20 and magnetic sensors 5A, 5B, 5C according to a third preferred embodiment.

As shown in FIG. 20, magnets 2I and 2J define a set to define a magnet unit. Magnets 2K, 2L define a set to define a magnet unit. Magnets 2M, 2N define a set to define a magnet unit. Magnets 2O, 2P define a set to define a magnet unit. Magnets 2Q, 2R define a set to define a magnet unit. Magnets 2S, 2T define a set to define a magnet unit.

Magnets 2I, 2J defining a magnet unit are disposed to have their respective N poles facing each other. Magnets 2K, 2L defining a magnet unit are disposed to have their respective S poles facing each other. Magnets 2M, 2N defining a magnet unit are disposed to have their respective N poles facing each other. Magnets 2O, 2P defining a magnet unit are disposed to have their respective S poles facing each other. Magnets 2Q, 2R defining a magnet unit are disposed to have their respective N poles facing each other. Magnets 2S, 2T defining a magnet unit are disposed to have their respective S poles facing each other. Adjacent magnet units are disposed such that their magnets' magnetic poles are different.

Furthermore, in this example, a distance between magnets 2I and 2J is preferably set to a spacing of twice distance a, and magnetic sensors 5 are disposed to pass through a center thereof. Furthermore, an interval (or center-to-center distance) between adjacent magnet units is also set to twice distance a. Magnetic sensors 5 are disposed at intervals of distance $3a$. Magnetic sensors 5 are attached to the guide in the ascending/descending direction.

In this example, as a position of float 20, for example, a center of magnet 2I to 2S (or 2J to 2T) in the ascending/descending direction is set as a reference position (or a center point). In this case, a case where magnetic sensor 5B is positioned at the reference position (or center point) is shown.

FIG. 21 illustrates waveforms of signals output from magnetic sensors 5 as float 20 ascends/descends in the third preferred embodiment.

As shown in FIG. 21, similarly as has been described for waveforms of signals output as shown in FIG. 9, as float 20 approaches magnetic sensor 5, magnetic sensor 5A is affected by a right to left magnetic field as a line of magnetic force of magnets 2I and 2J. Accordingly, bias magnetic field vector V0 of magnetic sensor 5A varies toward the bias magnetic field vector V1 side. As the bias magnetic field vector varies toward the bias magnetic field vector V1 side, potential difference ΔV decreases.

Float 20 further ascends, and magnetic sensor 5A assumes a state where it is located on the center line between magnets 2I and 2J. In this example, this state is set as an initial state.

Float 20 further ascends, and magnetic sensor 5A is affected by a left to right magnetic field as a line of magnetic force of magnets 2I and 2K. Accordingly, bias magnetic field vector V0 of magnetic sensor 5A varies toward the bias magnetic field vector V2 side. As the bias magnetic field vector varies toward the bias magnetic field vector V2 side, potential difference ΔV increases.

Float 20 further ascends, and magnetic sensor 5A assumes a state where it is located on the center line between magnets 2K and 2L. Thus, it is in the initial state.

Float 20 further ascends, and magnetic sensor 5A is affected by a right to left magnetic field as a line of magnetic force of magnets 2K and 2M. Accordingly, bias magnetic field vector V0 of magnetic sensor 5A varies toward the bias magnetic field vector V1 side. As the bias magnetic field vector varies toward the bias magnetic field vector V1 side, potential difference ΔV decreases.

Float 20 further ascends, and magnetic sensor 5A assumes a state where it is located on the center line between magnets 2M and 2N. Thus, it is in the initial state. In this example, as one example, a voltage of an output signal in this state is set as an intermediate voltage.

Float 20 further ascends, and magnetic sensor 5A is affected by a left to right magnetic field as a line of magnetic force of magnets 2M and 2O. Accordingly, bias magnetic field vector V0 of magnetic sensor 5A varies toward the bias magnetic field vector V2 side. As the bias magnetic field vector varies toward the bias magnetic field vector V2 side, potential difference ΔV increases.

Float 20 further ascends, and magnetic sensor 5A assumes a state where it is located on the center line between magnets 2O and 2P. Thus, it is in the initial state.

Float 20 further ascends, and magnetic sensor 5A is affected by a right to left magnetic field as a line of magnetic force of magnets 2O and 2Q. Accordingly, bias magnetic field vector V0 of magnetic sensor 5A varies toward the bias magnetic field vector V1 side. As the bias magnetic field vector varies toward the bias magnetic field vector V1 side, potential difference ΔV decreases.

Float 20 further ascends, and magnetic sensor 5A assumes a state where it is located on the center line between magnets 2Q and 2R. Thus, it is in the initial state.

Float 20 further ascends, and magnetic sensor 5A is affected by a left to right magnetic field as a line of magnetic force of magnets 2Q and 2S. Accordingly, bias magnetic field vector V0 of magnetic sensor 5A varies toward the bias magnetic field vector V2 side. As the bias magnetic field vector varies toward the bias magnetic field vector V2 side, potential difference ΔV increases.

Float 20 further ascends, and magnetic sensor 5A assumes a state where it is located on the center line between magnets 2S and 2T. Thus, it is in the initial state.

Float 20 further ascends, and magnetic sensor 5A is affected by a right to left magnetic field as a line of magnetic force of magnets 2S and 2T. Accordingly, bias magnetic field vector V0 of magnetic sensor 5A varies toward the bias magnetic field vector V1 side. As the bias magnetic field vector varies toward the bias magnetic field vector V1 side, potential difference ΔV decreases.

Magnetic sensors 5B and 5C output signals having waveforms, respectively, similar to the waveform of the signal output from magnetic sensor 5A, offset therefrom by distance $3a$ (a phase of 270 degrees) and further by distance $3a$ (a phase of 270 degrees), respectively.

Figure 22:
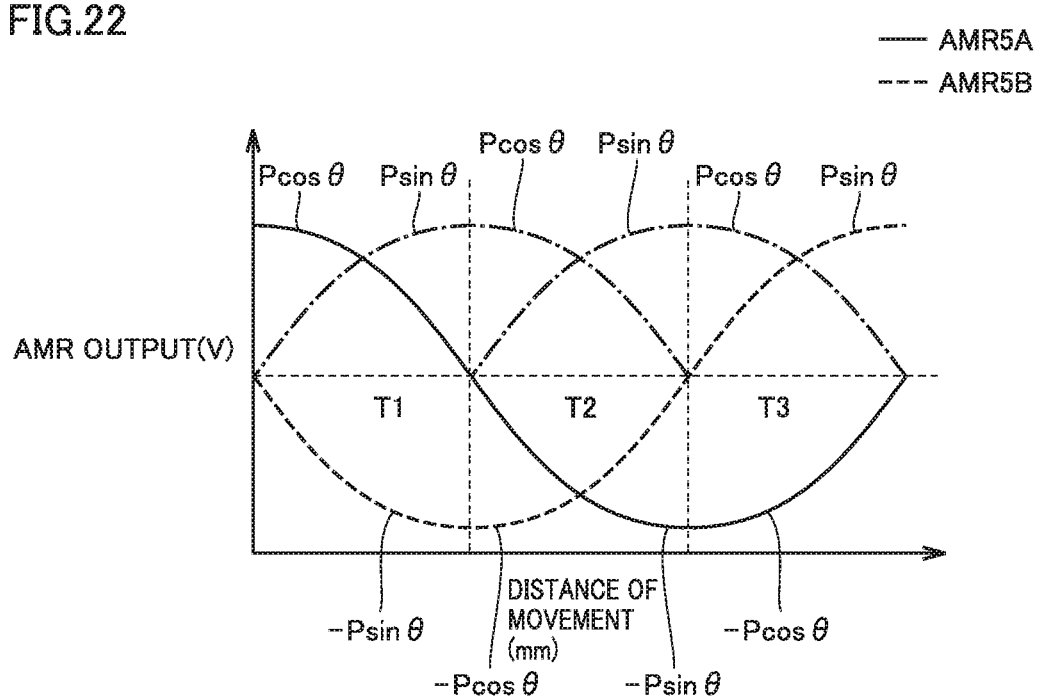
FIG. 22 is an enlarged image of a prescribed region of FIG. 21.

FIG. 22 is an enlarged image of a prescribed region of FIG. 21.

FIG. 22 represents waveforms of signals output from a plurality of magnetic sensors 5A and 5B in a hatched region of FIG. 21 indicating the prescribed region.

The waveforms of the signals output from magnetic sensors 5A and 5B can be modeled (or approximated) into a horizontal component (in the ascending/descending direction) of magnetic vector P of an external magnetic field varying along a circle, as will be described hereinafter, when the intermediate voltage serves as a reference.

Specifically, signal waveforms having phases offset by 270 degrees can be detected as electrical signals output from two adjacent magnetic sensors.

In this example, the 270 degrees can be divided by 90 degrees into three to obtain divisional regions T1-T3, and in the regions one of two output signals (an electrical signal) can be represented as a sine wave (sin θ) and the other output signal (an electrical signal) as a cosine wave (cos θ). Based on the two output signals (electrical signals), angle θ of the magnetic vector is calculated.

Figure 23A:
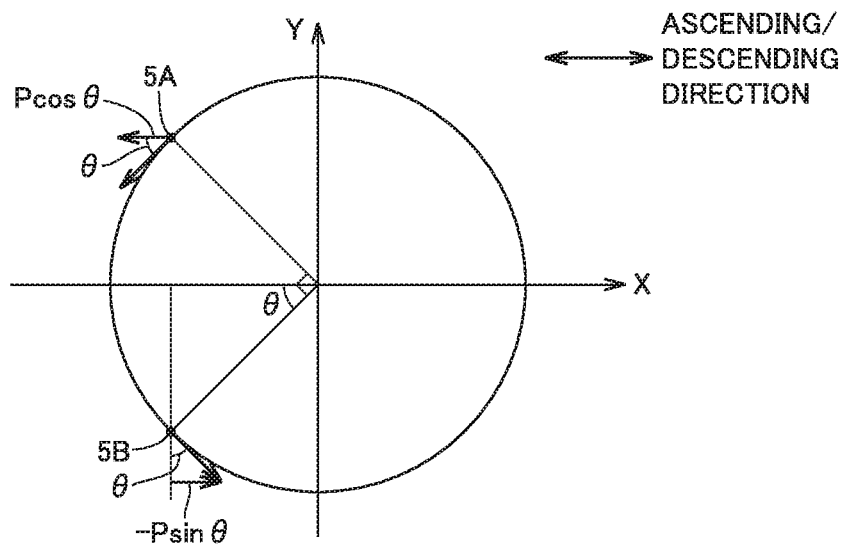
FIGS. 23A-23C are diagrams for schematically illustrating a relationship between magnetic sensor 5 and magnetic vector P according to the third preferred embodiment of the present invention.
Figure 23B:
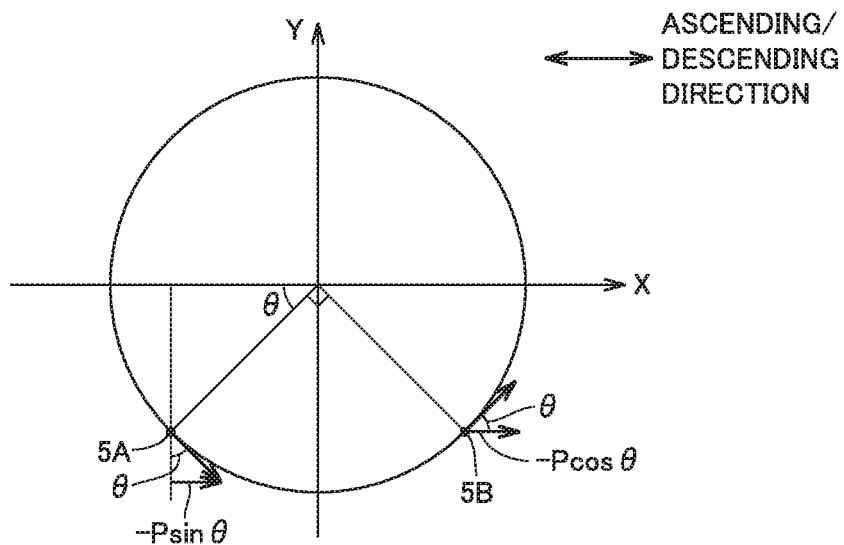
Figure 23C:
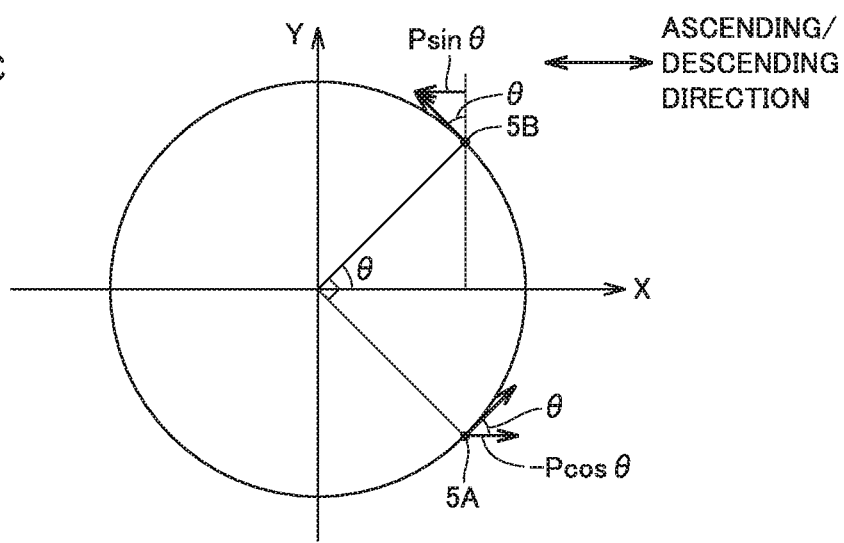

FIGS. 23A-23C are diagrams for schematically illustrating a relationship between magnetic sensor 5 and magnetic vector P according to the third preferred embodiment.

FIGS. 23A-23C represent a magnetic vector applied to magnetic sensors 5A and 5B in the ascending/descending direction of float 20 when state S9 shifts to state S10. Note that the ascending/descending direction is a direction along the x axis. Magnetic vector P indicates directions of lines of magnetic force received by magnetic sensors 5A and 5B exposed to magnetic fields generated by the N pole of magnet 2M and the S pole of magnet 2K, the N pole of magnet 2M and the S pole of magnet 2O, and the N pole of magnet 2Q and the S pole of magnet 2O for example.

Although the lines of magnetic force of the magnetic fields generated by facing magnets 2L, 2N, 2P, 2R are omitted for the sake of simplicity, a component of magnetic vector P perpendicular to the ascending/descending direction is canceled by the magnetic vectors of the lines of magnetic force of the magnetic fields generated by the N and S poles of magnets 2L, 2N, 2P, 2R. Accordingly, magnetic sensors 5A, 5B are exposed to an external magnetic field composed only of a component in the ascending/descending direction. As has been previously discussed, the bias magnetic field vector in each magnetic sensor 5 varies according to this external magnetic field.

FIG. 23A represents magnetic vectors input to magnetic sensors 5A and 5B, respectively, with respect to the ascending/descending direction of float 20 in region T1 obtained by dividing states S9-S10 into three. Note that the ascending/descending direction is a direction along the x axis.

Magnetic vector P affecting magnetic sensor 5A indicates a direction of a line of magnetic force of a magnetic field generated by the N pole of magnet 2M and the S pole of magnet 2O, for example.

Magnetic vector P affecting magnetic sensor 5B indicates a direction of a line of magnetic force of a magnetic field generated by the N pole of magnet 2M and the S pole of magnet 2K, for example.

As one example, as a magnitude of a magnetic vector representing an external magnetic field and a magnetic flux density (an AMR output) are correlated, an output signal detected at magnetic sensor 5A with respect to the ascending/descending direction can be represented as P cos θ and an output signal detected at magnetic sensor 5B with respect to the ascending/descending direction can be represented as −P sin θ. Based on the two output signals (electrical signals), angle θ of the magnetic vector is calculated.

Specifically, tan θ is calculated based on the two output signals (electrical signals), and angular information θ is calculated by calculating arctan θ.

Note that a sine wave P sin θ and a cosine wave P cos θ have an amplitude value P, which is cancelled by calculating tan θ.

The above process is a process performed in detection circuit 50. Specifically, the above calculation process is performed in MPU 40.

In response to the magnetic vector's angular information θ varying from 0 degree to 90 degrees, float 20 positionally varies by distance a.

For example, as a position of float 20, a center of magnets 2I to 2S in the ascending/descending direction is set as a reference position (or a center point) as one example. In that case, a reference position (or center point) of float 20 shown in FIG. 20 is the position of magnetic sensor 5B. Furthermore, magnetic sensor 5A outputs a maximized signal (or state S9 in FIG. 21 is assumed) when the reference position (or center point) of float 20 is located at the position of magnetic sensor 5A. Furthermore, magnetic sensor 5A outputs a signal having the intermediate voltage (or state S10 in FIG. 21 is assumed) when the reference position (or center point) of float 20 is located at the position of magnetic sensor 5B.

In the detection region of region T1 in this example, electrical signals of magnetic sensors 5A, 5B are used to calculate angular information θ of a magnetic vector and determine a positional relationship therefor. For example, when angular information θ is calculated as 45 degrees, it can be detected that the float's reference position (or center point) is located at a position moved from the position of magnetic sensor 5A toward magnetic sensor 5B by a distance of a/2.

FIG. 23B represents magnetic vectors input to magnetic sensors 5A and 5B, respectively, with respect to the ascending/descending direction of float 20 in region T2 obtained by dividing states S9-S10 into three. Note that the ascending/descending direction is a direction along the x axis.

Magnetic vector P affecting magnetic sensor 5A indicates a direction of a line of magnetic force of a magnetic field generated by the N pole of magnet 2Q and the S pole of magnet 2O, for example.

Magnetic vector P affecting magnetic sensor 5B indicates a direction of a line of magnetic force of a magnetic field generated by the N pole of magnet 2M and the S pole of magnet 2K, for example.

As one example, as a magnitude of a magnetic vector representing an external magnetic field and a magnetic flux density (an AMR output) are correlated, an output signal detected at magnetic sensor 5A with respect to the ascending/descending direction can be represented as −P sin θ. Furthermore, an output signal detected at magnetic sensor 5B with respect to the ascending/descending direction can be represented as −P cos θ. Based on the two output signals (electrical signals), angle θ of the magnetic vector is calculated.

Specifically, tan θ is calculated based on the two output signals (electrical signals), and angular information θ is calculated by calculating arctan θ.

Note that a sine wave P sin θ and a cosine wave P cos θ have an amplitude value P, which is cancelled by calculating tan θ.

The above process is a process performed in detection circuit 50. Specifically, the above calculation process is performed in MPU 40.

In response to the magnetic vector's angular information θ varying from 0 degree to 90 degrees, float 20 also positionally varies by distance a.

For example, as a position of float 20, a center of magnets 2I to 2S in the ascending/descending direction is set as a reference position (or a center point) as one example. In that case, a reference position (or center point) of float 20 shown in FIG. 20 is the position of magnetic sensor 5B.

In the detection region of region T2 in this example, electrical signals of magnetic sensors 5A, 5B are used to calculate angular information θ of a magnetic vector and determine a positional relationship therefor. For example, when angular information θ is calculated as 45 degrees, it can be detected that the float's reference position (or center point) is located at a position moved from the position of magnetic sensor 5A toward magnetic sensor 5B by a distance of a+a/2.

FIG. 23C represents magnetic vectors input to magnetic sensors 5A and 5B, respectively, with respect to the ascending/descending direction of float 20 in region T3 obtained by dividing states S9-S10 into three. Note that the ascending/descending direction is a direction along the x axis.

Magnetic vector P affecting magnetic sensor 5A indicates a direction of a line of magnetic force of a magnetic field generated by the N pole of magnet 2Q and the S pole of magnet 2O, for example.

Magnetic vector P affecting magnetic sensor 5B indicates a direction of a line of magnetic force of a magnetic field generated by the N pole of magnet 2M and the S pole of magnet 2O, for example.

As one example, as a magnitude of a magnetic vector representing an external magnetic field and a magnetic flux density (an AMR output) are correlated, an output signal detected at magnetic sensor 5A with respect to the ascending/descending direction can be represented as $-P \cos \theta$. Furthermore, an output signal detected at magnetic sensor 5B with respect to the ascending/descending direction can be represented as $P \sin \theta$. Based on the two output signals (electrical signals), angle $\theta$ of the magnetic vector is calculated.

Specifically, $\tan \theta$ is calculated based on the two output signals (electrical signals), and angular information $\theta$ is calculated by calculating $\arctan \theta$.

Note that a sine wave $P \sin \theta$ and a cosine wave $P \cos \theta$ have an amplitude value P, which is cancelled by calculating $\tan \theta$.

The above process is a process performed in detection circuit 50. Specifically, the above calculation process is performed in MPU 40.

In response to the magnetic vector's angular information $\theta$ varying from 0 degree to 90 degrees, float 20 also positionally varies by distance a.

For example, as a position of float 20, a center of magnets 2I to 2S in the ascending/descending direction is set as a reference position (or a center point) as one example. In that case, a reference position (or center point) of float 20 shown in FIG. 20 is the position of magnetic sensor 5B.

In the detection region of region T3 in this example, electrical signals of magnetic sensors 5A, 5B are used to calculate angular information $\theta$ of a magnetic vector and determine a positional relationship therefor. For example, when angular information $\theta$ is calculated as 45 degrees, it can be detected that the float's reference position (or center point) is located at a position moved from the position of magnetic sensor 5A toward magnetic sensor 5B by a distance of 2a+a/2.

FIG. 24 is a diagram for illustrating a method of extracting waveforms of two signals output in each of regions T1 to T3 from waveforms of signals output from a plurality of magnetic sensors 5A to 5C according to the third preferred embodiment.

Referring to FIG. 24, herein, a plurality of threshold values TH0 to TH2 are set. Threshold value TH0 is preferably set to the intermediate voltage as one example. Threshold value TH2 is preferably set to an intermediate peak value as observed from an output signal waveform having fallen to a minimum value as one example. Threshold value TH1 is preferably set to an intermediate value between threshold value TH0 and threshold value TH2 as one example. It should be noted that setting threshold values TH0 to TH2 as above is merely an example and a different method may be used to set a threshold value.

In the third preferred embodiment, divisional regions T1 to T3 are provided based on a relationship between threshold values TH0 to TH2 and output signal waveforms, and two output signal waveforms are extracted.

For region T1, when magnetic sensor 5C (i.e., a magnetic sensor next to magnetic sensor 5A but one) outputs a signal having a waveform having a value below threshold value TH1 and magnetic sensor 5B (i.e., a magnetic sensor next to magnetic sensor 5A) outputs a signal having a waveform having a value below threshold value TH0 or when magnetic sensor 5B (i.e., a magnetic sensor next to magnetic sensor 5A) outputs a signal having a waveform having a value below threshold value TH2 and magnetic sensor 5A outputs a signal having a waveform having a value exceeding threshold value TH0, the output of magnetic sensor 5A is assumed to be $P \cos \theta$ and the output of magnetic sensor 5B is preferably set to $-P \sin \theta$.

For region T2, when magnetic sensor 5A and magnetic sensor 5B (i.e., a magnetic sensor next to magnetic sensor 5A) output signals having waveforms having values below threshold value TH0 and magnetic sensor 5C (i.e., a magnetic sensor next to magnetic sensor 5A but one) outputs a signal having a waveform having a value exceeding threshold value TH0, the output of magnetic sensor 5A is assumed to be $-P \sin \theta$ and the output of magnetic sensor 5B is preferably set to $-P \cos \theta$.

For region T3, when magnetic sensor 5B (i.e., a magnetic sensor next to magnetic sensor 5A) and magnetic sensor 5C (i.e., a magnetic sensor next to magnetic sensor 5A but one) output signals having waveforms having values exceeding threshold value TH0 and magnetic sensor 5A outputs a signal having a waveform having a value below threshold value TH0, the output of magnetic sensor 5A is assumed to be $-P \cos \theta$ and the output of magnetic sensor 5B is preferably set to $P \sin \theta$.

According to the above method, angle $\theta$ of a magnetic vector is calculated based on the two output signals (electrical signals).

Specifically, $\tan \theta$ is calculated based on the two output signals (electrical signals), and angular information $\theta$ is calculated by calculating $\arctan \theta$.

Note that while in this example, divisional regions T1 to T3 are provided based on a relationship between threshold values TH0 to TH2 and output signal waveforms and two output signal waveforms are extracted, this method is not exclusive and a different method may be used to extract two output signal waveforms.

Figure 25A:
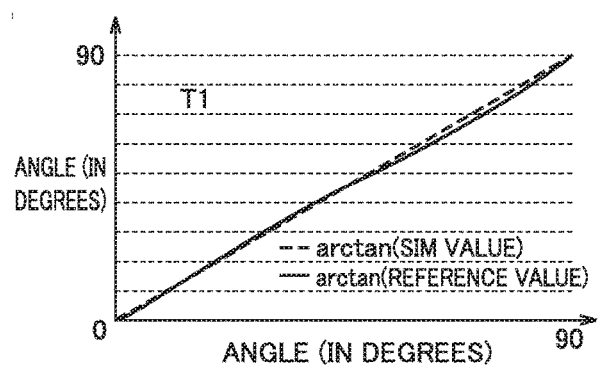
FIGS. 25A-25F are diagrams for illustrating accuracy of angular information θ according to the third preferred embodiment of the present invention.
Figure 25B:
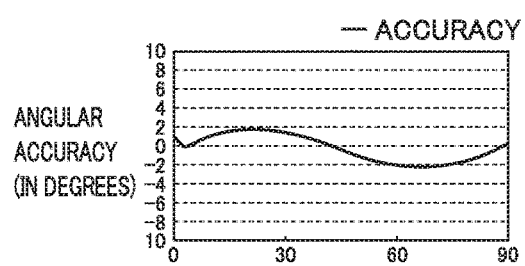
Figure 25C:
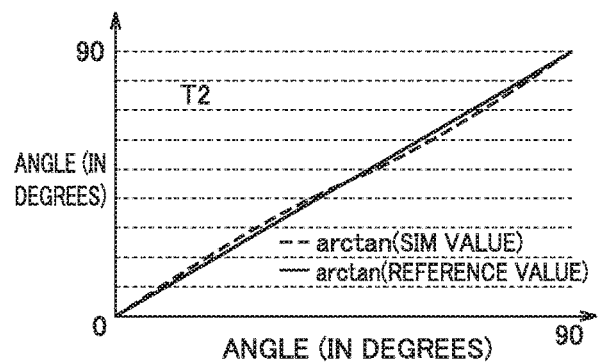
Figure 25D:
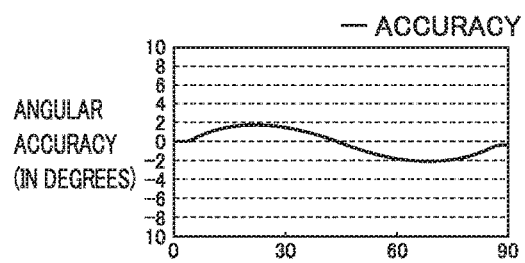
Figure 25E:
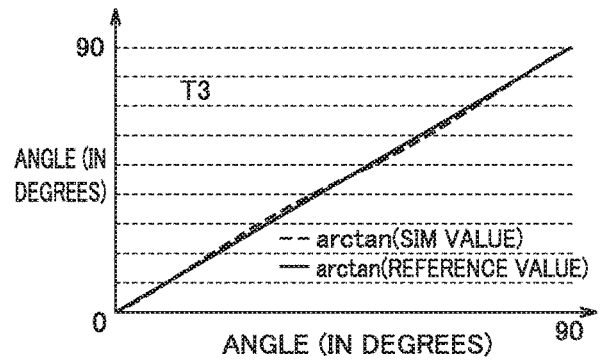

FIGS. 25A-25F are diagrams for illustrating accuracy of angular information $\theta$ according to the third preferred embodiment. FIGS. 25A, 25C and 25E compare $\arctan \theta$ with a reference value when angle $\theta$ is changed from 0 to 90 degrees with one output signal (an electrical signal) set to $P \cos \theta$ and the other output signal (an electrical signal) set to $P \sin \theta$.

As a result of a simulation, there is no substantial difference from the reference value.

Figure 25F:
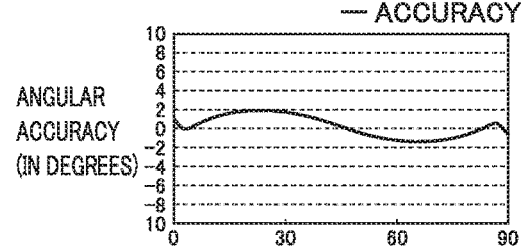

Furthermore, for angular accuracy, as shown in FIGS. 25B, 25D and 25F, a case is shown in which there is only a deviation of approximately ±2 degrees in each region, and the position of float 20 can be detected with high accuracy.

Figure 26:
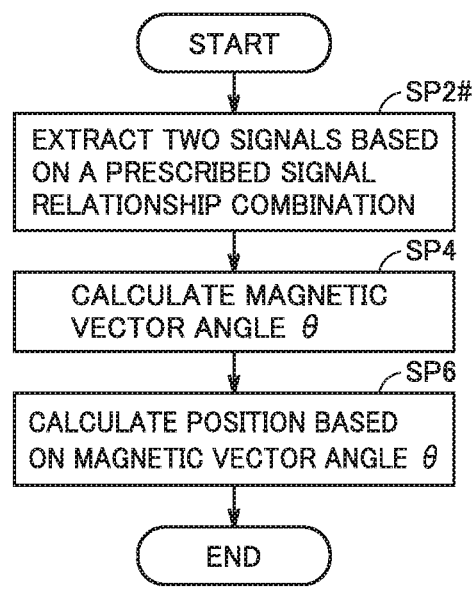
FIG. 26 is a flowchart for illustrating a detection method via liquid level detection device 1 according to the third preferred embodiment of the present invention.

FIG. 26 is a flowchart for illustrating a detection method via liquid level detection device 1 according to the third preferred embodiment.

As shown in FIG. 26, two signals are extracted based on a prescribed signal relationship combination (step SP2#). Specifically, according to the method described with reference to FIGS. 23A-23C, based on a combination of threshold values TH0 to TH2 and each output signal waveform, divisional regions T1 to T3 are provided, and two output signal waveforms are extracted in each region.

The intermediate voltage, or threshold value TH0, is preferably set to a voltage of a signal output in a state where magnetic sensor 5A is located on the center line between magnet 2M and magnet 2N, for example. Threshold value TH2 can be set to an intermediate peak value as observed from an output signal waveform having fallen to a minimum value as one example. Threshold value TH1 can be set to an intermediate value between threshold value TH0 and threshold value TH2 as one example.

Subsequently, a magnetic vector's angle θ is calculated based on the extracted two signals (step SP4). More specifically, of the two electrical signals, one output signal (an electrical signal) is preferably set to a sin wave (sin θ) and the other output signal (an electrical signal) is preferably set to a cosine wave (cos θ), and based on the two output signals (electrical signals), the magnetic vector's angle θ is calculated. Specifically, tan θ is calculated based on the two output signals (electrical signals), and angular information θ is calculated by calculating arctan θ.

Subsequently, the position of float 20 is calculated based on the magnetic vector's angle θ (step SP6). Based on the calculated angular information θ, the reference position (or center point) of float 20 is calculated from the positions of the magnetic sensors.

Subsequently, the process ends (END).

Liquid level detection device 1 according to the third preferred embodiment allows two electrical signals to be used to detect the position of float 20 with high accuracy. Furthermore, as two magnetic sensors can be used to detect information for 270 degrees (or distance 3a), the number of magnetic sensors is able to be further reduced to achieve miniaturization. Furthermore, a distance between facing magnets is also able to be reduced and further miniaturization is also able to be achieved.

Further, while there is a possibility that, following variation in the ambient temperature, the magnets and the magnetic sensors may have their characteristics varied and an output signal may vary, the angle is calculated with two output signals' tan θ (P sin θ/P cos θ) calculated and accordingly, an amount of variation is canceled, and an error due to an effect of the ambient temperature is thus able to be reduced and highly accurate detection is also able to be achieved.

Figure 27:
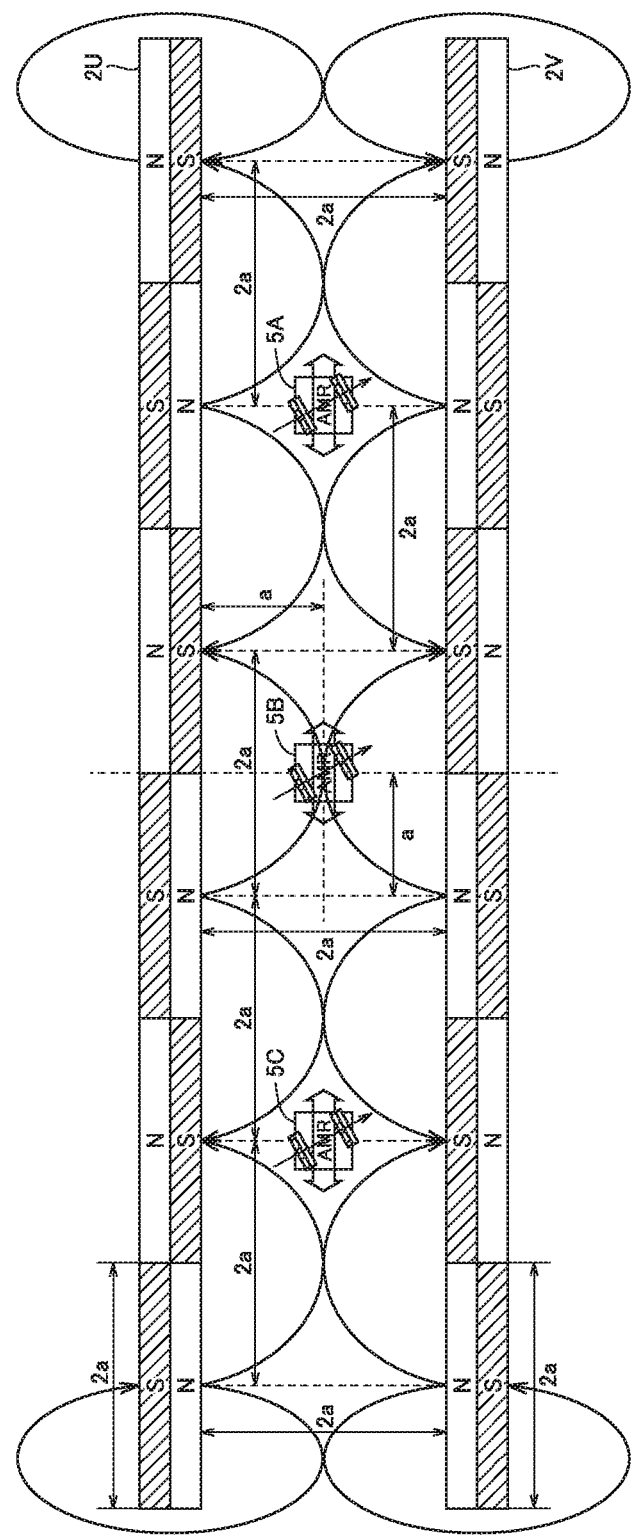
FIG. 27 is a diagram for illustrating a layout of magnets 2U and 2V attached to float 20 and magnetic sensors 5A, 5B, 5C according to a first exemplary variation of the third preferred embodiment of the present invention.

FIG. 27 is a diagram for illustrating a layout of magnets 2U and 2V attached to float 20 and magnetic sensors 5A, 5B, 5C according to a first exemplary variation of the third preferred embodiment.

As shown in FIG. 27, magnets 2U and 2V define a set to define a magnet unit.

The magnet unit defined by magnets 2U and 2V is divided into six regions and arranged such that S poles or N poles face each other in each region. Divisional, adjacent regions are arranged such that the magnets have magnetic poles arranged differently.

Furthermore, in this example, a distance between magnet 2U and magnet 2V is preferably set to a spacing of twice distance a. Furthermore, magnetic sensors 5 are disposed to pass through a center thereof.

Furthermore, a distance of two divisional regions of the N pole and the S pole is preferably set to an interval of twice distance a, and magnetic sensors 5 are disposed at intervals of distance 3a. Magnetic sensors 5 are attached to the guide in the ascending/descending direction.

Magnets 2U and 2V generate a magnetic field (a line of magnetic force) which is basically the same as that generated by the layout of FIG. 20, and signals output therefor have waveforms similar to those described with reference to FIG. 21. Accordingly, the position of float 20 is able to be detected with high accuracy according to a method similar to that described above.

By this configuration, the number of magnets is able to be reduced and the layout of the magnets is also able to be easily accomplished.

While in the third preferred embodiment a float composed of six magnet units has been described, the number of magnet units is also able to be reduced.

Figure 28:
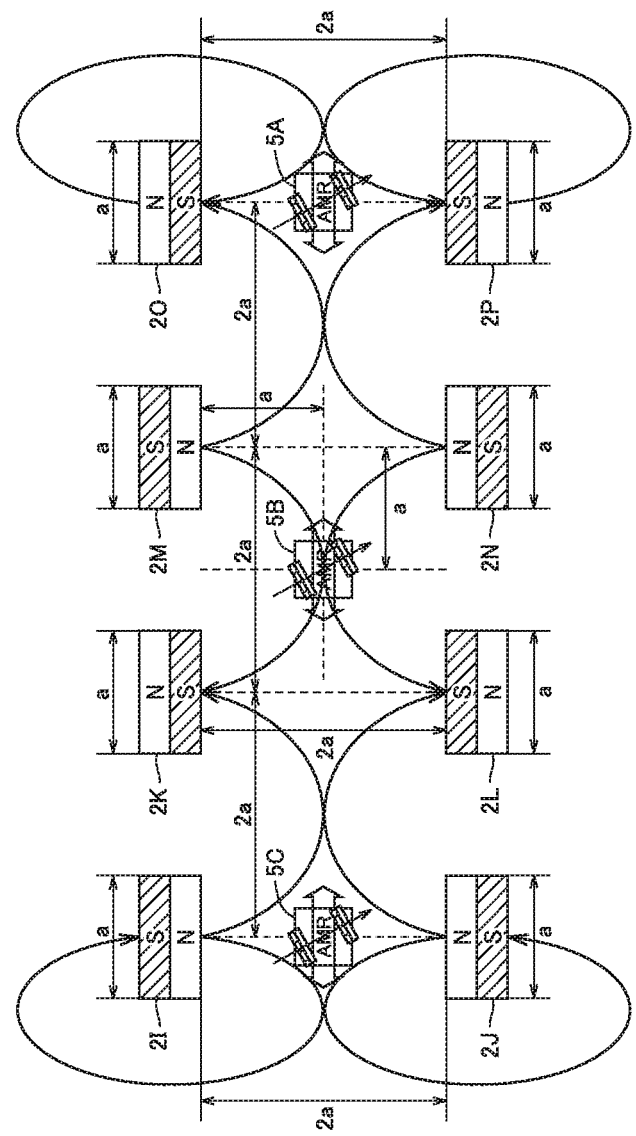
FIG. 28 is a diagram for illustrating a layout of magnets 2I-2P attached to float 20 and magnetic sensors 5A, 5B, 5C according to the third preferred embodiment of the present invention.

FIG. 28 is a diagram for illustrating a layout of magnets 2I-2P attached to float 20 and magnetic sensors 5A, 5B, 5C according to the third preferred embodiment.

As shown in FIG. 28, magnets 2I and 2J define a set to define a magnet unit. Magnets 2K, 2L define a set to define a magnet unit. Magnets 2M, 2N define a set to define a magnet unit. Magnets 2O, 2P define a set to define a magnet unit.

Magnets 2I, 2J defining a magnet unit are disposed to have their respective N poles facing each other. Magnets 2K, 2L defining a magnet unit are disposed to have their respective S poles facing each other. Magnets 2M, 2N defining a magnet unit are disposed to have their respective N poles facing each other. Magnets 2O, 2P defining a magnet unit are disposed to have their respective S poles facing each other. Adjacent magnet units are disposed such that their magnets' magnetic poles are different.

Furthermore, in this example, a distance between magnets 2I and 2J is preferably set to a spacing of twice distance a, and magnetic sensors 5 are disposed to pass through a center thereof. Furthermore, an interval (or center-to-center distance) between adjacent magnet units is also set to twice distance a. Magnetic sensors 5 are disposed at intervals of distance 3a. Magnetic sensors 5 are attached to the guide in the ascending/descending direction.

In this example, as a position of float 20, for example, a center of magnet 2I to 2O (or 2J to 2P) in the ascending/descending direction is set as a reference position (or a center point). In this case, a case where magnetic sensor 5B is positioned at the reference position (or center point) is shown.

Figure 29:
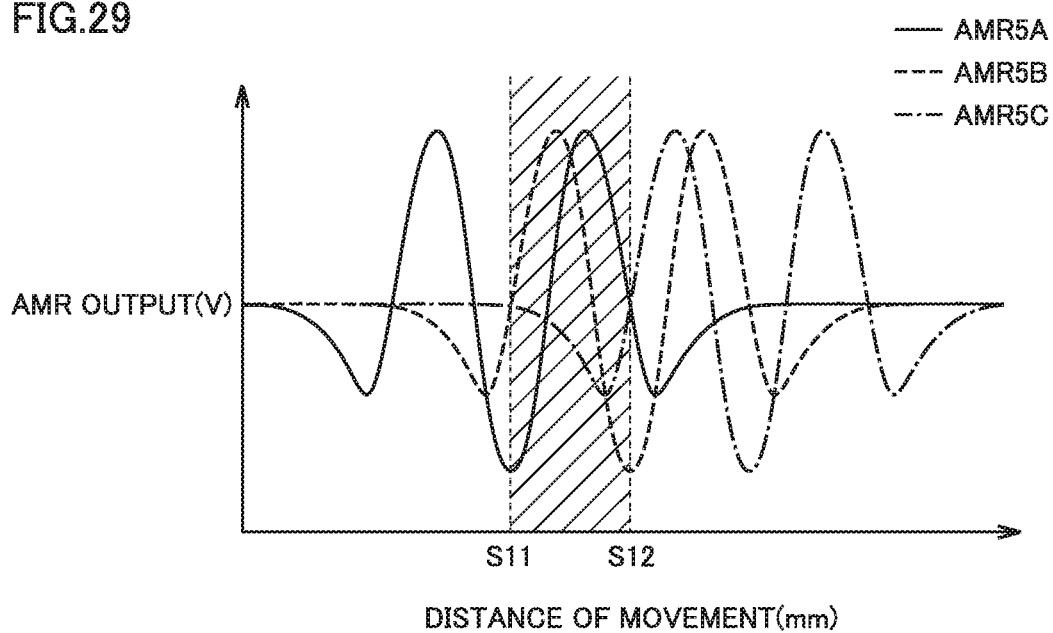
FIG. 29 illustrates waveforms of signals output from magnetic sensors 5 as float 20 ascends/descends in a second exemplary variation of the third preferred embodiment of the present invention.

FIG. 29 illustrates waveforms of signals output from magnetic sensors 5 as float 20 ascends/descends in the second exemplary variation of the third preferred embodiment.

As shown in FIG. 29, similarly as has been described for waveforms of signals output as shown in FIG. 9, as float 20 approaches magnetic sensor 5, magnetic sensor 5A is affected by a right to left magnetic field as a line of magnetic force of magnets 2I and 2J. Accordingly, bias magnetic field vector V0 of magnetic sensor 5A varies toward the bias magnetic field vector V1 side. As the bias magnetic field vector varies toward the bias magnetic field vector V1 side, potential difference ΔV decreases.

Float 20 further ascends, and magnetic sensor 5A assumes a state where it is located on the center line between magnets 2I and 2J. In this example, this state is set as an initial state.

Float 20 further ascends, and magnetic sensor 5A is affected by a left to right magnetic field as a line of magnetic force of magnets 2I and 2K. Accordingly, bias magnetic field vector V0 of magnetic sensor 5A varies toward the bias magnetic field vector V2 side. As the bias magnetic field vector varies toward the bias magnetic field vector V2 side, potential difference ΔV increases.

Float 20 further ascends, and magnetic sensor 5A assumes a state where it is located on the center line between magnets 2K and 2L. Thus, it is in the initial state.

Float 20 further ascends, and magnetic sensor 5A is affected by a right to left magnetic field as a line of magnetic force of magnets 2K and 2M. Accordingly, bias magnetic field vector V0 of magnetic sensor 5A varies toward the bias magnetic field vector V1 side. As the bias magnetic field vector varies toward the bias magnetic field vector V1 side, potential difference ΔV decreases.

Float 20 further ascends, and magnetic sensor 5A assumes a state where it is located on the center line between magnets 2M and 2N. Thus, it is in the initial state. In this example, a voltage of an output signal in this state is set as the intermediate voltage.

Float 20 further ascends, and magnetic sensor 5A is affected by a left to right magnetic field as a line of magnetic force of magnets 2M and 2O. Accordingly, bias magnetic field vector V0 of magnetic sensor 5A varies toward the bias magnetic field vector V2 side. As the bias magnetic field vector varies toward the bias magnetic field vector V2 side, potential difference ΔV increases.

Float 20 further ascends, and magnetic sensor 5A assumes a state where it is located on the center line between magnets 2O and 2P. Thus, it is in the initial state.

Float 20 further ascends, and magnetic sensor 5A is affected by a right to left magnetic field as a line of magnetic force of magnets 2O and 2P. Accordingly, bias magnetic field vector V0 of magnetic sensor 5A varies toward the bias magnetic field vector V1 side. As the bias magnetic field vector varies toward the bias magnetic field vector V1 side, potential difference ΔV decreases.

Magnetic sensors 5B and 5C output signals having waveforms, respectively, similar to the waveform of the signal output from magnetic sensor 5A, offset therefrom by distance 3a (a phase of 270 degrees) and further by distance 3a (a phase of 270 degrees), respectively.

FIG. 30 is an enlarged image of a prescribed region of FIG. 29.

FIG. 30 represents waveforms of signals output from a plurality of magnetic sensors 5A and 5B in a hatched region of FIG. 29 indicating the prescribed region.

The waveforms of the signals output from magnetic sensors 5A and 5B can be modeled (or approximated) into a horizontal component (in the ascending/descending direction) of magnetic vector P of an external magnetic field varying along a circle, as will be described hereinafter, when the intermediate voltage serves as a reference.

Specifically, signal waveforms having phases offset by 270 degrees can be detected as electrical signals output from two adjacent magnetic sensors.

In this example, the 270 degrees can be divided by 90 degrees into three to obtain divisional regions T1-T3, and in the regions one of two output signals (an electrical signal) is set as a sine wave (sin θ) and the other output signal (an electrical signal) as a cosine wave (cos θ), and based on the two output signals (electrical signals), angle θ of a magnetic vector is calculated.

Figure 31A:
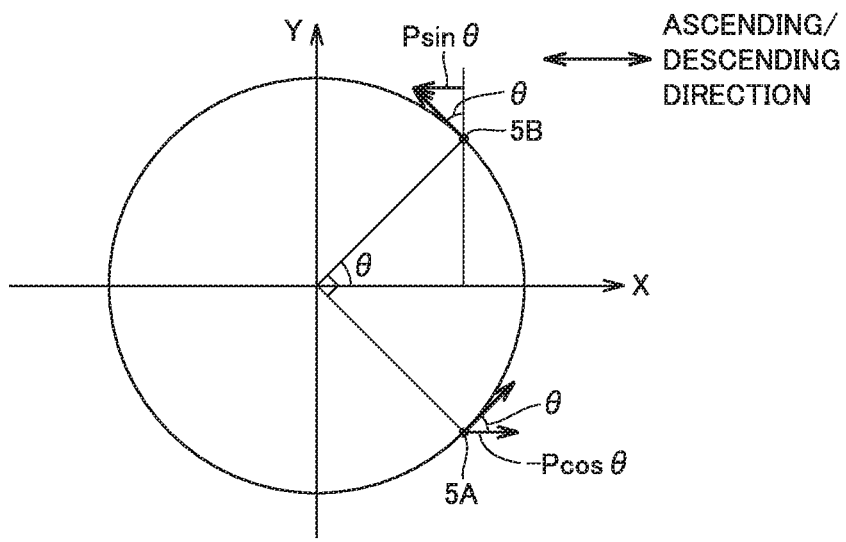
FIGS. 31A-31C are diagrams for illustrating an angle of a magnetic vector received by magnetic sensor 5 according to the second exemplary variation of the third preferred embodiment of the present invention.
Figure 31B:
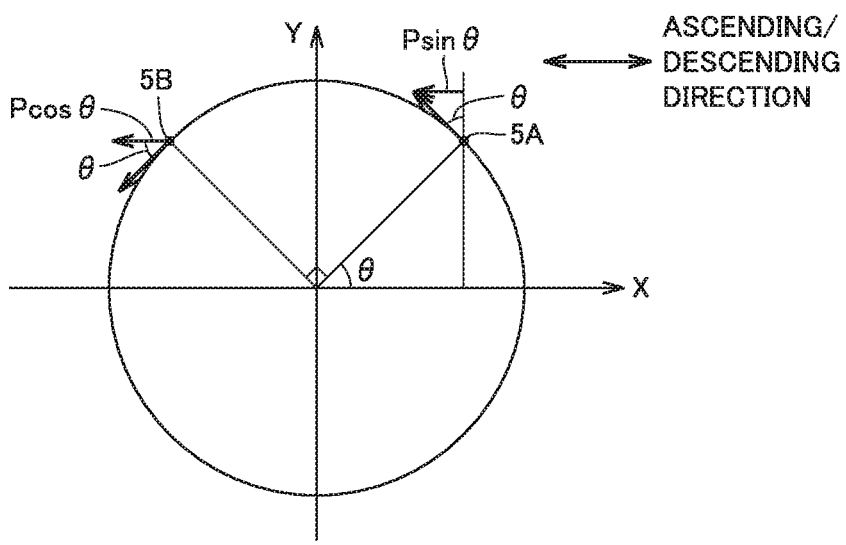
Figure 31C:
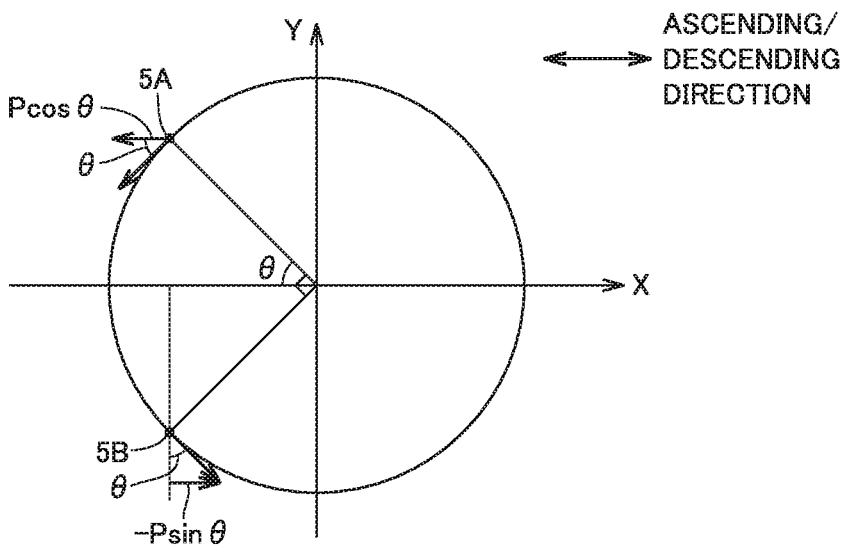

FIGS. 31A-31C are diagrams for illustrating an angle of a magnetic vector received by magnetic sensor 5 according to the second exemplary variation of the third preferred embodiment.

FIGS. 31A-31C represent a magnetic vector applied to magnetic sensors 5A and 5B in the ascending/descending direction of the float when state S11 shifts to state S12. Note that the ascending/descending direction is a direction along the x axis. Magnetic vector P indicates directions of lines of magnetic force of magnetic fields generated the N pole of magnet 2I and the S pole of magnet 2K, the N pole of magnet 2M and the S pole of magnet 2K, and the N pole of magnet 2M and the S pole of magnet 2O for example.

Although lines of magnetic force of magnetic fields generated by facing magnets 2J, 2L, 2N, 2P are omitted for the sake of simplicity, a component of magnetic vector P perpendicular to the ascending/descending direction is canceled by magnetic vectors of the lines of magnetic force of magnetic fields generated by the N and S poles of magnets 2J, 2L, 2N, 2P. Accordingly, magnetic sensors 5A, 5B are exposed to an external magnetic field composed only of a component in the ascending/descending direction. As has been previously discussed, the bias magnetic field vector in each magnetic sensor 5 varies according to this external magnetic field.

FIG. 31A represents magnetic vectors input to magnetic sensors 5A and 5B, respectively, with respect to the ascending/descending direction of float 20 in region T1 obtained by dividing states S11-S12 into three. Note that the ascending/descending direction is a direction along the x axis.

Magnetic vector P affecting magnetic sensor 5A indicates a direction of a line of magnetic force of a magnetic field generated by the N pole of magnet 2M and the S pole of magnet 2K, for example.

Magnetic vector P affecting magnetic sensor 5B indicates a direction of a line of magnetic force of a magnetic field generated by the N pole of magnet 2I and the S pole of magnet 2K, for example.

As one example, as a magnitude of a magnetic vector and a magnetic flux density (an AMR output) are correlated, according to angle θ an output signal detected at magnetic sensor 5A with respect to the ascending/descending direction can be represented as $-P \cos θ$. Furthermore, an output signal detected at magnetic sensor 5B with respect to the ascending/descending direction can be represented as $P \sin θ$. Based on the two output signals (electrical signals), angle θ of a magnetic vector is calculated.

Specifically, $\tan θ$ is calculated based on the two output signals (electrical signals), and angular information θ is calculated by calculating $\arctan θ$.

Note that a sine wave $P \sin θ$ and a cosine wave $P \cos θ$ have an amplitude value P, which is cancelled by calculating $\tan θ$.

The above process is a process performed in detection circuit 50. Specifically, the above calculation process is performed in MPU 40.

In response to the magnetic vector's angular information θ varying from 0 degree to 90 degrees, float 20 also positionally varies by distance a.

For example, as a position of float 20, a center of magnets 2I to 2O in the ascending/descending direction is set as a reference position (or a center point) as one example. In that case, a reference position (or center point) of float 20 shown in FIG. 28 is the position of magnetic sensor 5B. Furthermore, magnetic sensor 5A outputs a minimized signal (or state S11 in FIG. 29 is assumed) when the reference position (or center point) of float 20 is located at the position of magnetic sensor 5A. Furthermore, magnetic sensor 5A outputs a signal having the intermediate voltage (or state S12 in FIG. 29 is assumed) when the reference position (or center point) of float 20 is located at the position of magnetic sensor 5B.

In the detection region of region T1 in this example, electrical signals of magnetic sensors 5A, 5B are used to calculate angular information θ of a magnetic vector and determine a positional relationship therefor. For example, when angular information θ is calculated as 45 degrees, it can be detected that the float's reference position (or center point) is located at a position moved from the position of magnetic sensor 5A toward magnetic sensor 5B by a distance of a/2.

FIG. 31B represents magnetic vectors input to magnetic sensors 5A and 5B, respectively, with respect to the ascending/descending direction of float 20 in region T2 obtained by dividing states S11-S12 into three. Note that the ascending/descending direction is a direction along the x axis.

Magnetic vector P affecting magnetic sensor 5A indicates a direction of a line of magnetic force of a magnetic field generated by the N pole of magnet 2M and the S pole of magnet 2O, for example.

Magnetic vector P affecting magnetic sensor 5B indicates a direction of a line of magnetic force of a magnetic field generated by the N pole of magnet 2I and the S pole of magnet 2K, for example.

As one example, as a magnitude of a magnetic vector and a magnetic flux density (an AMR output) are correlated, according to angle θ an output signal detected at magnetic sensor 5A with respect to the ascending/descending direction can be represented as P sin θ. Furthermore, an output signal detected at magnetic sensor 5B with respect to the ascending/descending direction can be represented as P cos θ. Based on the two output signals (electrical signals), angle θ of the magnetic vector is calculated.

Specifically, tan θ is calculated based on the two output signals (electrical signals), and angular information θ is calculated by calculating arctan θ.

Note that a sine wave P sin θ and a cosine wave P cos θ have an amplitude value P, which is cancelled by calculating tan θ.

The above process is a process performed in detection circuit 50. Specifically, the above calculation process is performed in MPU 40.

In response to the magnetic vector's angular information θ varying from 0 degree to 90 degrees, float 20 also positionally varies by distance a.

For example, as a position of float 20, a center of magnets 2I to 2O in the ascending/descending direction is set as a reference position (or a center point) as one example. In that case, a reference position (or center point) of float 20 shown in FIG. 28 is the position of magnetic sensor 5B.

In the detection region of region T2 in this example, electrical signals of magnetic sensors 5A, 5B are used to calculate angular information θ of a magnetic vector and determine a positional relationship therefor. For example, when angular information θ is calculated as 45 degrees, it can be detected that the float's reference position (or center point) is located at a position moved from the position of magnetic sensor 5A toward magnetic sensor 5B by a distance of a+a/2.

FIG. 31C represents magnetic vectors input to magnetic sensors 5A and 5B, respectively, with respect to the ascending/descending direction of float 20 in region T3 obtained by dividing states S11-S12 into three. Note that the ascending/descending direction is a direction along the x axis.

Magnetic vector P affecting magnetic sensor 5A indicates a direction of a line of magnetic force of a magnetic field generated by the N pole of magnet 2M and the S pole of magnet 2O, for example.

Magnetic vector P affecting magnetic sensor 5B indicates a direction of a line of magnetic force of a magnetic field generated by the N pole of magnet 2M and the S pole of magnet 2K, for example.

As one example, as a magnitude of a magnetic vector and a magnetic flux density (an AMR output) are correlated, according to angle θ an output signal detected at magnetic sensor 5A with respect to the ascending/descending direction can be represented as P cos θ. Furthermore, an output signal detected at magnetic sensor 5B with respect to the ascending/descending direction can be represented as −P sin θ. Based on the two output signals (electrical signals), angle θ of the magnetic vector is calculated.

Specifically, tan θ is calculated based on the two output signals (electrical signals), and angular information θ is calculated by calculating arctan θ.

Note that a sine wave P sin θ and a cosine wave P cos θ have an amplitude value P, which is cancelled by calculating tan θ.

The above process is a process performed in detection circuit 50. Specifically, the above calculation process is performed in MPU 40.

In response to the magnetic vector's angular information θ varying from 0 degree to 90 degrees, float 20 also positionally varies by distance a.

For example, as a position of float 20, a center of magnets 2I to 2O in the ascending/descending direction is set as a reference position (or a center point) as one example. In that case, a reference position (or center point) of float 20 shown in FIG. 28 is the position of magnetic sensor 5B.

In the detection region of region T3 in this example, electrical signals of magnetic sensors 5A, 5B are used to calculate angular information θ of a magnetic vector and determine a positional relationship therefor. For example, when angular information θ is calculated as 45 degrees, it can be detected that the float's reference position (or center point) is located at a position moved from the position of magnetic sensor 5A toward magnetic sensor 5B by a distance of 2a+a/2.

Figure 32:
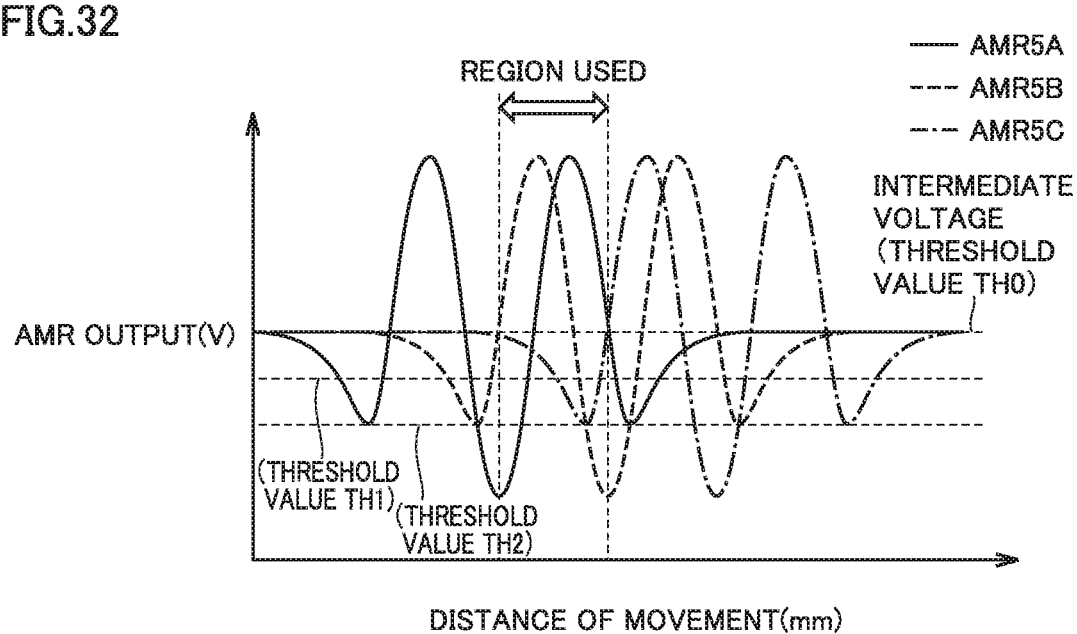
FIG. 32 is a diagram for illustrating a method of extracting waveforms of two signals output in each of regions T1 to T3 from waveforms of signals output from a plurality of magnetic sensors 5A to 5C according to the second exemplary variation of the third preferred embodiment of the present invention.

FIG. 32 is a diagram for illustrating a method of extracting waveforms of two signals output in each of regions T1 to T3 from waveforms of signals output from a plurality of magnetic sensors 5A to 5C according to the second exemplary variation of the third preferred embodiment.

Referring to FIG. 32, herein, a plurality of threshold values TH0 to TH2 are set. Threshold value TH0 is preferably set to the intermediate voltage as one example. Threshold value TH2 is preferably set to an intermediate peak value as observed from an output signal waveform having fallen to a minimum value as one example. Threshold value TH1 is preferably set to an intermediate value between threshold value TH0 and threshold value TH2 as one example. It should be noted that setting threshold values TH0 to TH2 as above is merely an example and a different method may be used to set a threshold value.

In the second exemplary variation of the third preferred embodiment, divisional regions T1 to T3 are provided based on a relationship between threshold values TH0 to TH2 and output signal waveforms, and two output signal waveforms are extracted.

For region T1, when magnetic sensor 5B (i.e., a magnetic sensor next to magnetic sensor 5A) outputs a signal having a waveform having a value exceeding threshold value TH0 and magnetic sensor 5A and magnetic sensor 5C (i.e., a magnetic sensor next to magnetic sensor 5A but one) output signals having waveforms having values below threshold value TH0, the output of magnetic sensor 5A is assumed to be −P cos θ and the output of magnetic sensor 5B is preferably set to P sin θ.

For region T2, when magnetic sensor 5A and magnetic sensor 5B (i.e., a magnetic sensor next to magnetic sensor 5A) output signals having waveforms having values exceeding threshold value TH0 and magnetic sensor 5C (i.e., a magnetic sensor next to magnetic sensor 5A but one) outputs a signal having a waveform having a value below threshold value TH0, the output of magnetic sensor 5A is assumed to be P sin θ and the output of magnetic sensor 5B is preferably set to P cos θ.

For region T3, when magnetic sensor 5C (i.e., a magnetic sensor next to magnetic sensor 5A but one) outputs a signal having a waveform having a value below threshold value TH1 and magnetic sensor 5B (i.e., a magnetic sensor next to magnetic sensor 5A) outputs a signal having a waveform having a value below threshold value TH0, or when magnetic sensor 5B (i.e., a magnetic sensor next to magnetic sensor 5A) outputs a signal having a waveform having a value below threshold value TH2 and magnetic sensor 5A outputs a signal having a waveform having a value exceeding threshold value TH0, the output of magnetic sensor 5A is assumed to be P cos θ and the output of magnetic sensor 5B is preferably set to −P sin θ.

According to the above method, angle θ of a magnetic vector is calculated based on the two output signals (electrical signals).

Specifically, tan θ is calculated based on the two output signals (electrical signals), and angular information θ is calculated by calculating arctan θ.

Note that while in this example, divisional regions T1 to T3 are provided based on a relationship between threshold values TH0 to TH2 and output signal waveforms and two output signal waveforms are extracted, this method is not exclusive and a different method may be used to extract two output signal waveforms.

FIGS. 33A-33F are diagrams for illustrating accuracy of angular information θ according to the second exemplary variation of the third preferred embodiment.

Figure 33A:
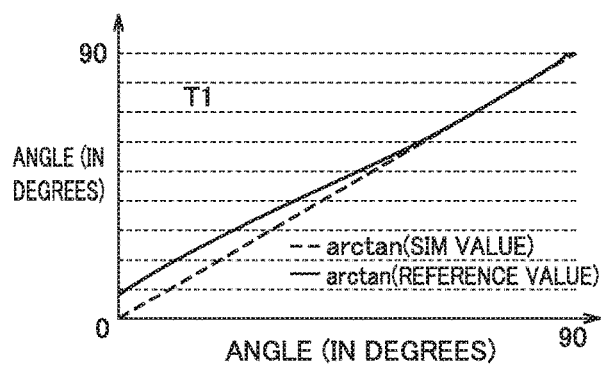
FIGS. 33A-33F are diagrams for illustrating accuracy of angular information θ according to the second exemplary variation of the third preferred embodiment of the present invention.
Figure 33B:
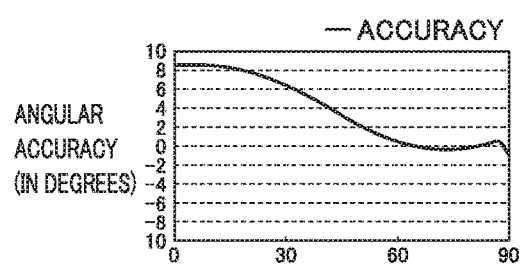
Figure 33C:
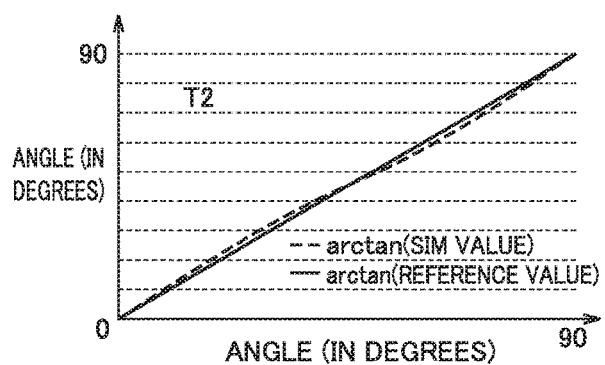
Figure 33D:
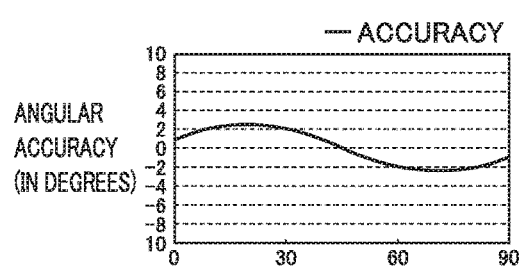
Figure 33E:
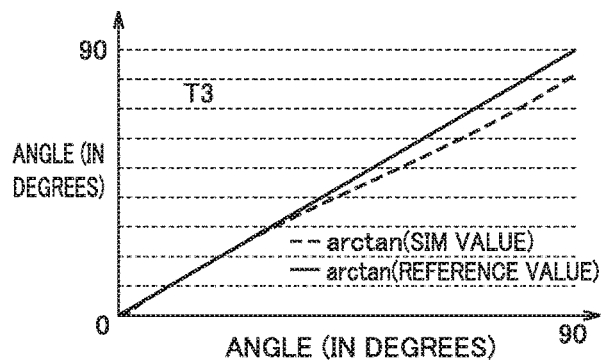

FIGS. 33A, 33C and 33E compare arctan θ with a reference value when angle θ is changed from 0 to 90 degrees with one output signal (an electrical signal) set to cos θ and the other output signal (an electrical signal) set to sin θ.

Figure 33F:
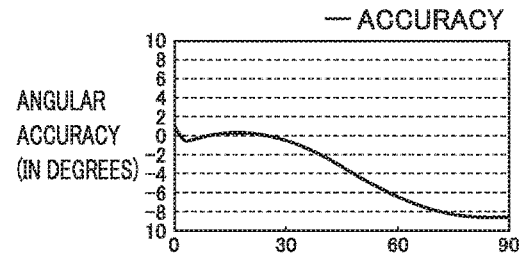

Furthermore, for angular accuracy, as shown in FIGS. 33B, 33D and 33F, a case is shown in which there is only some extent of deviation, and highly accurate detection is also able to be achieved.

Liquid level detection device 1 according to the second exemplary variation of the third preferred embodiment allows two electrical signals to be used to detect the position of float 20 with high accuracy. Furthermore, as two magnetic sensors are able to be used to detect information for 270 degrees (or distance 3a), the number of magnetic sensors is able to be further reduced to achieve miniaturization.

Further, while there is a possibility that, following variation in the ambient temperature, the magnets and the magnetic sensors may have their characteristics varied and an output signal may vary, the angle is calculated with two output signals' tan θ (P sin θ/P cos θ) calculated and accordingly, an amount of variation is canceled, and an error due to an effect of the ambient temperature is thus able to be reduced and highly accurate detection is also able to be achieved.

Figure 34:
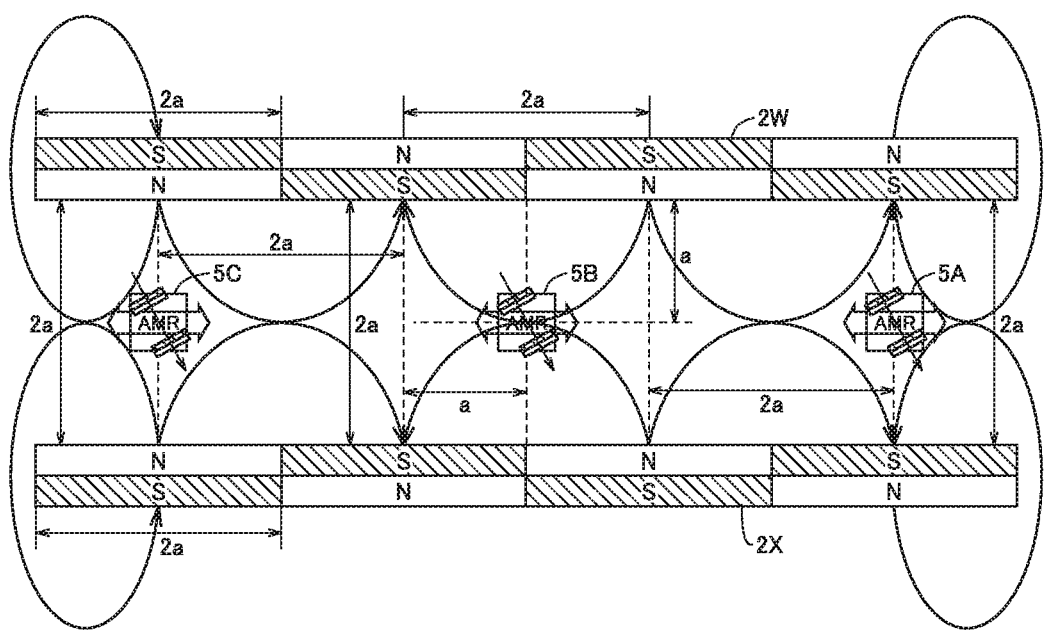
FIG. 34 is a diagram for illustrating a layout of magnets 2W and 2X attached to float 20 and magnetic sensors 5A, 5B, 5C according to a third exemplary variation of the third preferred embodiment of the present invention.

FIG. 34 is a diagram for illustrating a layout of magnets 2W and 2X attached to float 20 and magnetic sensors 5A, 5B, 5C according to a third exemplary variation of the third preferred embodiment.

As shown in FIG. 34, magnets 2W and 2X define a set to define a magnet unit.

The magnet unit defined by magnets 2W and 2X is divided into four regions and arranged such that S poles or N poles face each other in each region. Divisional, adjacent regions are arranged such that the magnets have magnetic poles arranged differently.

Furthermore, in this example, a distance between magnets 2W and 2X is preferably set to a spacing of twice distance a. Furthermore, magnetic sensors 5 are disposed to pass through a center thereof. Furthermore, a distance of two divisional regions of the N pole and the S pole is preferably set to an interval of twice distance a, and magnetic sensors 5 are disposed at intervals of distance 3a. Magnetic sensors 5 are attached to the guide in the ascending/descending direction.

Magnets 2W and 2X generate a magnetic field (a line of magnetic force) which is basically the same as that generated by the layout of FIG. 28 and signals output therefor have waveforms similar to those described with reference to FIG. 28, and the position of float 20 can be detected according to a similar method.

By this configuration, the number of magnets is able to be reduced and the layout of the magnets is also able to be easily accomplished.

Fourth Preferred Embodiment

Figure 35:
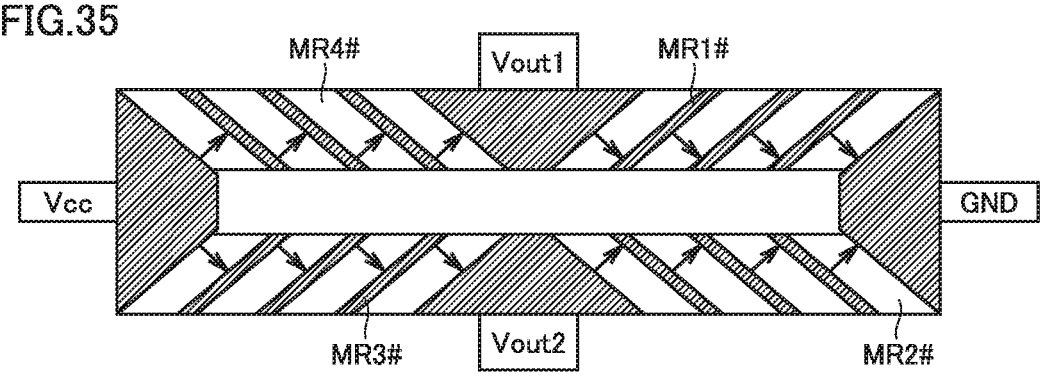
FIG. 35 is a diagram for illustrating a pattern of a magnetoresistive element of a magnetic sensor according to a fourth preferred embodiment of the present invention.

FIG. 35 is a diagram for illustrating a pattern of a magnetoresistive element of a magnetic sensor 5# according to a fourth preferred embodiment of the present invention.

Referring to FIG. 35, in this example, magnetic sensor 5 has a bridge structure including four magnetoresistive elements MR1# to MR4#.

The four magnetoresistive elements MR1# to MR4# are symmetrically arranged with respect to a center line. A barber pole electrode structure is provided such that magnetoresistive elements 1# and MR3# have a magnetoresistive effect characteristic allowing them to both have a resistance value increasing as magnetic fields opposite in direction increase and magnetoresistive elements 2# and 4# have a magnetoresistive effect characteristic allowing them to both have a resistance value decreasing as magnetic fields opposite in direction increase. By this configuration, an output characteristic which accompanies variation in magnetic flux density described with reference to FIGS. 5A and 5B is provided. Thus, a liquid level detection device including magnetic sensor 5# of this configuration instead of magnetic sensor 5 is also able to detect the position of float 20 in a method similar to that described above.

Fifth Preferred Embodiment

In a fifth preferred embodiment of the present invention, a configuration capable of highly accurate liquid level detection even when the position of float 20 is displaced with respect to guide 10 will be described.

Figure 36A:
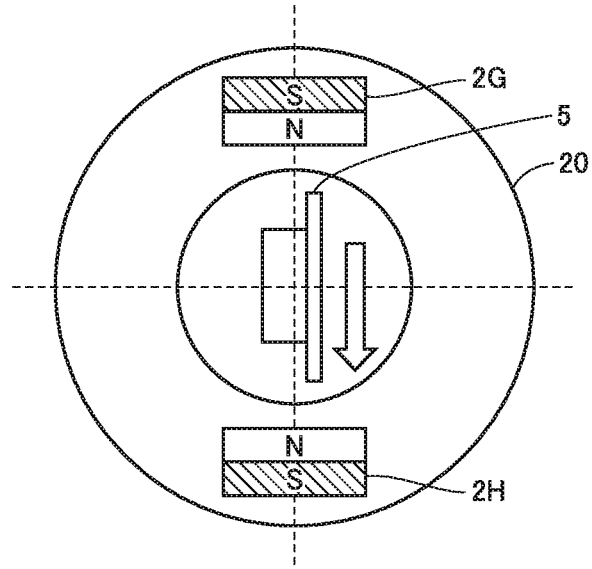
FIGS. 36A and 36B are diagrams for illustrating a case where the position of float 20 is displaced with respect to guide 10 according to a fifth preferred embodiment of the present invention.
Figure 36B:
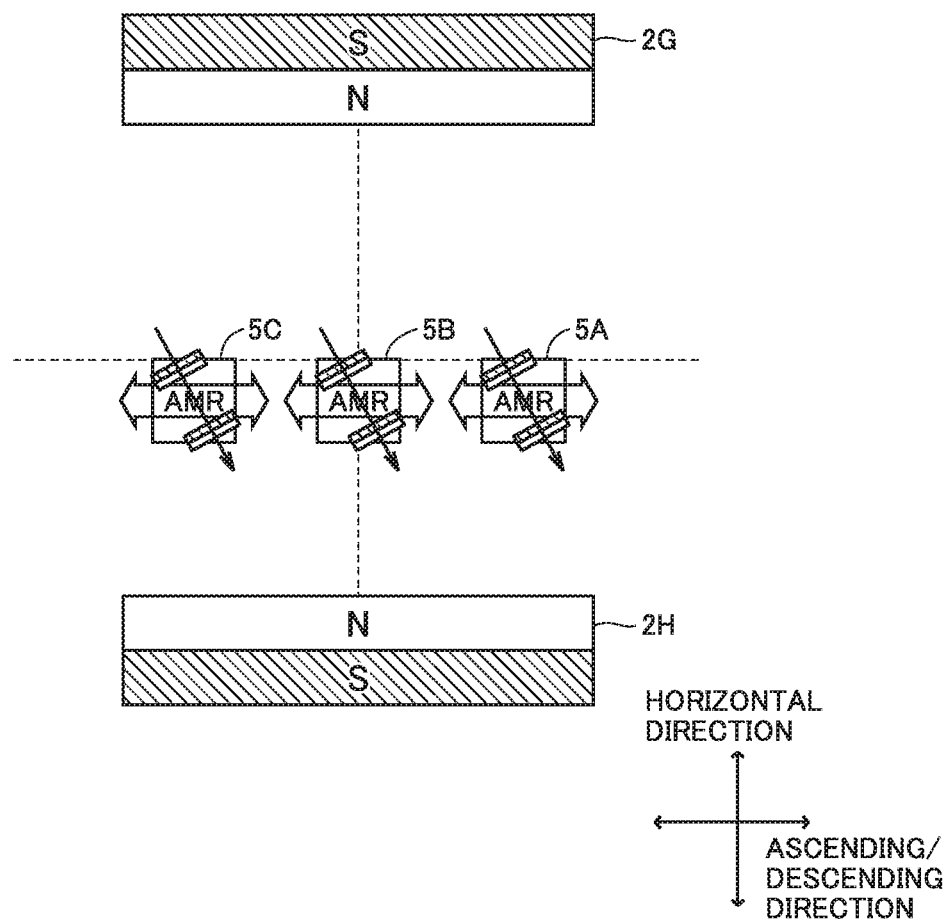

FIGS. 36A and 36B are diagrams for illustrating a case where the position of float 20 is displaced with respect to guide 10.

FIG. 36A shows float 20 as observed from above. Furthermore, magnets 2G and 2H defining a magnet unit are provided to face each other with the guide interposed therebetween.

In this example, while a case where the center axis of a guide 10 and the center of float 20 are matched with each other is shown, a case where a relative positional relationship between magnetic sensor 5 and float 20 is changed as float 20 is positionally displaced will be described. A case where float 20 has magnet 2H closer to magnetic sensor 5 than float 20 has magnet 2G will be described.

FIG. 36B shows a layout of magnets 2G and 2H attached to float 20 and magnetic sensors 5A to 5C.

As shown in FIG. 36B, when magnetic sensors 5A to 5C approach magnet 2H, they are affected not only by an external magnetic field (a line of magnetic force) of a horizontal component but also by an external magnetic field (a line of magnetic force) of a perpendicular component. This results in a bias magnetic field vector with a rotational angle varied and an output signal in response thereto varies. As the output signal varies, there is a possibility or less accurate liquid level detection.

FIG. 37 is a diagram for illustrating a layout of magnets 2G and 2H attached to float 20 and magnetic sensors according to the fifth preferred embodiment.

As shown in FIG. 37, magnets 2G and 2H define a set to define a magnet unit.

Magnets 2G and 2H defining a magnet unit are disposed to have their respective N poles facing each other. Float 20 has a configuration similar to that described with reference to FIG. 15.

As has been described with reference to FIG. 15, a distance between magnets 2G and 2H is preferably set to a spacing of twice a distance a, and magnetic sensors 5 are disposed to pass through a center thereof. Magnetic sensors 5 are also disposed at intervals of distance a. Magnetic sensors 5 are attached to the guide in the ascending/descending direction.

Note that the bias magnetic field vector of magnetic sensor 5 is provided to have a direction symmetrically with reference to a horizontal direction as compared with an adjacent magnetic sensor. In this example, magnetic sensors 5PA to 5PC are provided as one example. The bias magnetic field vectors respectively of magnetic sensors 5PA to 5PC are arranged to have a direction in a horizontal direction perpendicular to the ascending/descending direction of float 20.

An arrangement is such that a bias magnetic field vector applied to magnetoresistive elements MR1 to MR4 has a direction in the horizontal direction perpendicular to the ascending/descending direction of the float 20. In this respect, magnetic sensors 5PA to 5PC may include magnetoresistive element MR having a configuration similar to that of FIG. 4, and this arrangement or angle is able to be appropriately redesigned by a skilled artisan to allow magnetic sensors 5PA to 5PC to have enhanced detection characteristics.

The other magnetic sensors attached to the guide in the ascending/descending direction are also disposed in the same manner.

Figure 38A:
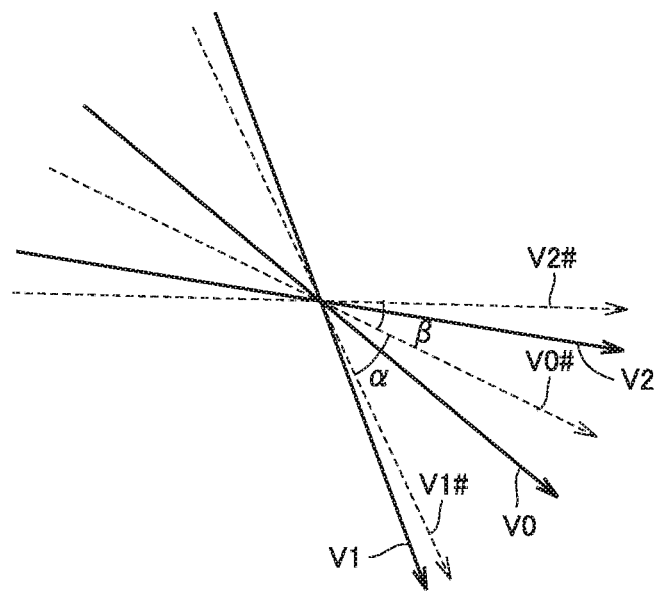
FIGS. 38A and 38B are diagrams for illustrating variation of a bias magnetic field vector according to the fifth preferred embodiment of the present invention.
Figure 38B:
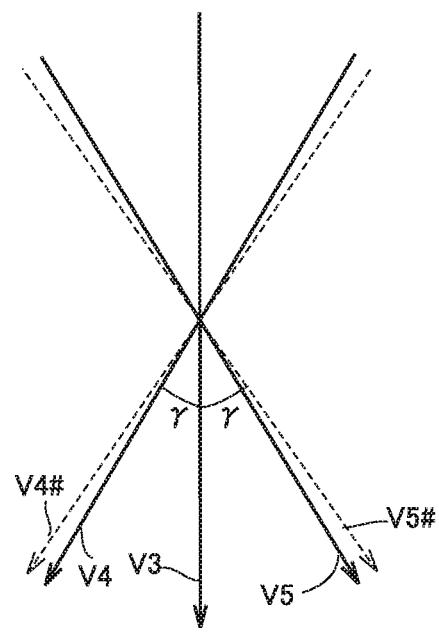

FIGS. 38A and 38B are diagrams for illustrating variation of a bias magnetic field vector of a magnetic sensor.

FIG. 38A shows variation of a bias magnetic field vector of magnetic sensors 5A to 5C.

As has been described with reference to FIGS. 5A and 5B, when an external magnetic field in the ascending/descending direction is applied to magnetic sensors 5A to 5C, bias magnetic field vector V0 varies to bias magnetic field vector V1 according to the external magnetic field (applied in a right to left direction). In contrast, bias magnetic field vector V0 varies to bias magnetic field vector V2 according to the external magnetic field (applied in a left to right direction).

In contrast, when float 20 has magnet 2H approaching magnetic sensors 5A to 5C, the sensors are affected by an external magnetic field of a horizontal component (in the ascending/descending direction) as well as an external magnetic field of a perpendicular component (in the horizontal direction) (lines of magnetic force).

Specifically, when magnetic sensors 5A to 5C are not displaced, external magnetic fields of perpendicular components (in the horizontal direction) from magnets 2G and 2H cancel each other and the magnetic sensors will not be affected thereby (or by a line of magnetic force), whereas when the magnetic sensors are displaced, external magnetic fields of perpendicular components (in the horizontal direction) from magnets 2G and 2H do not cancel each other and the magnetic sensors will be affected thereby. For example, magnetic sensors 5A to 5C of FIGS. 36A and 36B are exposed to an external magnetic field of a perpendicular component (in the horizontal direction) from magnet 2H to magnet 2G.

More specifically, in the state shown in FIGS. 36A and 36B, magnetic sensor 5A varies to a bias magnetic field vector V2#. Furthermore, magnetic sensor 5B varies to a bias magnetic field vector V0#. Furthermore, magnetic sensor 5C varies to a bias magnetic field vector V1#.

Herein, when bias magnetic field vector V0# of magnetic sensor 5B in FIGS. 36A and 36B is set as a reference, bias magnetic field vector V1# of magnetic sensor 5C rotates from the state of bias magnetic field vector V0# clockwise by an angle α. Furthermore, when bias magnetic field vector V0# of magnetic sensor 5B is set as a reference, bias magnetic field vector V2# of magnetic sensor 5C rotates from the state of bias magnetic field vector V0# counterclockwise by an angle β.

Bias magnetic field vector V0# serving as a reference deviates from bias magnetic field vector V0 and the rotation angle also varies, and accordingly, magnetic sensors 5A to 5C output signals having different values in amplitude and therefore there is a possibility of angular detection with an error.

FIG. 38B shows variation of bias magnetic field vectors of magnetic sensors 5PA to 5PC.

The bias magnetic field vectors respectively of magnetic sensors 5PA to 5PC are arranged to have a direction in a horizontal direction perpendicular to the ascending/descending direction of float 20.

When an external magnetic field in the ascending/descending direction is applied to magnetic sensors 5PA to 5PC, a bias magnetic field vector V3 varies to a bias magnetic field vector V4 according to the external magnetic field (applied in a right to left direction). In contrast, bias magnetic field vector V3 varies to a bias magnetic field vector V5 according to the external magnetic field (applied in a left to right direction).

In contrast, when float 20 has magnet 2H approaching magnetic sensors 5PA to 5PC, the sensors are affected by an external magnetic field of a horizontal component (in the ascending/descending direction) as well as an external magnetic field of a perpendicular component (in the horizontal direction) (lines of magnetic force).

Specifically, when magnetic sensors 5PA to 5PC are not displaced, external magnetic fields of perpendicular components (in the horizontal direction) from magnets 2G and 2H cancel each other and the magnetic sensors will not be affected thereby (or by a line of magnetic force), whereas when the magnetic sensors are displaced, external magnetic fields of perpendicular components (in the horizontal direction) from magnets 2G and 2H do not cancel each other and the magnetic sensors will be affected thereby. For example, magnetic sensors 5PA to 5PC of FIG. 37 are exposed to an external magnetic field of a perpendicular component (in the horizontal direction) from magnet 2H to magnet 2G.

More specifically, in the state shown in FIG. 37, magnetic sensor 5PA varies to a bias magnetic field vector V5#.

Furthermore, as bias magnetic field vector V3 and an external magnetic field (a line of magnetic force) of a perpendicular component (in the horizontal direction) are the same in direction, bias magnetic field vector V3 of magnetic sensor 5PB maintains a state in the horizontal direction perpendicular to the ascending/descending direction. Furthermore, magnetic sensor 5PC varies to a bias magnetic field vector V4#.

Herein, when bias magnetic field vector V3 of magnetic sensor 5PB in FIG. 37 is set as a reference, bias magnetic field vector V4# of magnetic sensor 5PC rotates from the state of bias magnetic field vector V3 clockwise by an angle γ. Furthermore, when bias magnetic field vector V3 of magnetic sensor 5PB is set as a reference, bias magnetic field vector V5# of magnetic sensor 5PA rotates from the state of bias magnetic field vector V3 counterclockwise by angle γ.

Bias magnetic field vector V3 serving as a reference is fixed and the rotation angle also does not vary, and accordingly, magnetic sensors 5PA to 5PC output signals having equal values in amplitude and an error in angular detection is thus able to be suppressed.

Specifically, as has been described above, in this example also, as has been described with reference to FIG. 15, of two electrical signals, one output signal (an electrical signal) is preferably set to P cos θ and the other output signal (an electrical signal) is preferably set to P sin θ, and based on the two output signals (electrical signals), tan θ (P sin θ/P cos θ) is calculated, and pseudo angular information θ is calculated by calculating arctan θ.

In calculating angular information θ, when float 20 has magnet 2H approaching magnetic sensors 5PA to 5PC, then in the example of FIG. 37 an amplitude value will vary from P to an amplitude value P3 based on angle γ by which the bias magnetic field vector rotates, however, as two output signals (electrical signals) have their amplitude values equally varied, they are canceled in calculating angular information θ. Thus, even when float 20 has magnet 2H approaching magnetic sensors 5PA to 5PC, the position of float 20 is able to be detected with high accuracy.

In contrast, in the example of FIG. 36B, the amplitude values of the two output signals (electrical signals) vary from P to amplitude values P1 and P2 based on rotation angles α and β, respectively, by which the bias magnetic field vectors rotate, and thus cannot cancel each other, and accordingly, the ratio varies, resulting in a possibility of angular detection with an error.

Figure 39A:
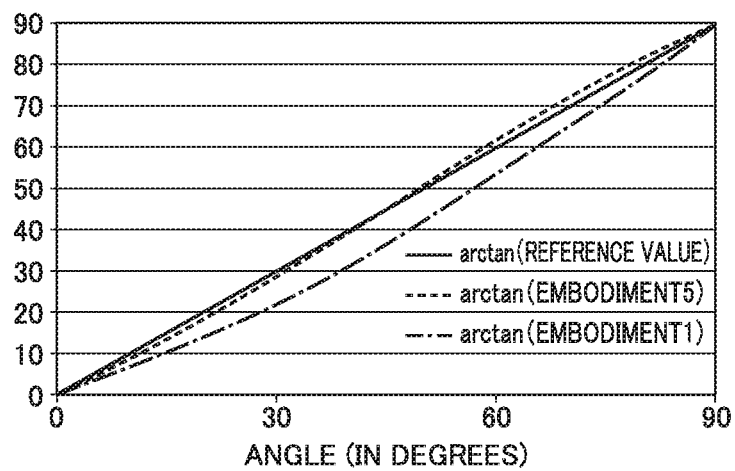
FIGS. 39A and 39B are diagrams for illustrating accuracy of angular information θ according to the fifth preferred embodiment of the present invention.
Figure 39B:
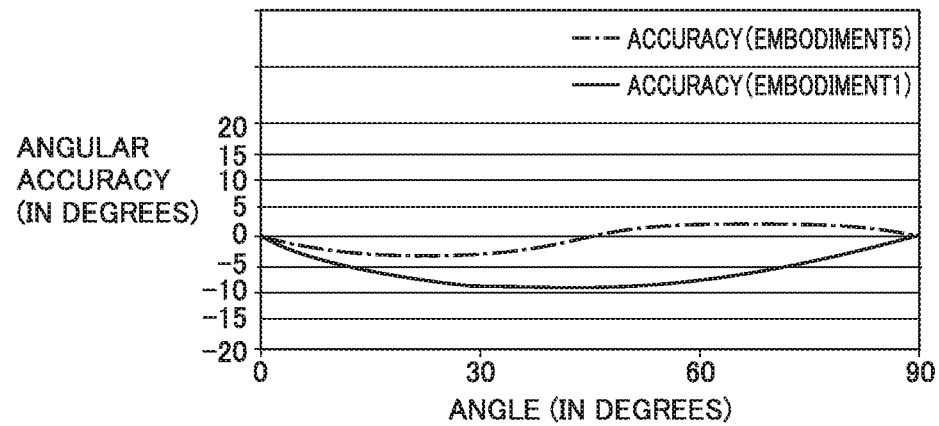

FIGS. 39A and 39B are diagrams for illustrating accuracy of angular information θ according to the fifth preferred embodiment.

FIG. 39A compares arctan θ with a reference value when angle θ is changed from 0 to 90 degrees with one output signal (an electrical signal) set to P cos θ and the other output signal (an electrical signal) set to P sin θ.

While, as has been described for the configuration of the first preferred embodiment with reference to FIG. 36B, a case is shown in which when float 20 is displaced, accuracy is decreased, the configuration of FIG. 37 according to the fifth preferred embodiment is free of reduction in accuracy and allows the position of float 20 to be detected with high accuracy.

Furthermore, for angular accuracy, as shown in FIG. 39B, a case is shown in which there is only a deviation of ±5 degrees from the reference value, and the position of float 20 is able to be detected with high accuracy.

When float 20 is positionally displaced, adjacent magnetic sensors is each affected by an external magnetic field of a horizontal component (in the ascending/descending direction) as well as an external magnetic field of a perpendicular component (in the horizontal direction) (lines of magnetic force).

For example, when float 20 is positionally displaced, magnetic sensor 5C shown in FIG. 36B is exposed to a first external magnetic field composed of an external magnetic field of a horizontal component (in the ascending/descending direction) and an external magnetic field of a perpendicular component (in the horizontal direction) (lines of magnetic force) composited together. Magnetic sensor 5A is exposed to a second external magnetic field composed of an external magnetic field of a horizontal component (in the ascending/descending direction) and an external magnetic field of a perpendicular component (in the horizontal direction) (lines of magnetic forces) composited together. The first external magnetic field and the second external magnetic field are symmetrical with respect to the horizontal direction.

When float 20 is positionally displaced, and bias magnetic field vectors are arranged in a fixed direction in an inclined state, as seen in magnetic sensors 5A to 5C, the first and second external magnetic fields are applied to the bias magnetic field vectors at different incident angles. Accordingly, the aforementioned rotation angles α and β from a bias magnetic field vector serving as a reference are also different.

In the configuration according to the fifth preferred embodiment, the bias magnetic field vectors of adjacent magnetic sensors are preferably set to be in a horizontal direction perpendicular to the ascending/descending direction of float 20. If float 20 is positionally displaced, the first and second external magnetic fields are applied to the bias magnetic field vectors at equal incident angles. Accordingly, the aforementioned rotation angle γ from a bias magnetic field vector serving as a reference does not vary. As a rotation angle from a bias magnetic field vector serving as a reference does not vary and accordingly, magnetic sensors 5PA to 5PC output signals having equal values in amplitude, and positional detection with high accuracy is thus able to be achieved.

FIG. 40 is a diagram for illustrating a layout of magnets 2G and 2H attached to float 20 and a plurality of magnetic sensors 5QA to 5QC according to an exemplary variation of the fifth preferred embodiment.

As shown in FIG. 40, magnets 2G and 2H define a set to define a magnet unit.

Magnets 2G and 2H defining a magnet unit are disposed to have their respective N poles facing each other. While in this example an example will be described in which the N poles face each other, it is also possible to adopt a configuration in which the S poles face each other.

Furthermore, in this example, a distance between magnets 2G and 2H is preferably set to a spacing of twice distance a, and magnetic sensors 5QA to 5QC are disposed to pass through a center thereof. Magnetic sensors 5QA to 5QC are also disposed at intervals of distance a. Magnetic sensors 5QA to 5QC are attached to the guide in the ascending/descending direction.

In this example, magnetic sensor 5QB is provided at a center, and the bias magnetic field vectors of magnetic sensors 5QA and 5QB are provided symmetrically in direction with respect to the horizontal direction. Furthermore, the bias magnetic field vectors of magnetic sensors 5QC and 5QB are provided symmetrically in direction with respect to the horizontal direction.

This arrangement allows the bias magnetic field vectors to be exposed to the first and second external magnetic fields at equal incident angles. This allows a rotation angle from a bias magnetic field vector serving as a reference to be set to be invariable, and magnetic sensors 5QA to 5QC output signals having equal values in amplitude, and by subjecting the output signals to a corrective operation of a prescribed value, an error in angular detection can be suppressed and positional detection with high accuracy can be performed. The prescribed value can be set to a maximum value of variation in amplitude divided by 2, and a skilled artisan would be able to redesign it as appropriate.

Other Preferred Embodiments

Figure 41:
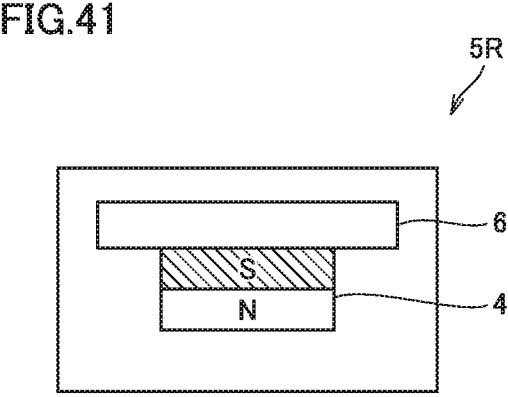
FIG. 41 illustrates a magnetic sensor 5R based on another preferred embodiment of the present invention.

FIG. 41 illustrates a magnetic sensor 5R based on another preferred embodiment.

Referring to FIG. 41, for magnetic sensor 5R, a substrate 6 on which a magnetoresistive element is provided, and a bias magnet 4 are shown. It is assumed that bias magnet 4 has an S pole facing substrate 6 on which the magnetoresistive element is provided. While in this example a case is described in which bias magnet 4 has an S pole facing substrate 6 on which the magnetoresistive element is provided, a case in which bias magnet 4 has an N pole facing substrate 6 on which the magnetoresistive element is provided is also similarly discussed.

Figure 42:
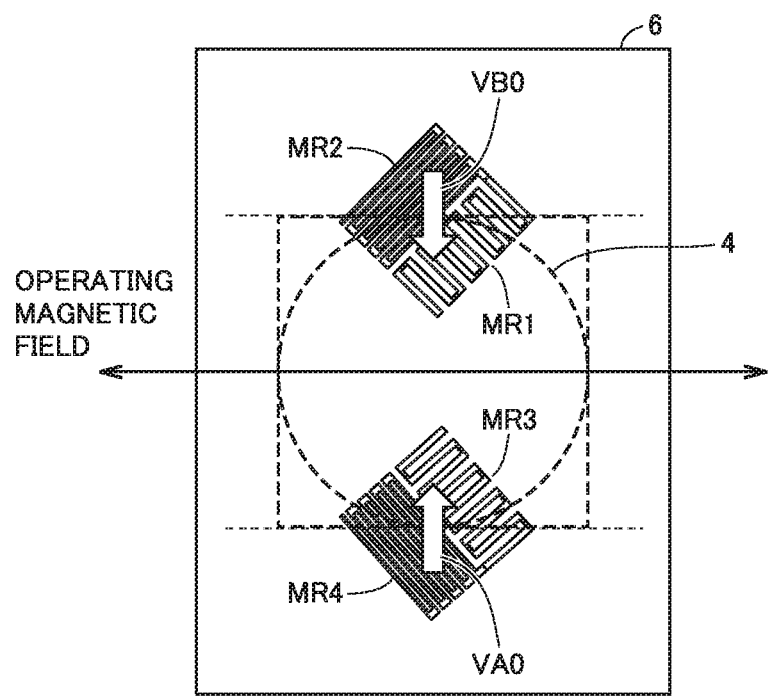
FIG. 42 is a diagram for illustrating a bias magnetic field vector for a magnetic sensor 5P.

FIG. 42 is a diagram for illustrating a bias magnetic field vector for magnetic sensor 5P.

As shown in FIG. 42, four magnetoresistive elements MR1 to MR4 are provided on substrate 6 axisymmetrically with respect to a direction in which substrate 6 ascends/descends. Bias magnet 4 is provided on the four magnetoresistive elements MR1 to MR4. As one example, a case is shown in which bias magnet 4 having a cylindrical shape is disposed. It should be noted that the bias magnet is not thus limited in shape and a square-shaped bias magnet may be disposed. Further, while a configuration in which bias magnet 4 is provided on magnetoresistive elements MR1 to MR4 will be described, a configuration may be adopted in which bias magnet 4 is provided on the opposite side with substrate 6 interposed.

In this example, a case is shown where the magnetoresistive elements are disposed in the vicinity of an end portion of bias magnet 4. This arrangement allows a bias magnetic field to be applied to the magnetoresistive elements at a position where the bias magnetic field has a large strength.

As one example, a case is shown in which a bias magnetic field vector VB0 is applied to magnetoresistive elements MR1 and MR2 as a bias magnetic field in one direction inward from the center of bias magnet 4.

Furthermore, a case is shown in which a bias magnetic field vector VA0 is applied to magnetoresistive elements MR3 and MR4 as a bias magnetic field in the other direction inward from the center of bias magnet 4. As a bias magnetic field applied with reference to the center line of bias magnet 4 are directed differently, bias magnetic field vector VA0 and bias magnetic field vector VB0 are opposite in direction.

While magnetoresistive element MR of magnetic sensor 5R of this example is described as a folded pattern structure by way of example, it is not limited to the folded shape in particular, and the pattern structure is able to be redesigned as appropriate by a skilled artisan to allow magnetoresistive element 5P to have enhanced detected characteristics.

Furthermore, while a configuration is shown in which an arrangement is made such that a bias magnetic field vector of an angle of 45 degrees is applied as a bias magnetic field vector for magnetoresistive element MR, this arrangement or angle is also able to be appropriately redesigned by a skilled artisan to allow magnetic sensor 5P to have enhanced detection characteristics. For example, it is also possible to design such that a bias magnetic field vector with an angle of 30 degrees is applied to magnetoresistive element MR.

FIG. 43 illustrates a circuit configuration of magnetic sensor 5R.

As shown in FIG. 43, magnetic sensor 5R preferably includes a bridge structure including four magnetoresistive elements MR1 to MR4.

Magnetoresistive elements MR1 and MR2 are connected in series between a power supply voltage Vcc and a ground voltage GND. In parallel with magnetoresistive elements MR1 and MR2, magnetoresistive elements MR3 and MR4 are connected in series between power supply voltage Vcc and ground voltage GND.

A signal V− is output from a connection node of magnetoresistive elements MR3 and MR4 and a signal V+ is output from a connection node of magnetoresistive elements MR1 and MR2, and a difference ΔV between signals V+ and V− is output.

As indicated in this example, bias magnetic field vector VA0 is applied to magnetoresistive elements MR3 and MR4. Bias magnetic field vector VB0 is applied to magnetoresistive elements MR1 and MR2.

The vectors vary in direction in response to an external magnetic field with respect to the ascending/descending direction of float 20.

Magnetic sensor 5R detects variation of the bias magnetic field vectors and outputs a signal (potential difference ΔV) corresponding to the result of the detection.

For example, bias magnetic field vectors VA0 and VB0 in response to an external magnetic field (in a right to left direction) result in signal V+ being decreased and signal V− being increased. Accordingly, difference ΔV decreases.

In contrast, bias magnetic field vectors VA0 and VB0 in response to an external magnetic field (in a left to right direction) result in signal V+ being increased and signal V− being decreased. Accordingly, difference ΔV increases.

Magnetic sensor 5R also allows the position of float 20 to be detected in the above method.

Furthermore, the two bias magnetic field vectors are preferably set to have a direction in a horizontal direction perpendicular to the ascending/descending direction, and if float 20 is displaced, the bias magnetic field vectors' rotation angles are the same, as has been described above, and an error in angular detection is able to be significantly reduced or prevented, and positional detection with high accuracy is able to be performed.

The magnetoresistive element described in the above example can also be a magnetoresistive element including an exchange coupling film in which an antiferromagnetic layer and a ferromagnetic layer are exchange-coupled.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A liquid level detection device comprising:
   a float that is rotatable, and ascends and descends following a liquid level;
   a magnet attached to the float;
   a guide that guides the float to ascend and descend;
   a plurality of magnetic sensors attached to the guide to sense a magnetic flux density varying in response to a position of the magnet as the magnet ascends/descends and output an electrical signal corresponding to the magnetic flux density; and
   a detection circuit that detects a position of the float based on electrical signals respectively output from the plurality of magnetic sensors;
   the detection circuit detecting the position of the float based on electrical signals output from two adjacent ones of the plurality of magnetic sensors; and
   the detection circuit extracting electrical signals output from the two adjacent magnetic sensors based on a comparison with only an intermediate voltage among electrical signals respectively output from all of the plurality of magnetic sensors.

2. The liquid level detection device according to claim 1, wherein the detection circuit calculates angular information with the two extracted electrical signals with one electrical signal represented as a sine wave and the other electrical signal represented as a cosine wave, and detects the position of the float based on the calculated angular information.

3. The liquid level detection device according to claim 2, wherein at least one of the plurality of magnetic sensors outputs an output signal corresponding to a variation of a magnetic flux density of an external magnetic field, and senses a polarity of a magnetic field applied to the magnetic sensor.

4. The liquid level detection device according to claim 1, wherein at least one of the plurality of magnetic sensors outputs an output signal corresponding to a variation of a magnetic flux density of an external magnetic field, and senses a polarity of a magnetic field applied to the magnetic sensor.

* * * * *